United States Patent
Riley

(10) Patent No.: US 11,384,684 B2
(45) Date of Patent: Jul. 12, 2022

(54) ROTARY ENGINE, PARTS THEREOF, AND METHODS

(71) Applicant: ASTRON AEROSPACE LLC, Derby, KS (US)

(72) Inventor: Matthew T. Riley, Wichita, KS (US)

(73) Assignee: ASTRON AEROSPACE LLC, Derby, KS (US)

( * ) Notice: Subject to any disclaimer, the term of this patent is extended or adjusted under 35 U.S.C. 154(b) by 0 days.

(21) Appl. No.: 16/732,318

(22) Filed: Jan. 1, 2020

(65) Prior Publication Data
US 2021/0040885 A1 Feb. 11, 2021

Related U.S. Application Data

(60) Provisional application No. 62/894,567, filed on Aug. 30, 2019, provisional application No. 62/884,771, filed on Aug. 9, 2019.

(51) Int. Cl.
*F02B 53/02* (2006.01)
*F02B 53/04* (2006.01)
(Continued)

(52) U.S. Cl.
CPC ............ *F02B 53/02* (2013.01); *F01C 11/004* (2013.01); *F02B 53/08* (2013.01); *F02B 55/00* (2013.01);
(Continued)

(58) Field of Classification Search
CPC .......... F02B 53/02; F02B 53/04; F02B 53/08; F02B 53/12; F02B 55/00; F02B 55/08; F02B 55/12; F02B 55/14; F02B 2730/05
See application file for complete search history.

(56) References Cited

U.S. PATENT DOCUMENTS 465,907 A 12/1891 Whipple
600,723 A 3/1898 Johnson
(Continued)

FOREIGN PATENT DOCUMENTS

CN 102428259 A 4/2012
DE 724091 8/1938
(Continued)

OTHER PUBLICATIONS

"Notice of Allowance received for U.S. Appl. No. 16/745,184, dated Oct. 8, 2020."
(Continued)

*Primary Examiner* — Audrey B. Walter
(74) *Attorney, Agent, or Firm* — Kutak Rock LLP

(57) ABSTRACT

A rotary engine, parts thereof, and methods associated therewith is provided. The engine is modular and adjustable to accommodate a variety of requirements and preferences. The system includes a combustion assembly having a housing and a power rotor positioned therein. The power rotor rotates in a first direction from the beginning of each combustion process through the end of each exhaust process. The system also includes a compression assembly linked to the combustion assembly such that the compression rotor rotates in the first direction from the beginning of each intake process through the end of each compression process. A tank assembly in fluid communication with the compression assembly and the combustion assembly provides stability to the system while eliminating or otherwise reducing transitional loses.

30 Claims, 35 Drawing Sheets

(51) Int. Cl.
  *F02B 53/08* (2006.01)
  *F02B 53/12* (2006.01)
  *F02B 55/00* (2006.01)
  *F02B 55/08* (2006.01)
  *F02B 55/12* (2006.01)
  *F02B 55/14* (2006.01)
  *F01C 11/00* (2006.01)

(52) U.S. Cl.
  CPC .............. *F02B 55/08* (2013.01); *F02B 53/04* (2013.01); *F02B 53/12* (2013.01); *F02B 55/12* (2013.01); *F02B 55/14* (2013.01); *F02B 2730/05* (2013.01)

(56) References Cited

U.S. PATENT DOCUMENTS

| | | |
|---|---|---|
| 621,193 A | 3/1899 | Wilson |
| 711,083 A | 10/1902 | Taylor |
| 717,445 A | 12/1902 | Nestius |
| 726,896 A | 5/1903 | Franzen |
| 761,512 A | 12/1904 | Lecomte |
| 822,700 A | 6/1906 | Steele |
| 830,124 A | 9/1906 | Weeks |
| 868,841 A | 10/1907 | Calkins |
| 888,806 A | 5/1908 | Hopkins |
| 909,774 A | 1/1909 | Flora |
| 983,754 A | 2/1911 | Nichols |
| 994,825 A | 6/1911 | Dunbar |
| 1,052,045 A | 2/1913 | Doedyns |
| 1,078,301 A | 11/1913 | Moore |
| 1,098,256 A | 5/1914 | Harper |
| 1,229,949 A | 6/1917 | Harrigan |
| 1,242,826 A | 10/1917 | Llewellyn |
| 1,277,018 A | 8/1918 | Wolfington |
| 1,320,892 A | 11/1919 | Munn |
| 1,376,397 A | 5/1921 | Bylger |
| 1,406,140 A | 2/1922 | Anderson |
| 1,488,528 A | 4/1924 | Cardini |
| 1,567,912 A | 12/1925 | Carey |
| 1,872,361 A | 3/1926 | Tackman |
| 1,737,942 A | 12/1929 | Pagel |
| 1,850,904 A | 3/1932 | Woodward |
| 2,168,726 A | 2/1937 | Whittle |
| 2,297,529 A | 1/1941 | Berry |
| 2,447,929 A | 8/1948 | Berry |
| 2,478,206 A | 8/1949 | Redding |
| 2,504,414 A | 4/1950 | Hawthorne |
| 2,505,660 A | 4/1950 | Baumann |
| 2,526,409 A | 10/1950 | Price |
| 2,526,941 A | 10/1950 | Fishbein |
| 2,541,098 A | 2/1951 | Redding |
| 2,614,503 A | 10/1952 | Berry |
| 2,636,480 A | 4/1953 | Becker |
| 2,702,985 A | 3/1955 | Howell |
| 2,817,322 A | 12/1957 | Miller |
| 2,920,610 A | 1/1960 | Breelle et al. |
| 3,153,907 A | 10/1964 | Griffith |
| 3,203,406 A | 8/1965 | Dettwiler |
| 3,435,808 A | 4/1969 | Allender |
| 3,550,565 A | 12/1970 | Sanchez |
| 3,674,960 A | 7/1972 | Krantz |
| 3,797,237 A | 3/1974 | Kamiya |
| 3,863,609 A | 2/1975 | Ikarashi |
| 4,144,004 A | 3/1979 | Edwards |
| 5,596,963 A | 1/1997 | Lai |
| 6,129,067 A | 10/2000 | Riley |
| 6,394,775 B1 | 5/2002 | White |
| 6,488,004 B1 | 12/2002 | Adamovski |
| 6,672,274 B2 | 1/2004 | Winterpacht |
| 7,682,139 B2 | 3/2010 | Riley et al. |
| RE41,373 E | 6/2010 | Gehman |
| 8,517,706 B2 | 8/2013 | Lurtz |
| 8,616,176 B2 | 12/2013 | Jacobsen et al. |
| 9,334,793 B1 | 5/2016 | Marc |
| 10,094,218 B1 | 10/2018 | Hartmans |
| 10,145,243 B2 | 12/2018 | Ribbens et al. |
| 10,844,782 B1 | 11/2020 | Riley |
| 2005/0081818 A1 | 4/2005 | Mueller |
| 2006/0120910 A1 | 6/2006 | Lurtz |
| 2006/0150946 A1 | 7/2006 | Wright |
| 2009/0255506 A1 | 10/2009 | Walker |
| 2009/0308347 A1 | 12/2009 | Hathaway et al. |
| 2010/0116241 A1 | 5/2010 | Mistry |
| 2013/0139785 A1 | 6/2013 | Shkolnik et al. |
| 2013/0327291 A1 | 12/2013 | Pett, Jr. |
| 2013/0336829 A1 | 12/2013 | Steinbauer et al. |
| 2014/0238337 A1 | 8/2014 | Hruschka et al. |
| 2015/0308272 A1 | 10/2015 | Rolus Borgward |

FOREIGN PATENT DOCUMENTS

| | | |
|---|---|---|
| DE | 736114 | 6/1943 |
| KR | 10-20190130934 A | 11/2019 |
| WO | 2012159637 A2 | 11/2012 |

OTHER PUBLICATIONS

Clark, John M., et al, For Industry: Gas Turbine vs. Reciprocating; Naval Engineers Journal; Feb. 1967; vol. 79, Issue 1 (pp. 103-106).

Commercial Aviation Safety Team: CAST; "Fundamentals of Gas Turbine Engines";https://www.cast-safety.org/pdf/3_engine_fundamentals.pdf; last accessed Apr. 16, 2020.

"International Search Report and Written Opinion for International Application No. PCT/US2020/013933, Search completed Jun. 9, 2020, dated Jun. 9, 2020."

"Non-Final Office Action Received for U.S. Appl. No. 16/745,184, dated Jun. 23 2020".

"First Office Action received for China Application No. 202080000213.8, dated Feb. 22, 2022.".

"International Preliminary Report on Patentability for International Application PCT/US2020/013933, Report issued Feb. 8, 2022, dated Feb. 17, 2022.".

"Restriction Requirement Received for U.S. Appl. No. 17/389,239, dated Apr. 19, 2022.".

"International Search Report and Written Opinion for International Application No. PCT/US2021/043801 , Search completed on May 3, 2022 dated May 3, 2022.".

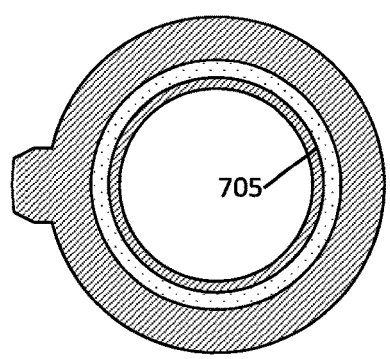
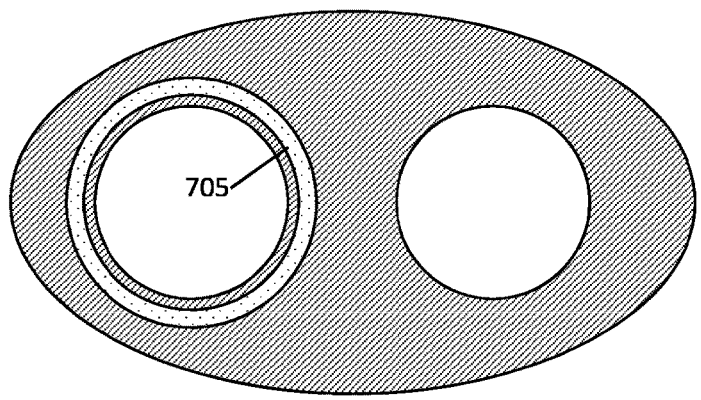
FIG. 80  FIG. 81
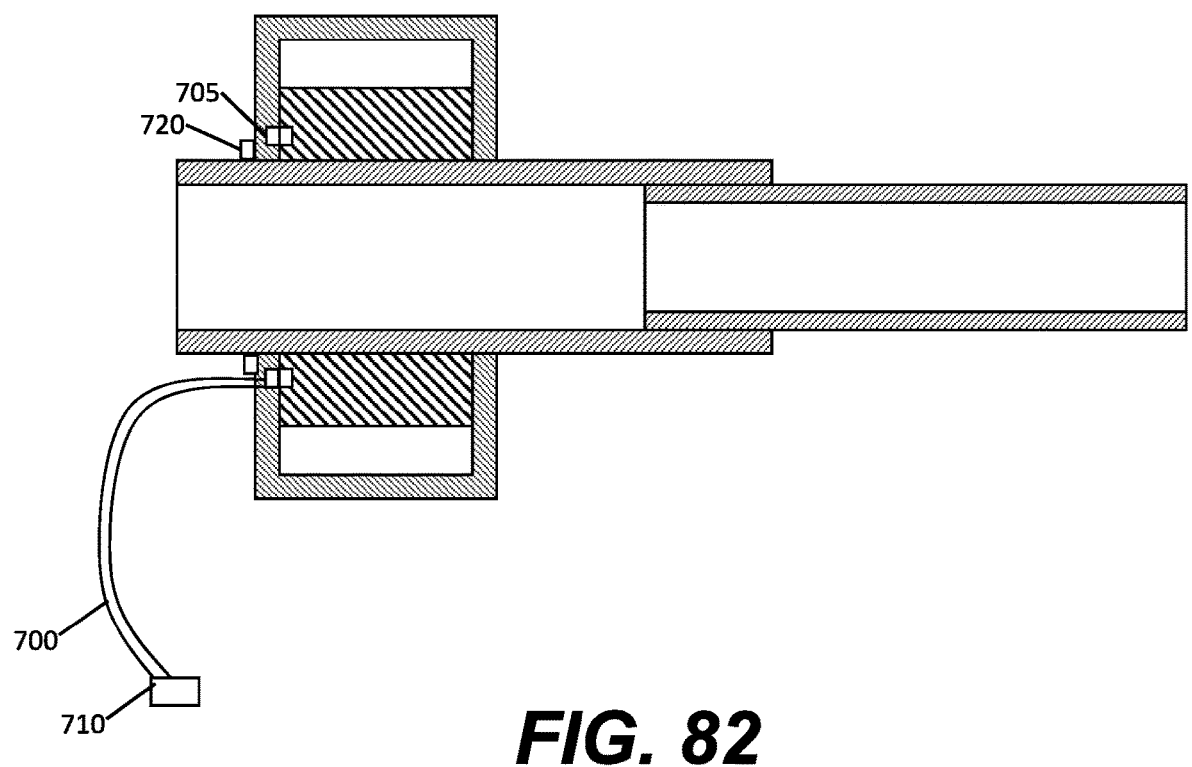
FIG. 82

ROTARY ENGINE, PARTS THEREOF, AND METHODS

CROSS-REFERENCE TO RELATED APPLICATIONS

This application claims priority pursuant to 35 U.S.C. 119(e) to U.S. Provisional Patent Application Ser. No. 62/884,771, filed Aug. 9, 2019, and 62/894,567, filed Aug. 30, 2019, the entire disclosures of which are incorporated herein by reference.

FIELD OF THE INVENTION

The present invention relates generally to engines. More specifically, the present invention is concerned with rotary engines, components thereof, and methods associated therewith.

BACKGROUND

Most existing internal combustion engines fall into two main categories—gas turbine engines and reciprocating engines—each with their own advantages and disadvantages. For instance, gas turbine engines have a very high power-to-weight ratio when compared to reciprocating engines. Gas turbine engines also tend to be smaller in size than equivalently-powered reciprocating engines. These advantages have led the aircraft industry to move almost exclusively (with the exception of smaller aircraft applications) to using gas turbine engines. Reciprocating engines, on the other hand, tend to be more fuel efficient and more responsive to changes in power settings. Reciprocating engines also tend to be less expensive than equivalently-powered gas turbine engines. These advantages have led the automotive industry to move almost exclusively to using reciprocating engines. While there are many differences between gas turbine engines and reciprocating engines, they each rely on fluid expansion associated with a combustion process.

Gas turbine engines, such as "jet" engines, utilize combustion of energy-rich fuel to generate heat energy, which in turn is utilized to power a turbine. More specifically, the heat energy from the combustion process is utilized to heat a volume of working fluid, thereby causing the working fluid to expand. The expanding working fluid is directed through blades of the turbine, thereby causing the turbine to rotate. Depending on the specific application of the gas turbine, the rotation of the turbine can be harnessed in a number of ways.

U.S. Pat. No. 2,168,726, the entire disclosure of which is incorporated herein by reference, teaches a "turbojet" having a turbine that powers a compressor. The compressor draws a stream of fluid (air) into a front portion of the turbojet and expels the fluid out a rear portion of the turbojet, thereby generating thrust. A portion of the stream of compressed fluid is diverted to a combustion chamber to enable a combustion process and to serve as the working fluid during a subsequent expansion process. After expanding through the turbine, thereby powering the compressor, the working fluid is rejoined with the main flow. The result is a high-velocity stream of exhaust gas ("jet propulsion").

U.S. Pat. No. 2,478,206 (to "Redding"), U.S. Pat. No. 2,504,414 (to "Hawthorne"), U.S. Pat. No. 2,505,660 (to "Baumann"), U.S. Pat. No. 2,526,409 (to "Price"), U.S. Pat. No. 2,526,941 (to "Fishbein"), U.S. Pat. No. 2,541,098 (to "Redding"), U.S. Pat. No. 2,702,985 (to "Howell"), and U.S. Pat. No. 3,153,907 (to "Griffith"), the entire disclosure of each being incorporated herein by reference, teach various configurations of a "turboprop". Generally speaking, a turboprop is similar to a turbojet except that a turboprop harnesses a large portion of the fluid flow to drive a propeller. Accordingly, the jet propulsion is reduced when compared with the jet propulsion of a turbojet. In a similar fashion, turboshafts (such as those used for powering helicopter rotors or electric generators) harness even more of the fluid flow, thereby further decreasing or even eliminating the jet propulsion. Conversely, "turbofans" (whether high-bypass or low-bypass) harness the fluid flow to drive a large fan for the purpose of increasing or otherwise altering the jet propulsion.

Reciprocating engines also utilize combustion of energy-rich fuel to generate heat energy, but this energy is used to expand a combustion chamber, not power a turbine. As the combustion chamber expands, a piston is driven linearly away from a top-dead-center position to a bottom-dead-center position. At some point, depending on the configuration of the engine, the expanding gas is exhausted from the cylinder so that more fuel and air (a "charge") can be drawn into the chamber for a subsequent combustion process. Reciprocating engines may utilize external compression sources (such as by way of a supercharger, a turbocharger, or the like), but compression is generally obtained by way of moving the piston from bottom-dead-center to top-dead-center prior to combustion. In this way, the piston reciprocates between bottom-dead-center and top-dead-center, giving the engine its name.

While the reciprocating action of a reciprocating engine increases costs and maintenance due to its complex mechanical motion (as opposed to the relatively simple rotation of a turbine), its combustion chamber is only subjected to intermittent periods of combustion, thereby allowing the combustion chamber to cool and/or preventing the combustion chamber from overheating. Conversely, gas turbine engines utilize continuous combustion (the combustion chamber of a gas turbine engine is sometimes referred to as a "burner"), often requiring expensive materials and routine maintenance to ensure that the engine can withstand the prolonged periods of high temperatures. Accordingly, it would be beneficial to have a system for and a method of enabling intermittent combustion without requiring complex mechanical motion.

Gas turbine engines operate using the Brayton cycle, which is a constant pressure cycle that requires a compressor, a burner (combustion chamber), and an expansion turbine. The efficiency of the Brayton cycle is highly dependent on the pressure inside the combustion chamber relative to environmental pressure. Reciprocating engines, on the other hand, generally operate using the Otto cycle or the Diesel cycle, the efficiency of each being highly dependent on the compression ratio of the same.

U.S. Pat. No. 367,496 (to "Atkins"), the entire disclosure of which is incorporated herein by reference, teaches a reciprocating engine having an expansion ratio that is larger than its compression ratio (Atkins teaches a 2 to 1 ratio was "found to give good results"), thereby utilizing a thermodynamic cycle now known as the Atkins cycle. While the Atkinson cycle provides improved fuel efficiency over a comparable Otto cycle engine, it suffers from loss of power at low speeds. U.S. Pat. No. 2,817,322 (to "Miller"), the entire disclosure of which is incorporated herein by reference, teaches a supercharged engine that "rejects" air from the cylinder during the compression stroke (such as by leaving a valve open during a first portion of the compression stroke) so that "substantially less air than the cylinders full volumetric capacity will be entrapped" during combustion. In this way, the Miller cycle obtains an expansion ratio that exceeds the compression ratio, similar to the Atkinson cycle without (or with less of) the power loss at low speeds. Unfortunately, the Miller cycle still suffers from inefficiencies, such as the general inefficiencies of a reciprocating engine and the specific inefficiencies associated with what is effectively an extended intake stroke of the Miller cycle. Consequently, it would be beneficial to have a system for and a method of maximizing efficiencies of an internal combustion engine.

SUMMARY

The present invention comprises a system for and a method of maximizing efficiencies in an internal combustion engine while minimizing costs and weight for the same and while also minimizing maintenance requirements for the same. The system includes a compression assembly for compressing fluid to a desired pressure for combustion (such as above 220 psi) and a tank assembly for holding a large volume of compressed fluid. A combustion assembly of the present invention is configured to receive a small portion of the compressed volume of air for each power stroke. In this way, the power stroke of the engine is independent of the compression stroke of the engine, thereby eliminating or otherwise minimizing transitional losses associated with the same.

Unlike gas turbines utilizing the Brayton cycle, the present invention utilizes a cycle (the "Riley cycle") that does not require continuous combustion to rotate a turbine. Instead, the Riley cycle enables intermittent combustion in association with maintaining continuous rotational motion without requiring reciprocating action. In this way, the Riley cycle realizes the benefits of reciprocating engines along with the benefits of gas turbine engines.

Unlike reciprocating engines using the Otto and Diesel cycles, the present invention does not require an expansion stroke to alternate with a compression stroke. Instead, the Riley cycle allows for repetitive expansion strokes, each expansion stroke being associated with a partial revolution of a power rotor. In this way, engines utilizing the Riley cycle are easier to produce, are more fuel efficient, and require less maintenance.

Like the Atkins cycle, the Riley cycle is capable of maximizing expansion ratios of the fuel; but unlike the Atkins cycle, the Riley cycle does not require complex reciprocating components. Instead, the Riley cycle is capable of maximizing expansion ratios by controlling the length of time an inlet valve is open, thereby controlling the size of a charge. In this way, the Riley cycle provides users with the flexibility to use alternative fuels and/or to change fuels if and as required and/or desired.

Like engines using the Miller cycle, the present invention controls efficiency of the system by controlling the amount of time an inlet valve remains open. But the Miller cycle obtains this benefit by maintaining the inlet valve in an open position while a compression chamber is shrinking. In other words, the Miller cycle obtains its efficiency by causing a portion of a charge to be expelled from a combustion chamber prior to compression of the charge. This approach necessarily requires the expelled portion of the charge to be first drawn into the chamber prior to being expelled from the chamber. The Riley cycle does not require expelling any portion of the charge. Instead, the Riley cycle obtains its efficiency by controlling the initial size of the charge (by controlling the timing for opening and inlet valve and by further controlling the amount of time the inlet valve is open), thereby eliminating the need to discharge any portion of the charge.

A combustion assembly of the present invention includes a power rotor having a first blade. Upon a first charge being ignited adjacent to the first blade, the first blade is driven towards an exhaust port, thereby driving the power rotor. The combustion assembly is configured such that movement of the first blade to the exhaust port maximizes usable energy (expansion) from the first charge. Upon the first blade moving past the exhaust port, the expanded fluid of the first charge exits through the exhaust port. In some embodiments, the power rotor includes a plurality of blades, including a second blade that is configured to expel the first charge through the exhaust port, such as following ignition of a second charge. In some embodiments, the first blade is configured to expel the first charge through the exhaust port, such as following ignition of a second charge.

The combustion assembly of the present invention further includes a first isolator rotor that is positioned behind the ignition point and is configured to prevent, or otherwise inhibit, expansion of charges away from a respective blade. In some embodiments, the first isolator rotor is positioned just beyond the exhaust port such that it prevents exhaust gasses from bypassing the exhaust port. In some embodiments, the combustion assembly includes a plurality of isolator rotors, including a second isolator rotor positioned just beyond the exhaust port such that it prevents exhaust gasses from bypassing the exhaust port. Each isolator rotor includes at least one receptacle for receiving one or more blade of the power rotor, thereby allowing the power rotor to rotate beyond the isolator rotors. In this way, the combustion assembly is capable of performing continuously repeating power strokes while also being capable of skipping one or more power stroke if and as desired or required.

The present invention improves upon and/or incorporates existing technologies. In some embodiments, the engine is capable of idling at 2,500 revolutions per minute. In some embodiments, the engine has a linear power and torque curve. In some embodiments, the engine redlines at or above 30,000 revolutions per minute. In some embodiments, the engine facilitates independent control over injection per cycle. In some embodiments, parasitic losses are dramatically reduced over existing technology. In some embodiments, the engine is capable of stratified injection and ignition. In some embodiments, the engine avoids issues associated with reciprocating probabilities. In some embodiments, the engine avoids issues associated with compressor stall. In some embodiments, the engine avoids issues associated with sealing. In some embodiments, the engine is capable of facilitating pre-chamber combustion. In some embodiments, the engine includes on the fly adaptive compression ratio capability, on the fly altitude compensation capability, and/or on the fly adaptive fuel technology. In some embodiments, the engine is air cooled. In some embodiments, heat signatures of the engine are virtually nonexistent. In some embodiments, the engine provides improved power to weight ratios and/or improved emissions when compared with existing technologies. In some embodiments, the engine operates while emitting virtually no NOx emissions.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 80 shows a rotor having a recessed region near its inner diameter.

FIG. 81 shows a portion of a housing having a recessed region near its inner diameter.

FIG. 82 shows the rotor of FIG. 80 positioned within the housing of FIG. 81 such that the recessed areas are aligned, a venting system being in fluid communication therewith.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
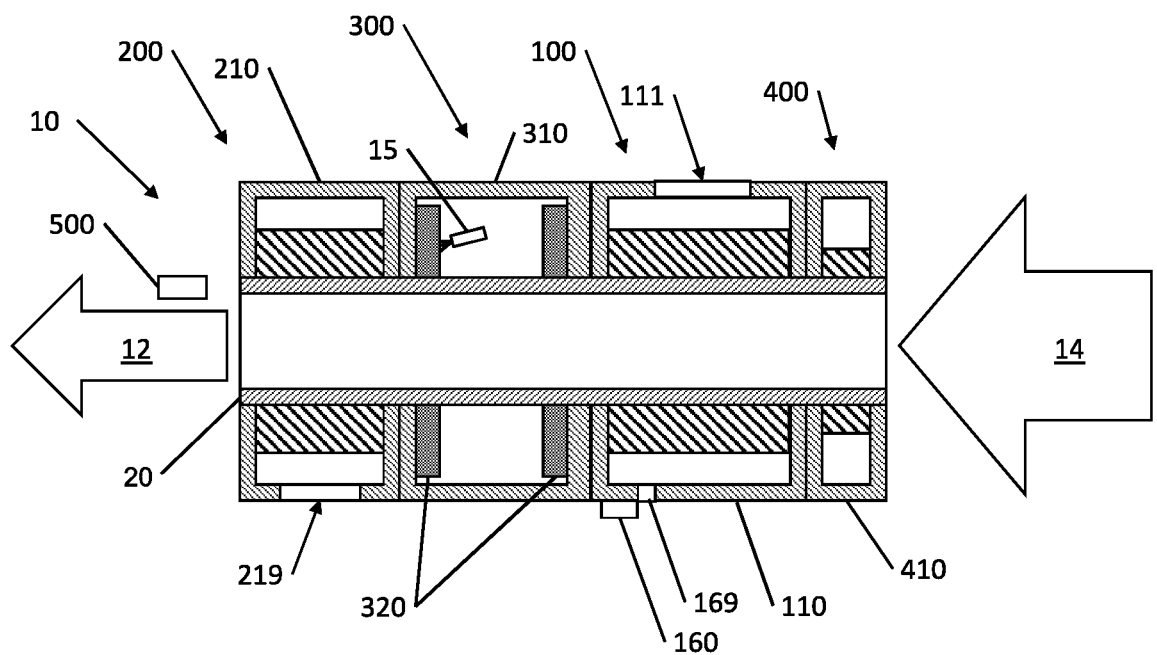
FIG. 1 is a sectional schematic view of an embodiment of the present invention, the embodiment having a tank assembly positioned between a compression assembly and a combustion assembly, the embodiment shown does not include an impeller.
Figure 2:
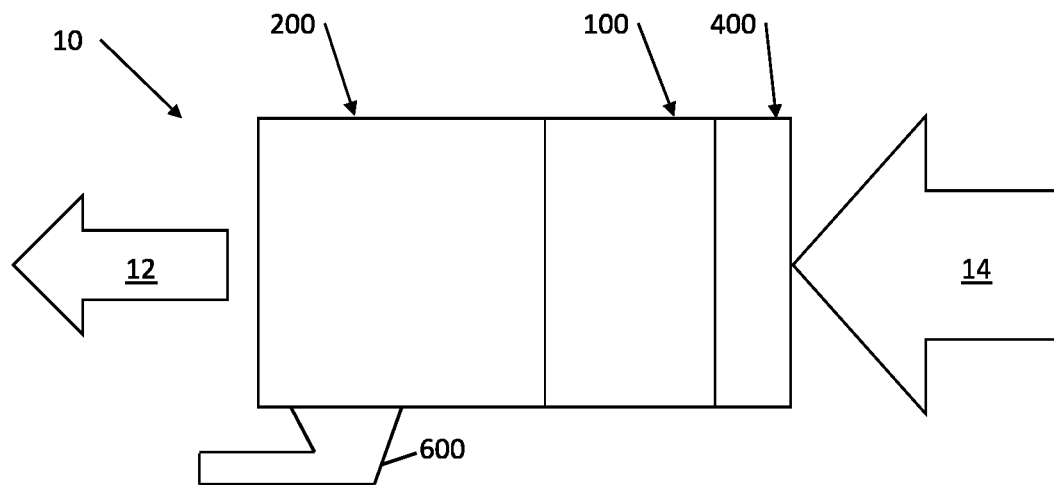
FIG. 2 is a schematic view of an embodiment of the present invention, the embodiment having a compression assembly positioned directly adjacent to a combustion assembly, the embodiment shown has an exhaust system extending in a direction of fluid flow around the engine.

Referring to FIGS. 1-2, certain embodiments of the present invention include an internal combustion engine 10 that is capable of generating jet propulsion 14. In some embodiments, at least part of the jet propulsion is generated by an impeller 13 that is configured to draw a stream of fluid ("bypass fluid") 12 through one or more drive shaft 20, synchronizing shaft 30, and/or the like. In some embodiments, one or more shaft extends through the engine such that heat energy from the engine is transferred to the bypass fluid, thereby cooling the engine. In some embodiments, the engine includes and/or is associated with one or more other cooling means (in addition to and/or instead of the aforementioned air cooling system), such as a water cooling system, a heat sink system, a separate air cooling system, or the like. In some embodiments, the present invention includes and/or is capable of working with an after burner system 500, such as those systems now known or later developed.

The engine 10 of the present invention includes a compression assembly 100 for compressing a compressible fluid ("air") from a first pressure ("inlet pressure") to a second pressure ("outlet pressure"). While the inlet pressure can be ambient air pressure, it will be understood that the inlet pressure can be higher or lower than the ambient air pressure. It will further be appreciated that some embodiments of the present invention are configured to supplement or replace the compression assembly 100 with one or more other compression means now known or later developed, such as a compression turbine, a centrifugal compressor, or the like. In some embodiments, the system includes and/or is associated with one or more turbo charger, super charger, or the like.

Referring to FIGS. 7-10, the compression assembly 100 includes a compression housing 110 and a compression rotor 120 positioned therein. The compression housing 110 defines an interior surface 112 and the compression rotor 120 defines a corresponding exterior surface 122 displaced therefrom such that the compression assembly defines at least one compression chamber 115 positioned therebetween. In some embodiments, the compression housing 110 includes a compression shroud 113 positioned between first 114 and second 116 compression plates. In some embodiments, the first compression plate 114 is parallel with the second compression plate 116. In some embodiments, the compression housing 110 defines one or more inlet port 111 and/or one or more outlet port 119, such as one or more port defined by a compression shroud 113 and/or one or more compression plate. In some embodiments, the inlet port is in fluid communication with a breather system, such as breather systems now known or later developed.

Referring to FIGS. 40-45, some embodiments of the present invention including a breather system 70 having one or more air scoop 72 for directing air or other fluids towards the compression assembly 100. In some embodiments, each air scoop 72 includes a front portion that is configured to receive a volume of air and direct it towards a tubing system in fluid communication with the compression assembly. In some embodiments, the air scoop 72 further includes a rear portion extending beyond the tubing system such that excess fluid and/or debris can be expelled from the air scoop, thereby preventing or otherwise inhibiting the same from entering the tubing system. In some embodiments, the air scoop 72 extends from an outer surface of an engine shroud 60, such as a cowl, a nacelle, or the like.

In some embodiments, the front portion of the air scoop 72 defines a first cross section and at least part of the second portion defines a second cross section that is smaller than the first cross section, thereby increasing fluid flow into the tubing system. In some embodiments, the tubing system includes a circumferential tube 74 extending at least partially around a circumference of the engine shroud 60. In some embodiments, the tubing system includes at least one radial tube 75 extending between the engine shroud 60 and the compression assembly 100. In some embodiments, one or more radial tube 75 provides structural support for retaining the internal combustion engine 10 in position relative to the engine shroud 60.

In some embodiments, a fan assembly is positioned at least partially within the shroud 60, such as a fan blade comprising a plurality of fan blades 62 extending from a fan hub 65. In some embodiments, the fan hub 65 defines an open center section that is configured to direct air towards the engine, such as towards an impeller 13 of the engine, an interior volume of one or more shaft of the engine, or the like. In some embodiments, an inner surface of the fan hub defines a curved slope such that a first sectional area at a distal end of the fan hub (i.e. a front end of the hub) is greater than a second sectional area displaced from the distal end of the fan hub (i.e. a rear end of the hub and/or an area between the rear end and the front end of the hub). In this way, the fan hub is capable of compressing air as it is directed towards an impeller, shaft, or other feature of the engine (i.e. ram induction or the like).

Referring again to FIGS. 7-10, the compression rotor 120 includes a compression member 125, such as a fin, a blade, or the like, extending from the exterior surface 122 of the compression rotor 120 towards the inner surface 112 of the compression housing 110, thereby defining a first end of a compression section of the chamber 115. The compression rotor 120 further includes an expansion member defining a second end of an intake section of the compression chamber 115. It will be understood that in some embodiments one or more compression member 125 of the compression rotor 120 also serves as an expansion member such that each compression member 125 separates a compression section from an adjacent intake section. In some embodiments, the housing 110 and compression rotor 120 are configured such that there is a small gap between the interior surface 112 of the compression housing 110 and a distal end of the compression member 125 (and/or expansion member, as applicable). The small gap is designed to provide clearance while minimizing airflow between adjacent compression and intake sections. It will be understood that certain sections of the compression chamber 115 alternate between being part of the intake section and the compression section as the compression rotor rotates within the compression housing.

As the compression rotor 120 rotates during an intake stroke, the expansion member moves away from a respective inlet port 111 such that the volume of the intake section of the compression chamber 115 increases, thereby increasing an amount of fluid therein. In some embodiments, the inlet port 111 is positioned at or near a first end of an intake section of the compression chamber. It will be understood that each intake stroke of an intake section can be performed simultaneously with a compression stroke of an adjacent compression section.

Figure 3:
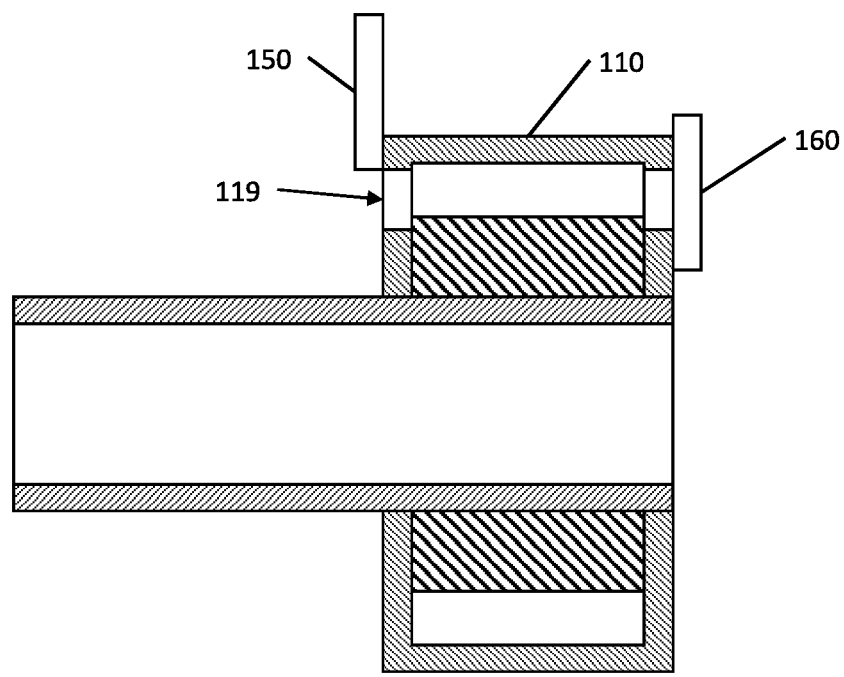
FIG. 3 is a schematic view of an embodiment of a compression assembly having a relief valve and an outlet valve, the relief valve being in a closed configuration and the outlet valve being in an open configuration.

As the compression rotor 120 rotates during a compression stroke, the compression member moves towards a respective outlet port 119 such that the volume of the compression section of the compression chamber 115 decreases, thereby increasing pressure therein. In some embodiments, the outlet port 119 is positioned at or near a second end of a compression section of the compression chamber. In some embodiments, the outlet port is movable between an open configuration and a closed configuration (such as by way of an outlet valve 150 or the like, Ref. FIG. 3), thereby preventing or otherwise inhibiting fluid from moving out of the compression section until the compression stroke is complete. In some embodiments, the outlet valve 150 is a slide valve, a ball valve, a rotary valve, or any other electro, mechanical, hydraulic, and/or other (now known or later developed) mechanisms and/or means, alone or in combination with one or more of the same.

In some embodiments, the compression assembly 100 includes one or more relief valve 160 for eliminating, or otherwise reducing, pressure build-up during a compression stroke, such as by selectively opening and closing a relief port 169 defined by the compression housing. In this way, the system is configured to selectively eliminate, or otherwise reduce, power requirements associated with compressing fluid when additional fluid compression is not required. In some embodiments, the relief port 169 is positioned towards a second end of a compression section of the chamber, such as at or near an outlet port 119. In some embodiments, opening the relief port causes the relief port to be in fluid communication with the atmosphere, thereby allowing excess pressure to vent to the atmosphere. In some embodiments, opening the relief port causes the relief port to be in fluid communication with a holding vessel, such as a low-pressure holding vessel, thereby facilitating storage of the fluid. In some embodiments, the compression assembly includes a plurality of relief ports and/or relief valves.

Figure 4:
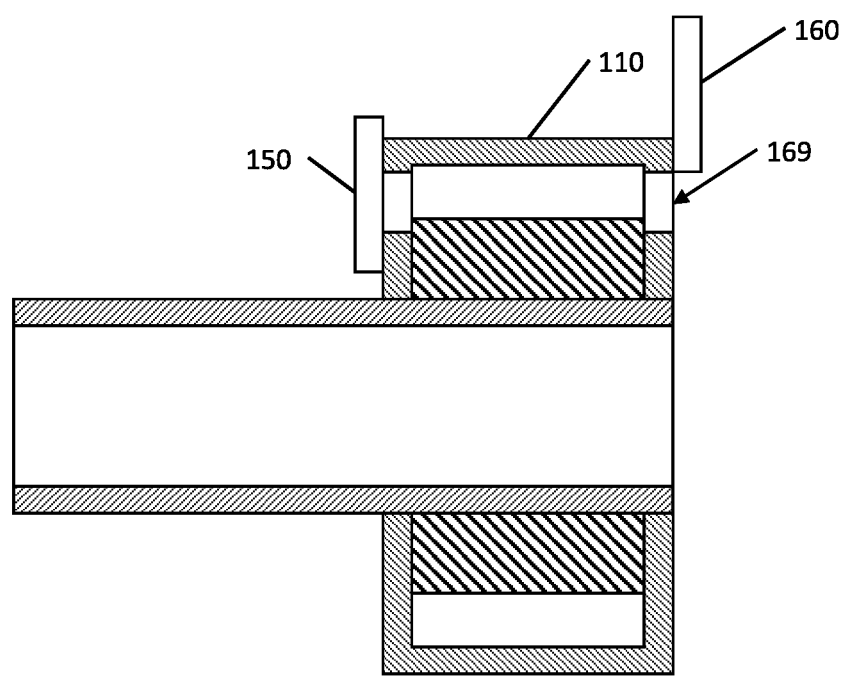
FIG. 4 is a schematic view of an embodiment of a compression assembly having a relief valve and an outlet valve, the relief valve being in an open configuration and the outlet valve being in a closed configuration.

Referencing FIGS. 3 and 4, some embodiments of the present invention, such as those discussed below where one or more rotor is/are utilized to effectively open and close an outlet port, include at least one relief port 169 that is diametrically opposed to an outlet port 119. In some embodiments, a profile of the relief port 169 is configured so as to minimize trapped air during a compression cycle. In some embodiments, a profile of the relief port 169 matches a profile of an opposed outlet port 119. In some embodiments, a relief valve 160 is synchronized with an outlet port such that only one of the relief port and the outlet port are open at any given time, thereby preventing venting of a tank assembly 300 through the relief port 169. In other embodiments, opening the relief port 169 and the outlet port 119 at the same time facilitates venting of a tank assembly 300 through the compression assembly 100.

Referring again to FIGS. 7-10, the compression assembly 100 includes one or more isolator 130, for further segmenting the compression chamber 115. Each isolator 130 defines an exterior surface 132 and one or more receptacle 135 recessed therefrom. Each isolator rotor is positioned and timed relative to a respective compression rotor such that the receptacle is capable of receiving the compression member, thereby allowing the compression member to move between sections of the compression chamber. It will be appreciated that certain embodiments of the present invention include varying numbers of isolator rotors, compression members, and the like, to accommodate sizing, power, and timing requirements and/or preferences. It will further be appreciated that certain embodiments of the present invention include compression members having varying sizes and configurations, such as rounded, squared, angular fillets, gussets, or the like.

Each receptacle 135 of the isolator rotor is configured to receive a compression member at the end of a compression stroke, thereby enabling the compression member to move beyond the second end of the compression section of the compression chamber. At all other times, the outer surface of the isolator is positioned adjacent to the outer surface of the compression rotor (small gap as discussed above) so as to define the front end of the compression section of the compression chamber. In some embodiments, the isolator further defines a first end of an inlet section of the compression chamber.

In some embodiments, each section of the compression chamber is in constant fluidic communication with each adjacent section, such as through respective gaps between the rotors and/or between the rotors and the housing. In this way, the system provides constant fluidic communication between the same while facilitating compression generation and fluid intake. In some embodiments, the housing includes an inlet port 111 positioned just past each isolator. As a compression (or other) member passes a corresponding inlet port, the resulting vacuum causes fluid to flow into the inlet section of the compression chamber.

In some embodiments, the housing includes an outlet port 119 positioned just prior to each isolator. As a compression member passes a corresponding outlet port, the corresponding compression chamber is closed. In some embodiments, one or more valve (such as a reed valve, a rotary valve, or the like) is associated with the outlet port so as to facilitate fluid flow through the outlet port just prior to the compression section being closed (when pressure is at a maximum). In some embodiments, the compression assembly is configured to prevent or otherwise inhibit fluid flow through the outlet port at other times.

Figure 11:
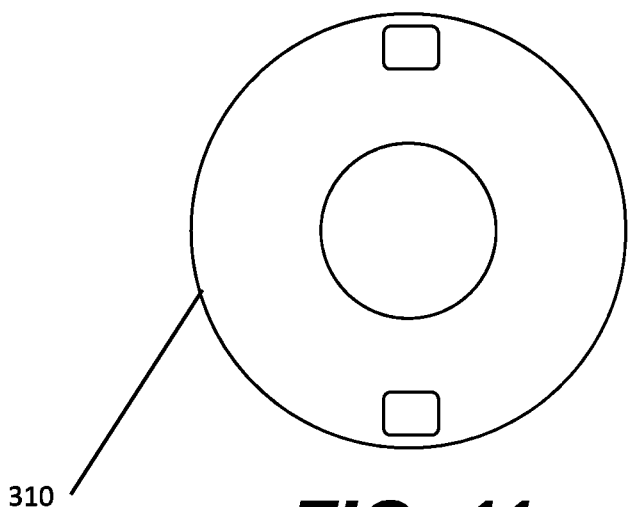
FIG. 11 is an end view of a rotary valve of the present invention
Figure 12:
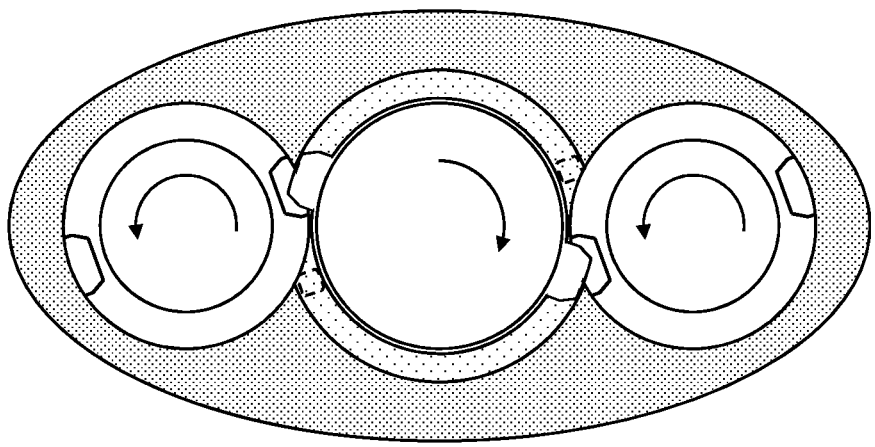
FIG. 12 is a sectional view of a compression assembly of the present invention, the compression assembly being shown prior to an initial intake stroke.
Figure 13:
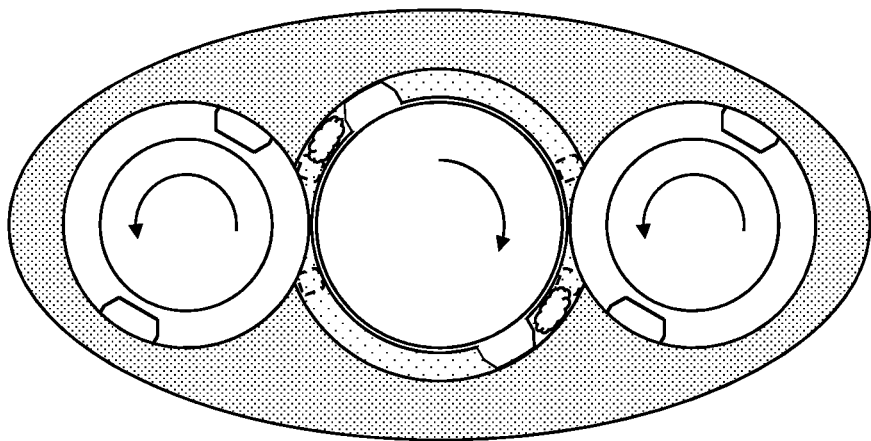
FIGS. 13-16 each show the same sectional view of FIG. 12 at different times during the initial intake stroke.
Figure 14:
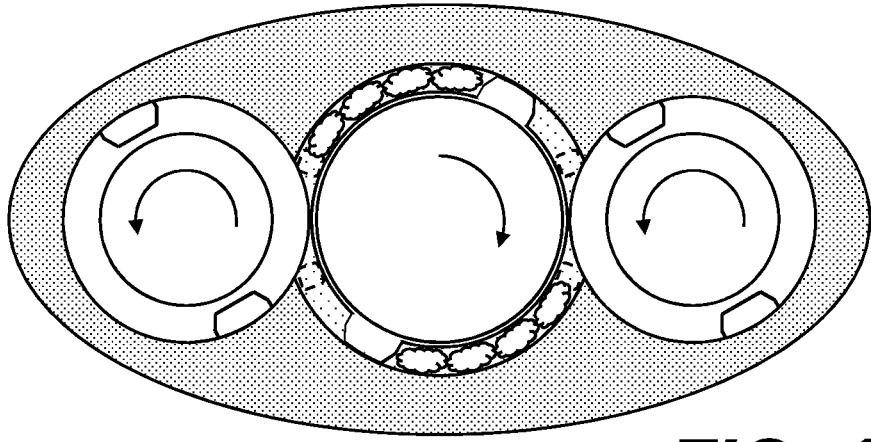
Figure 15:
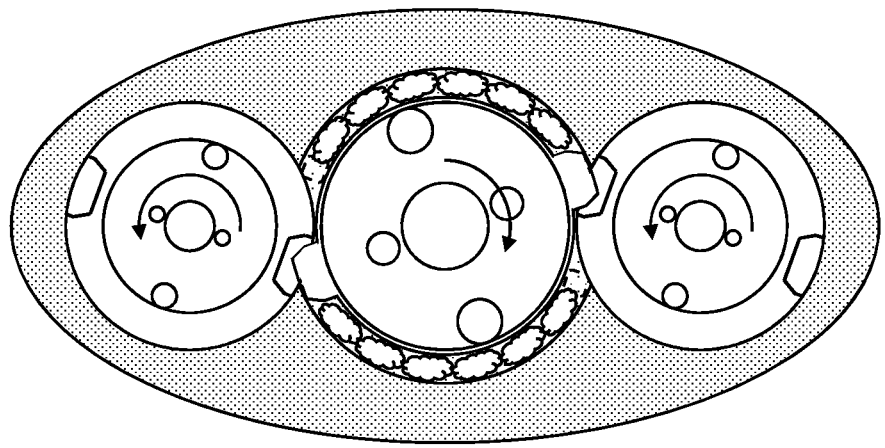
Figure 16:
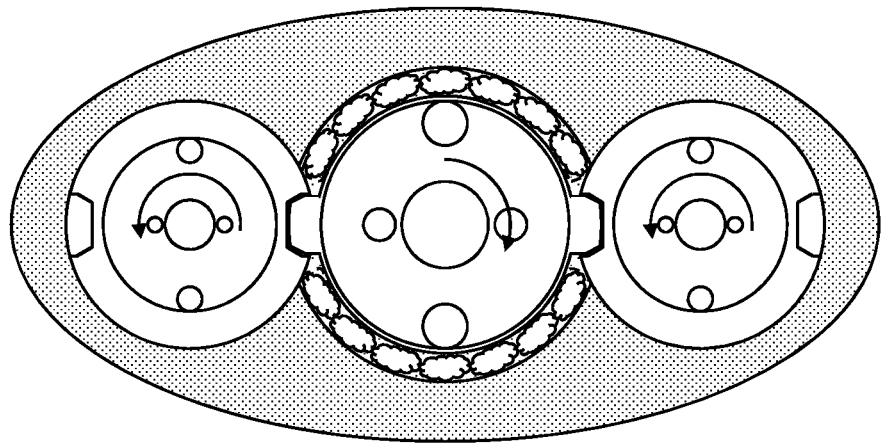
Figure 17:
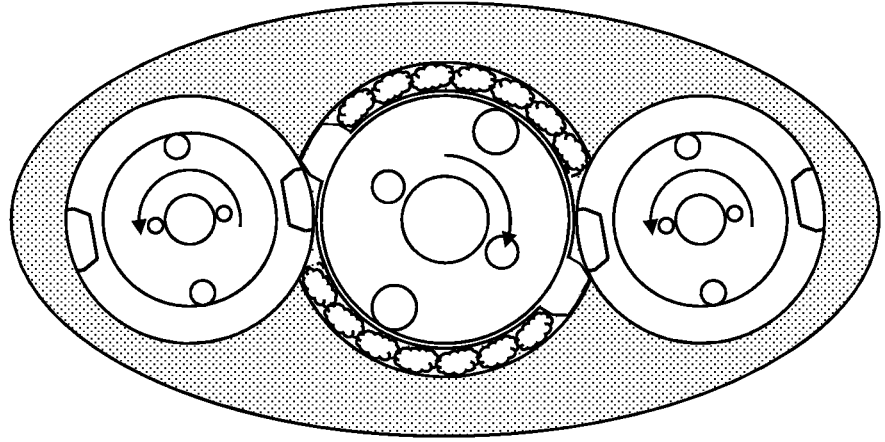
FIGS. 17-20 each show the same sectional view of FIG. 12 at different times during an initial compression stroke.
Figure 18:
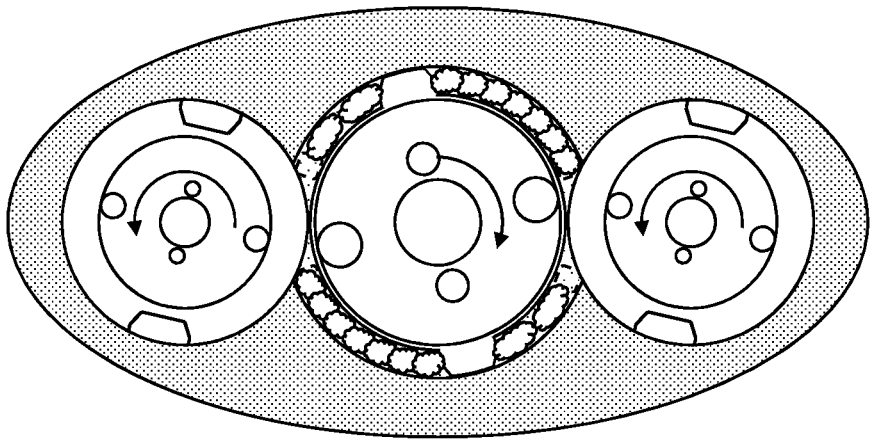
Figure 19:
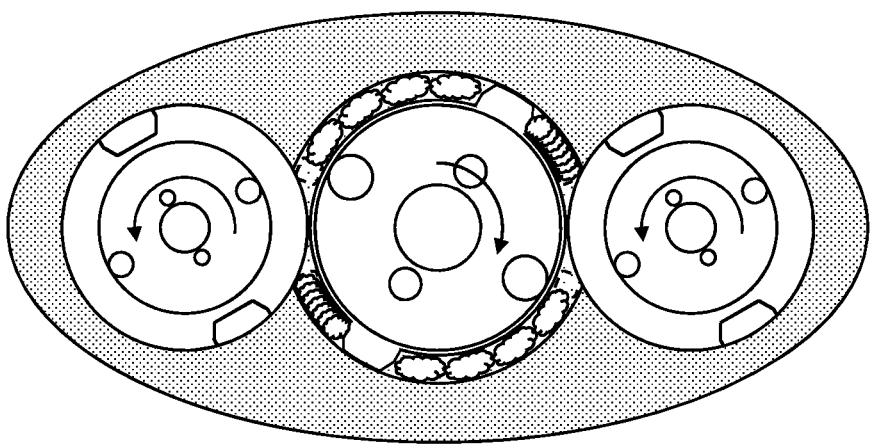
Figure 20:
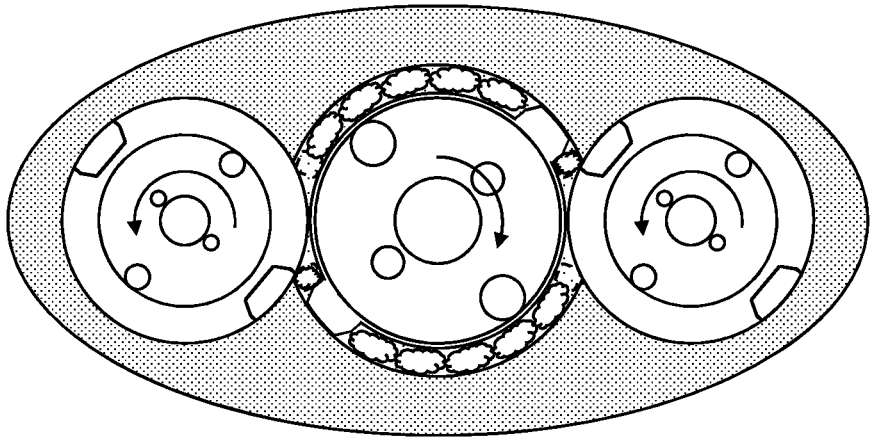
Figure 21:
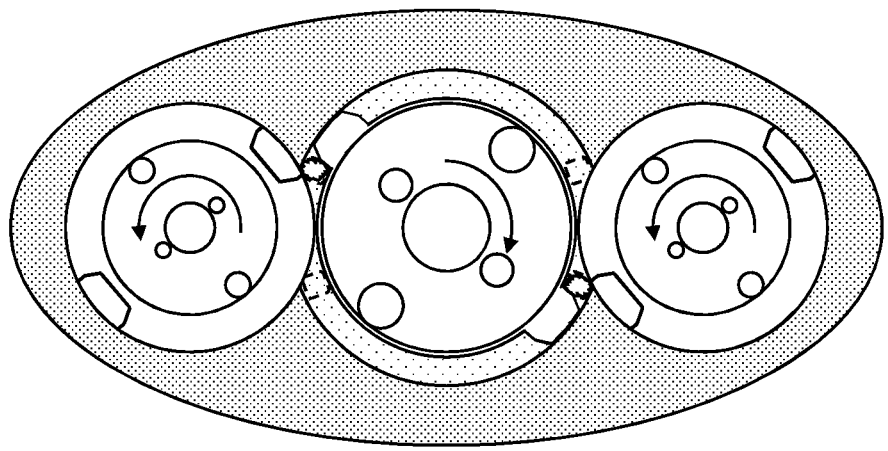
FIG. 21 is a sectional view of a combustion assembly of the present invention, the combustion assembly being shown prior to an initial power stroke.
Figure 22:
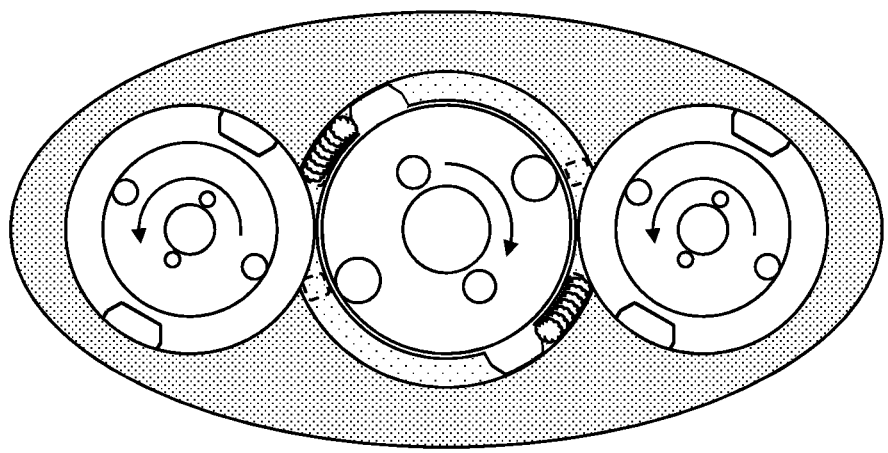
FIGS. 22-25 each show the same sectional view of FIG. 21 at different times during the initial power stroke.
Figure 23:
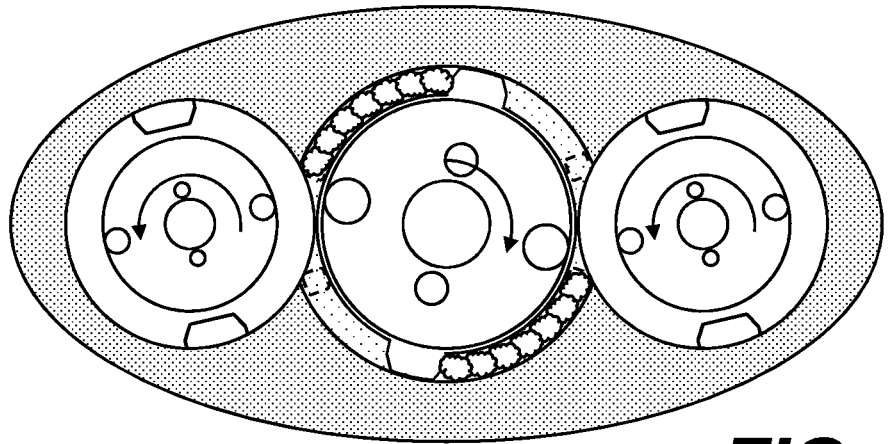
Figure 24:
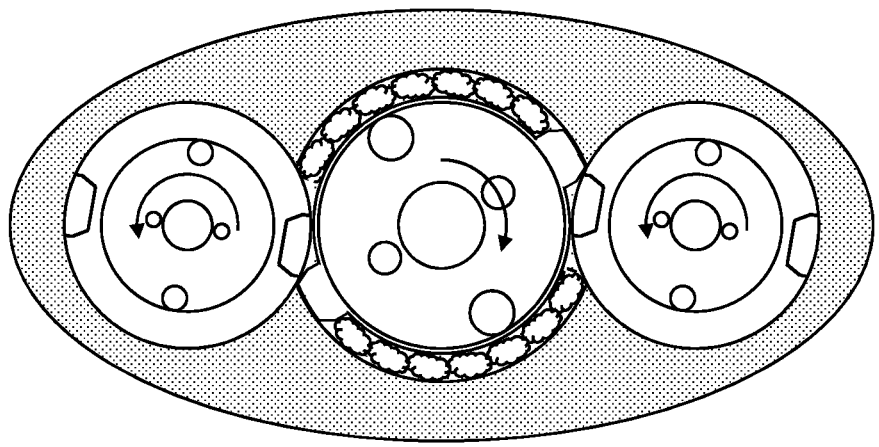
Figure 25:
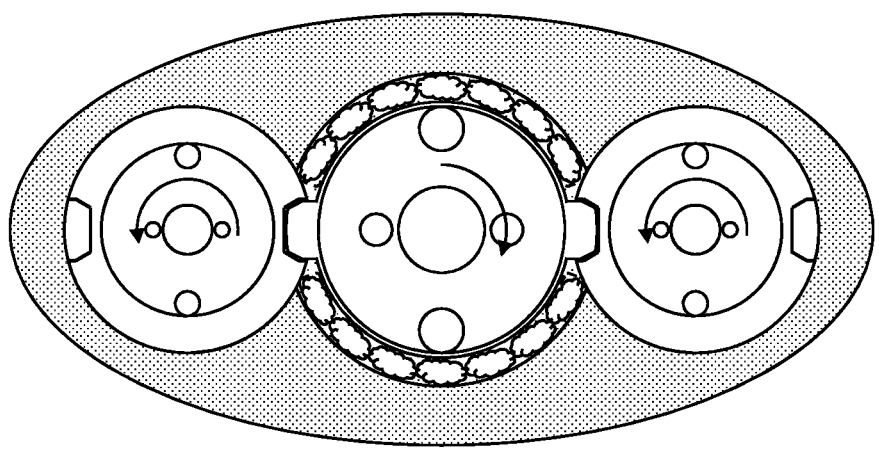
Figure 26:
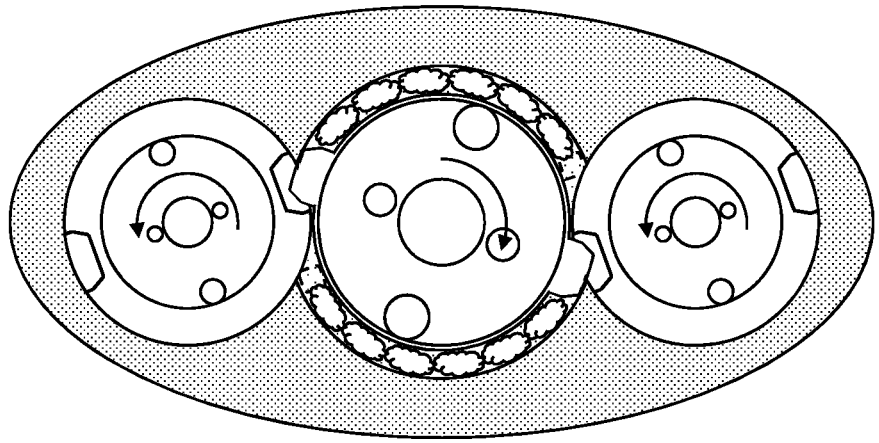
FIGS. 26-29 each show the same sectional view of FIG. 21 at different times during an initial exhaust stroke.
Figure 27:
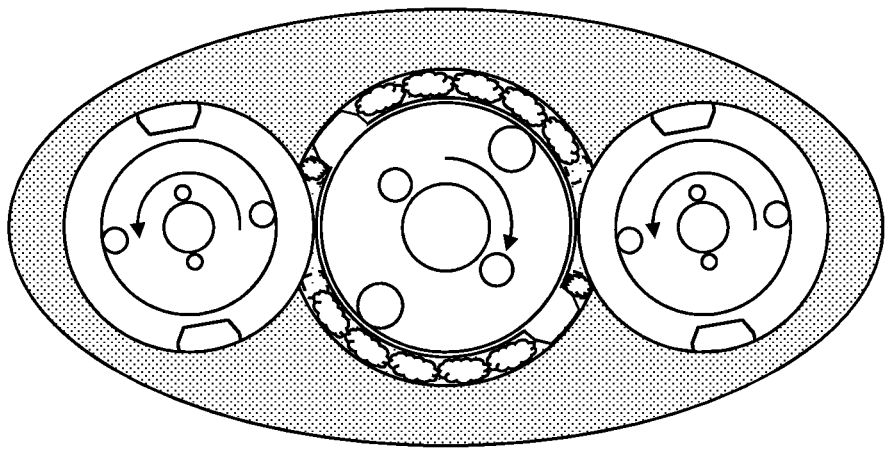
Figure 28:
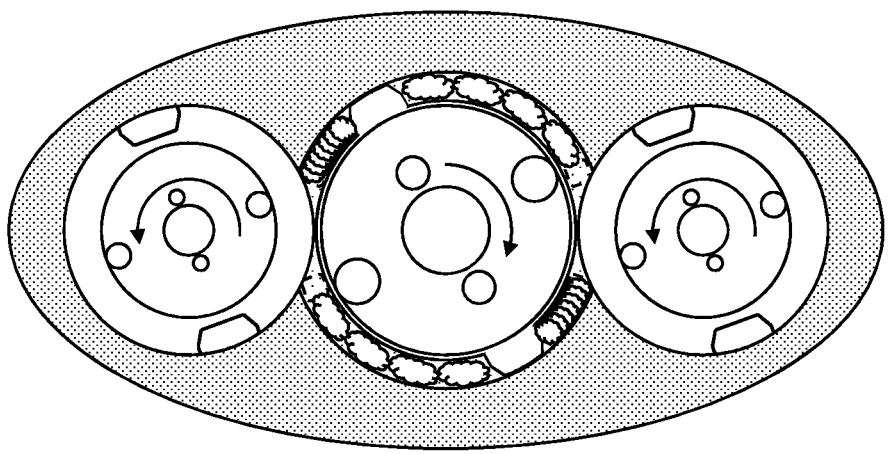
Figure 29:
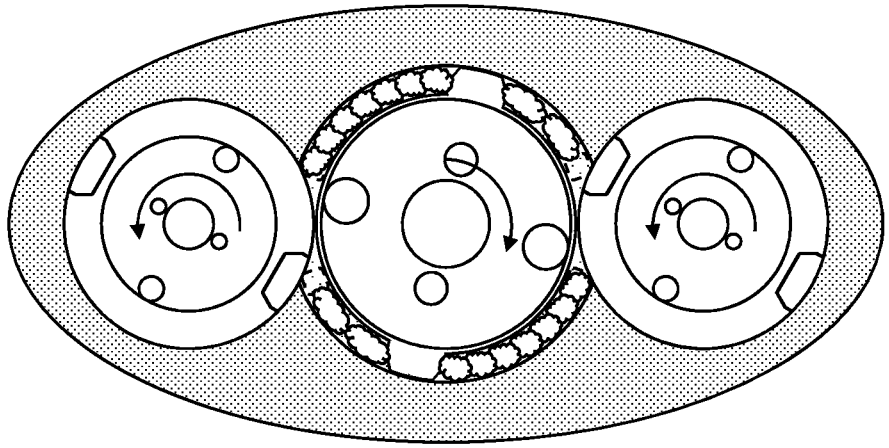
Figure 30:
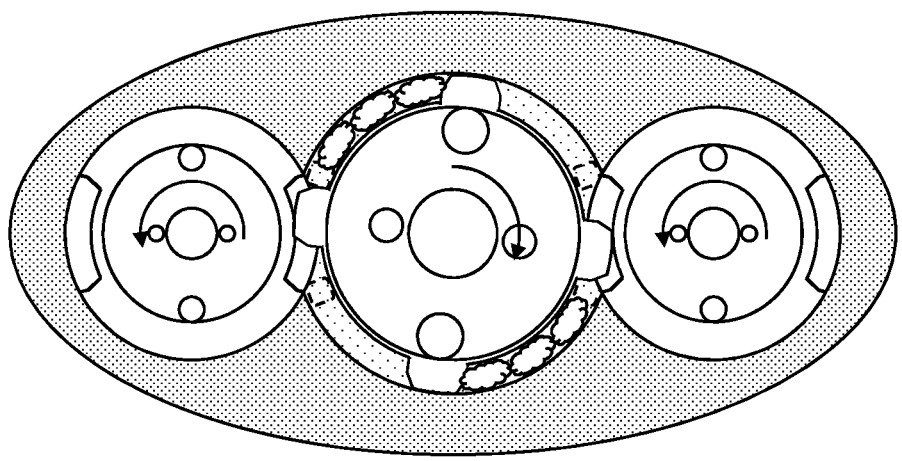
FIGS. 30 and 31 each show a sectional view of a compression assembly of the present invention, certain embodiments of combustion assemblies having substantially the same configuration.
Figure 31:
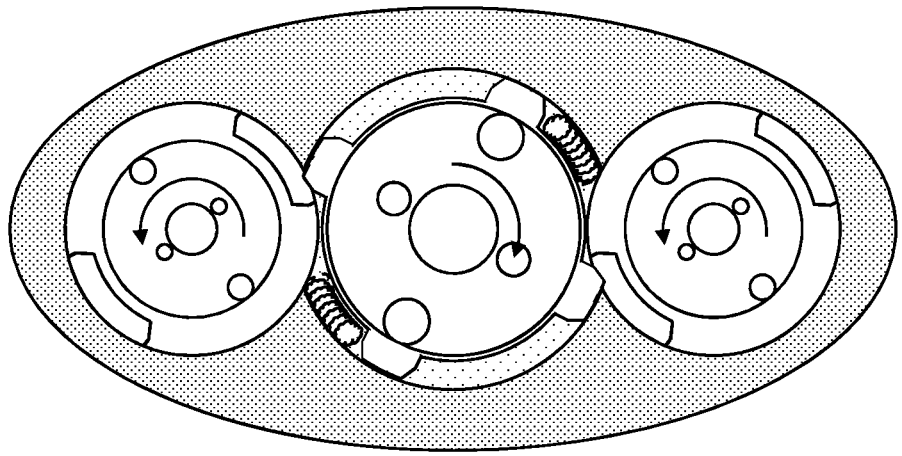
Figure 32:
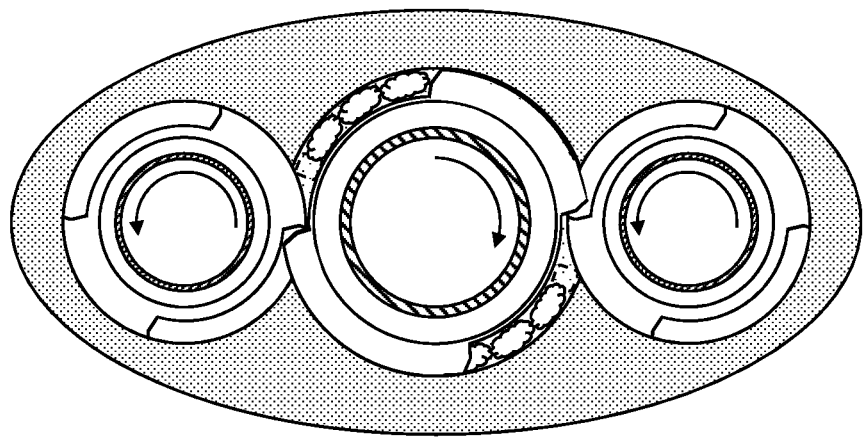
FIGS. 32 and 33 each show a sectional view of a compression assembly of the present invention, certain embodiments of combustion assemblies having substantially the same configuration.
Figure 33:
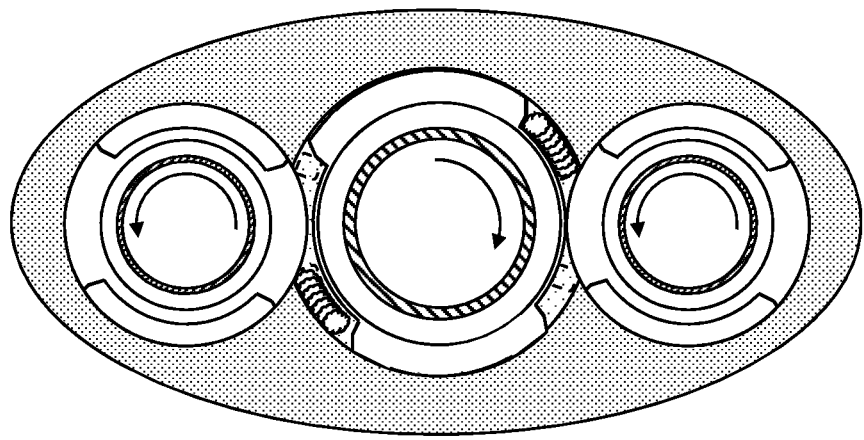
Figure 34:
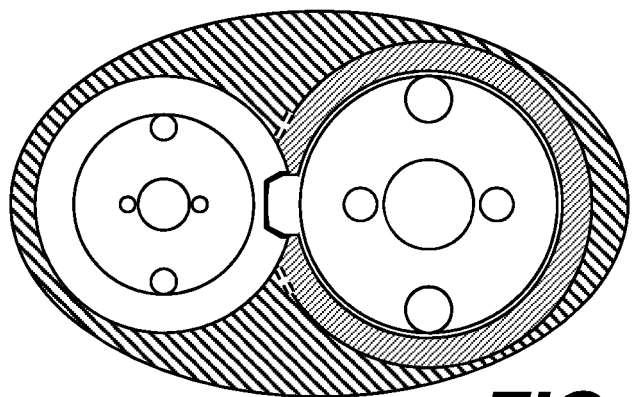
FIG. 34 shows a sectional view of a compression assembly of the present invention.
Figure 35:
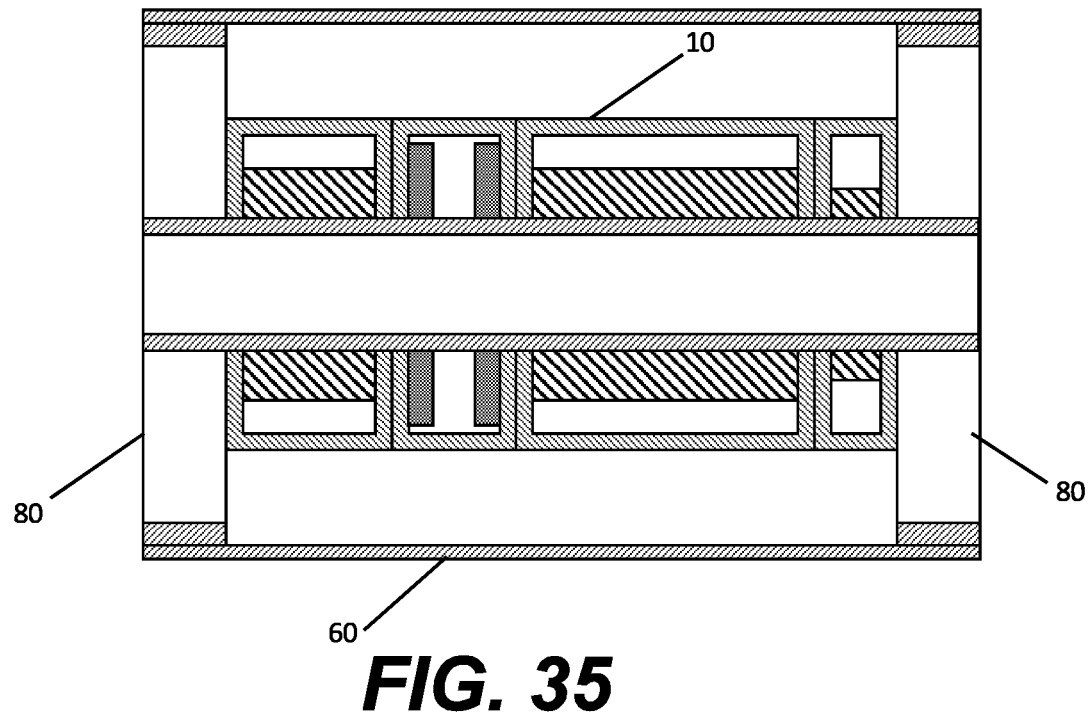
FIG. 35 is a sectional schematic view of an embodiment of the present invention, the embodiment having opposed fore and aft fan assemblies and a shroud extending therebetween.
Figure 36:
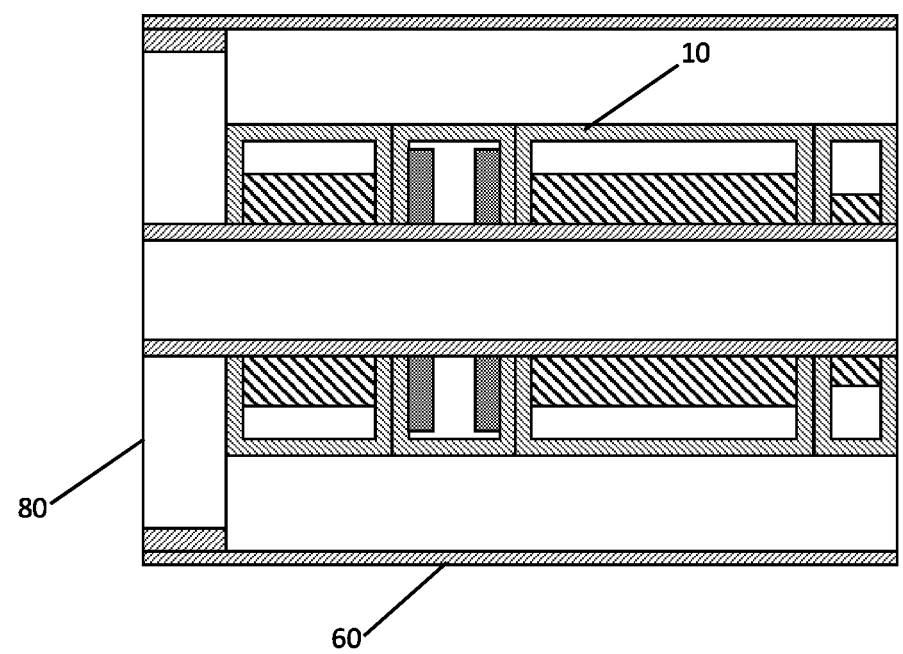
FIG. 36 is a sectional schematic view of an embodiment of the present invention, the embodiment having an aft fan assembly and a shroud extending therefrom.
Figure 37:
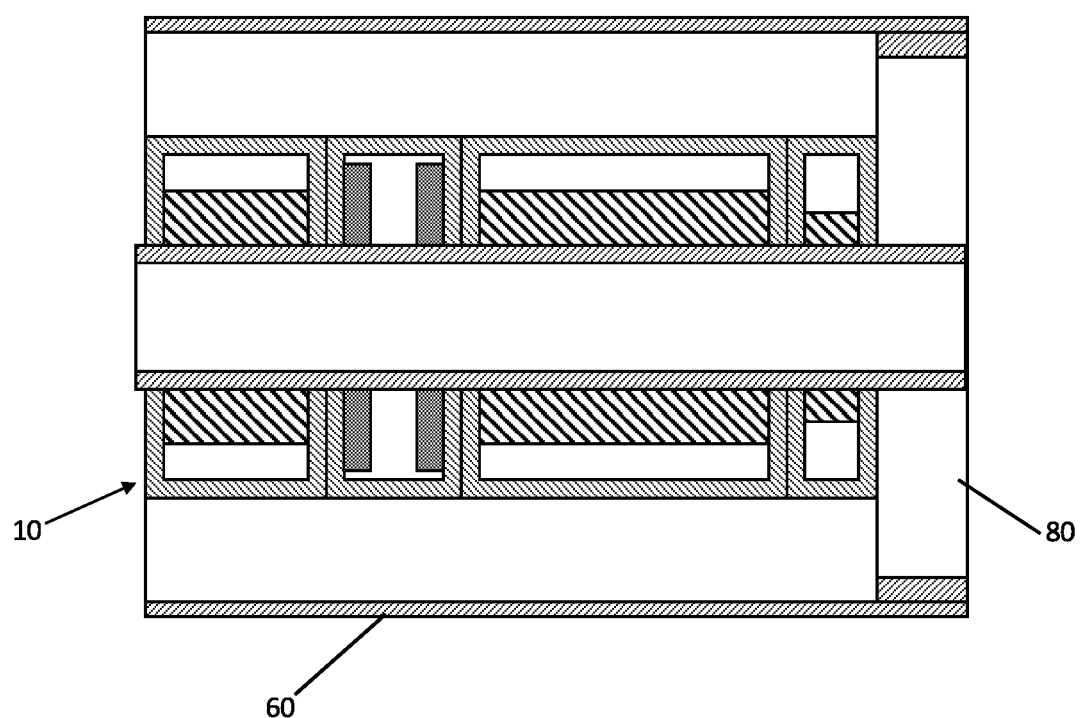
FIG. 37 is a sectional schematic view of an embodiment of the present invention, the embodiment having a fore fan assembly and a shroud extending therefrom.
Figure 38:
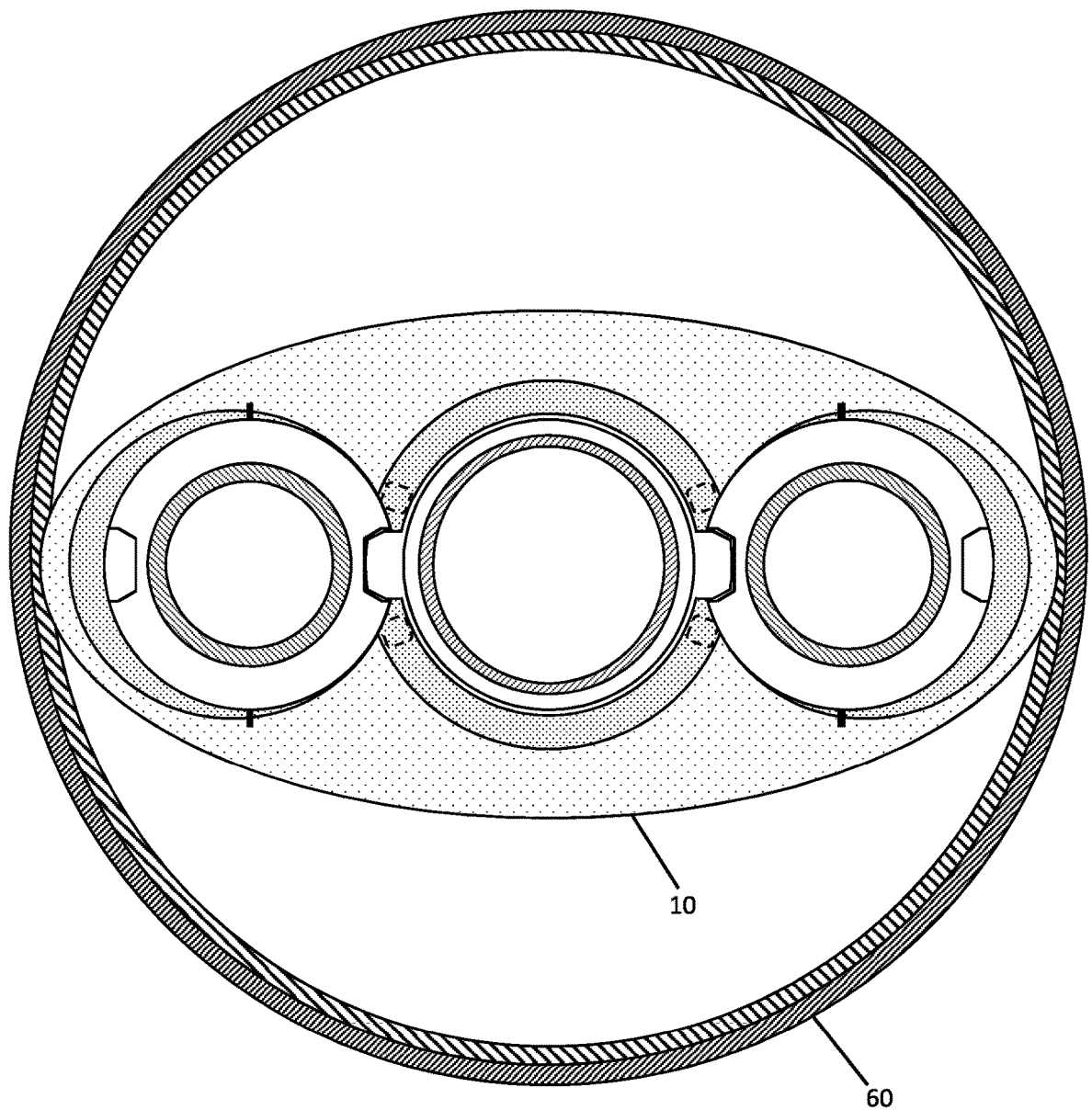
FIG. 38 shows a sectional view of an embodiment of the systems of FIG. 35, FIG. 36, or FIG. 37.
Figure 39:
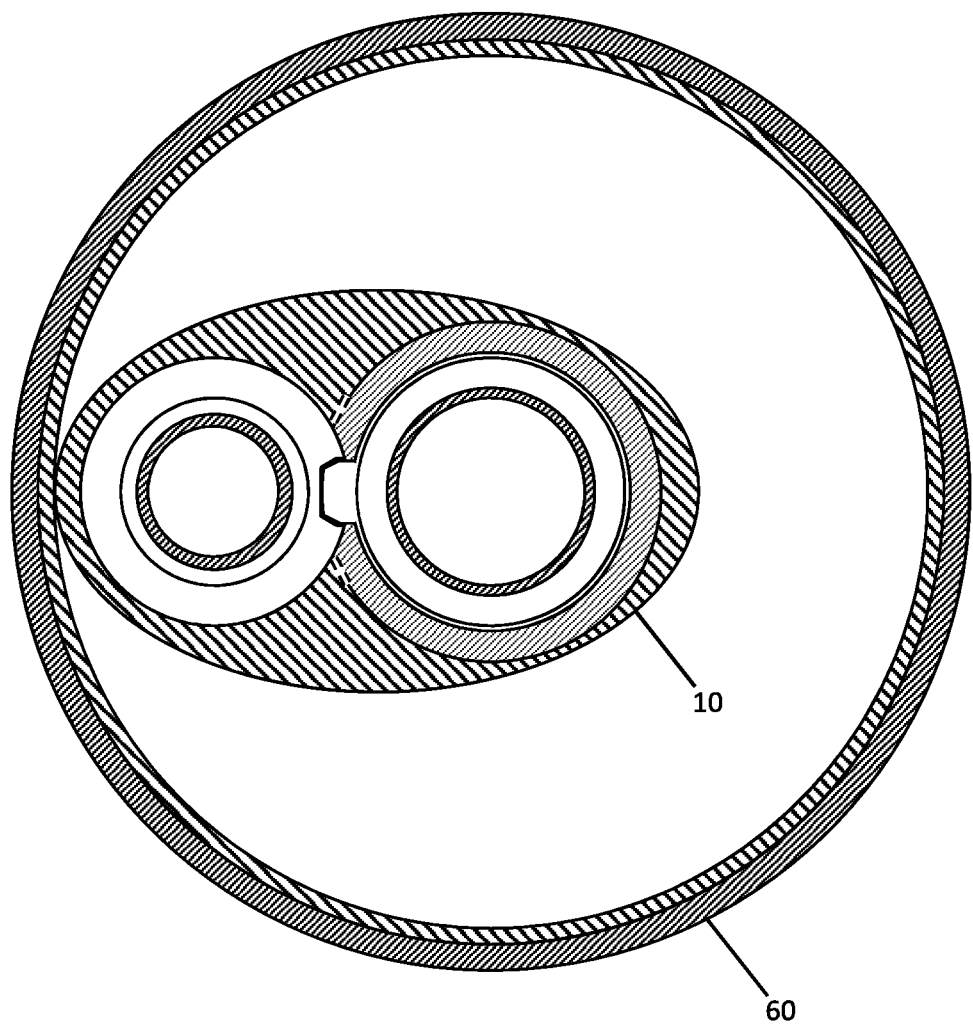
FIG. 39 shows a sectional view of an embodiment of the systems of FIG. 35, FIG. 36, or FIG. 37.
Figure 40:
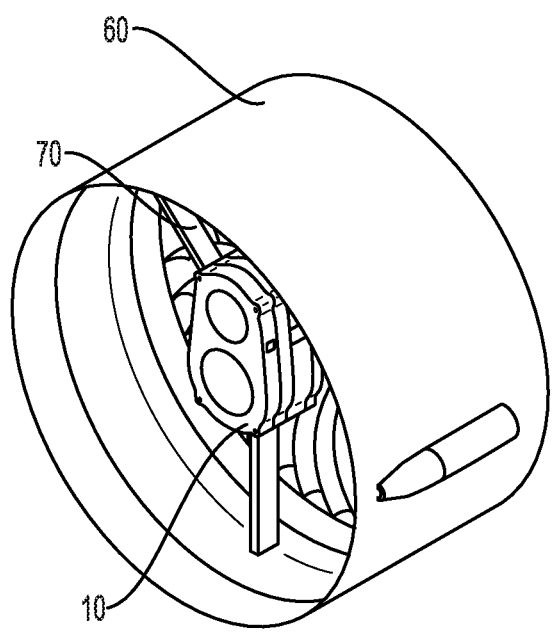
FIG. 40 is an isometric view of an embodiment of an engine assembly of the present invention.
Figure 41:
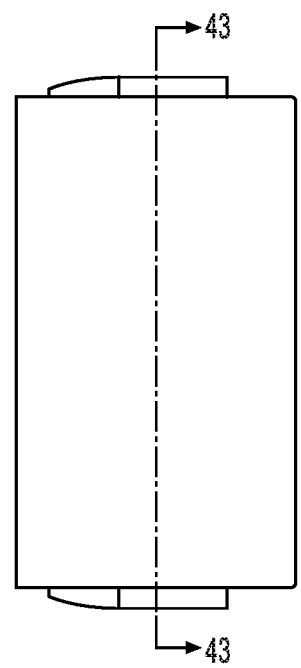
FIG. 41 is a top view of the engine assembly of FIG. 40.
Figure 42:
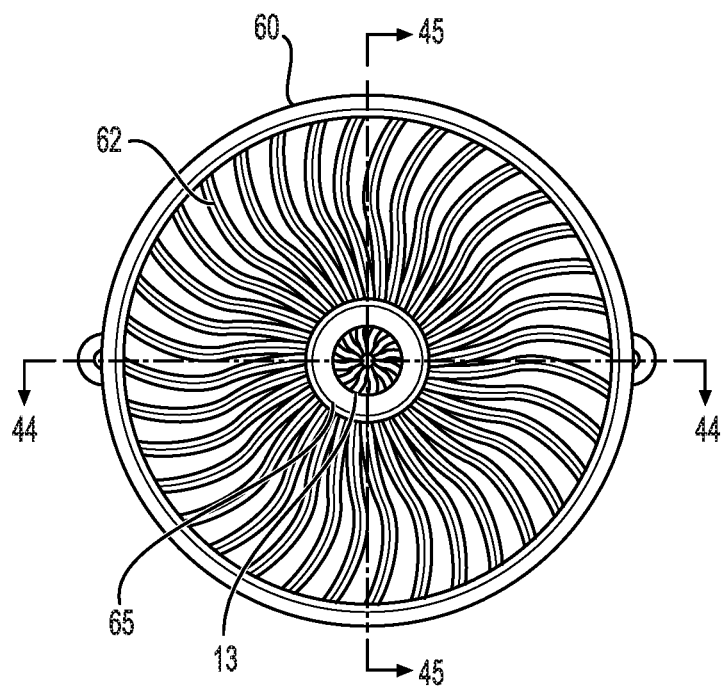
FIG. 42 is a front view of the engine assembly of FIG. 40.
Figure 43:
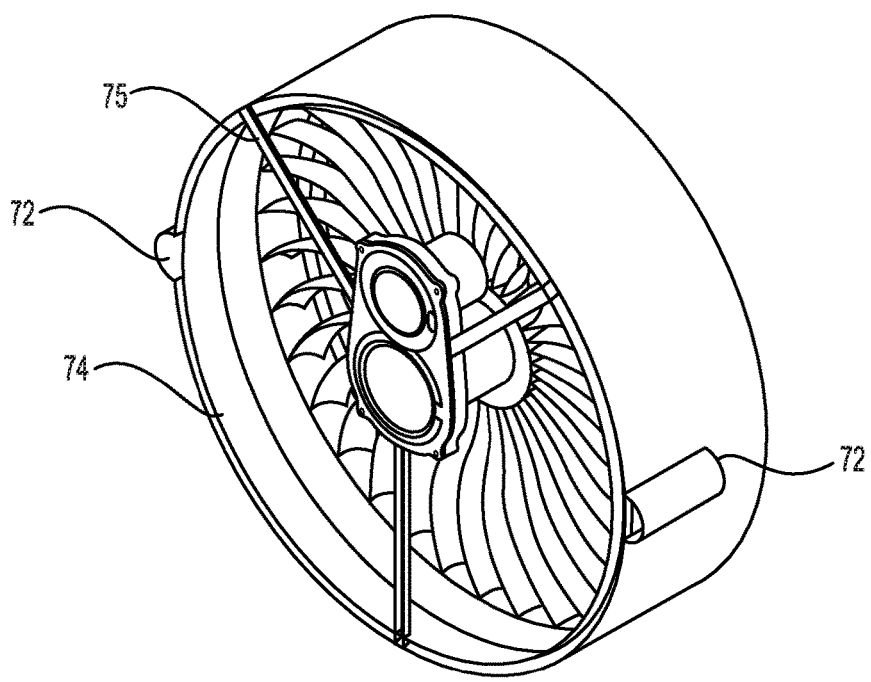
FIG. 43 is an isometric sectional view of the engine assembly of FIG. 40, the engine assembly being cut along line 43-43 of FIG. 41.
Figure 44:
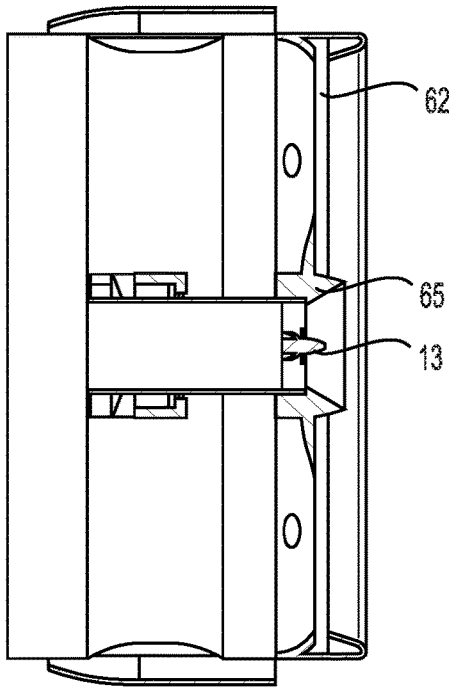
FIG. 44 is a top sectional view of the engine assembly of FIG. 40, the engine assembly being cut along line 44-44 of FIG. 42.
Figure 45:
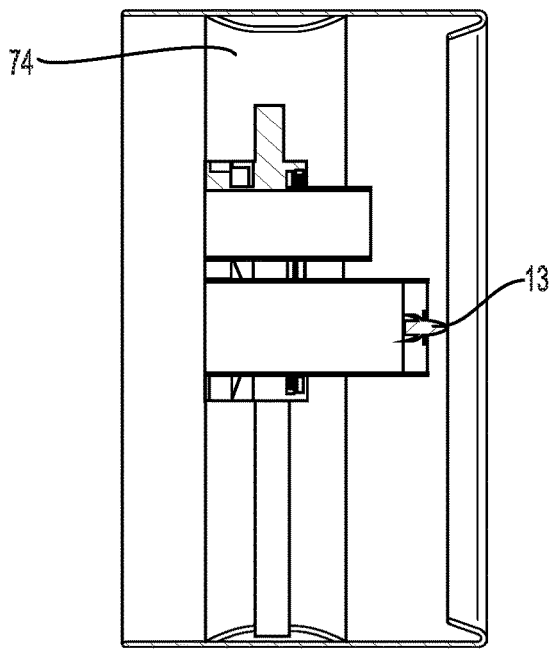
FIG. 45 is a side sectional view of the engine assembly of FIG. 40, the engine assembly being cut along line 45-45 of FIG. 42, the fan assembly being removed for clarity.
Figure 46:
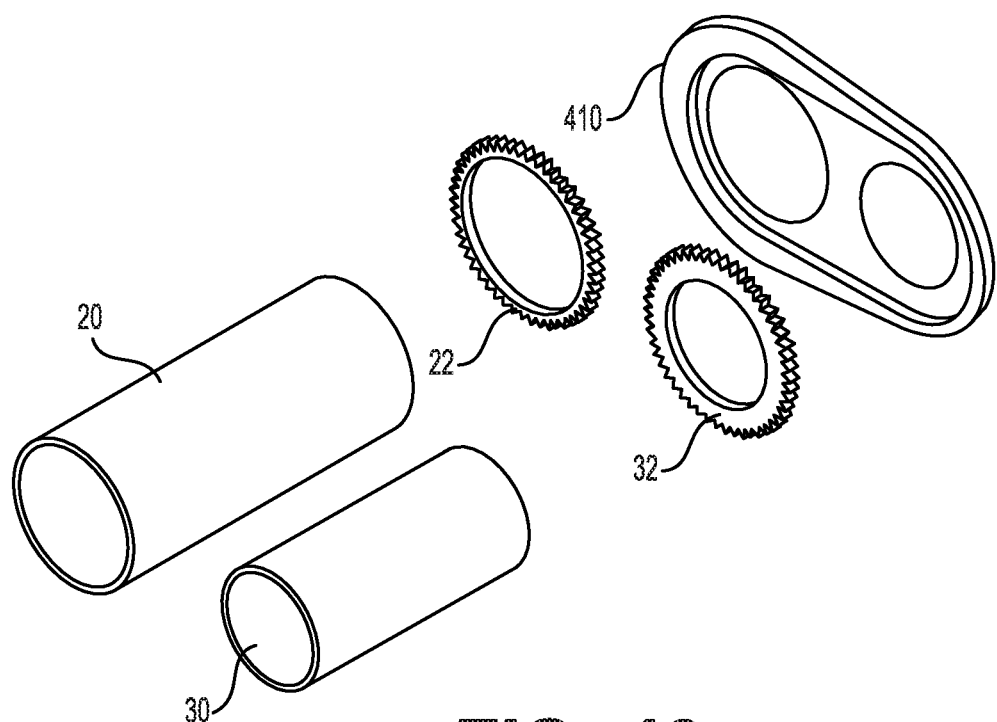
FIGS. 46-53 are exploded perspective view of an engine of the present invention, certain components being admitted from each view for clarity.
Figure 47:
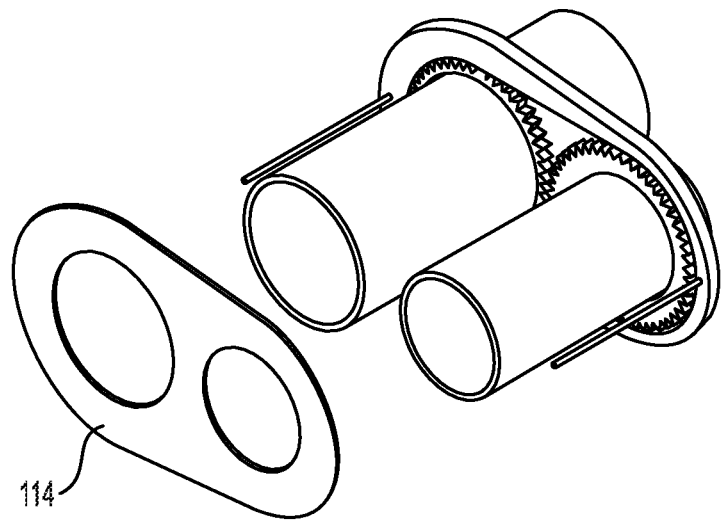
Figure 48:
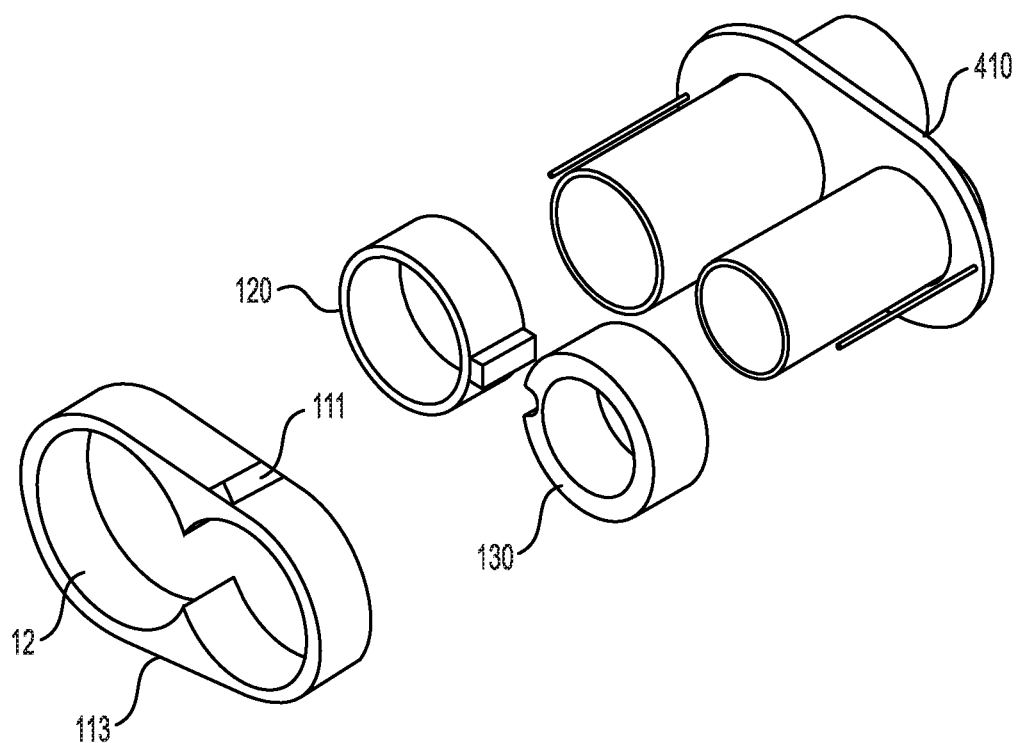
Figure 49:
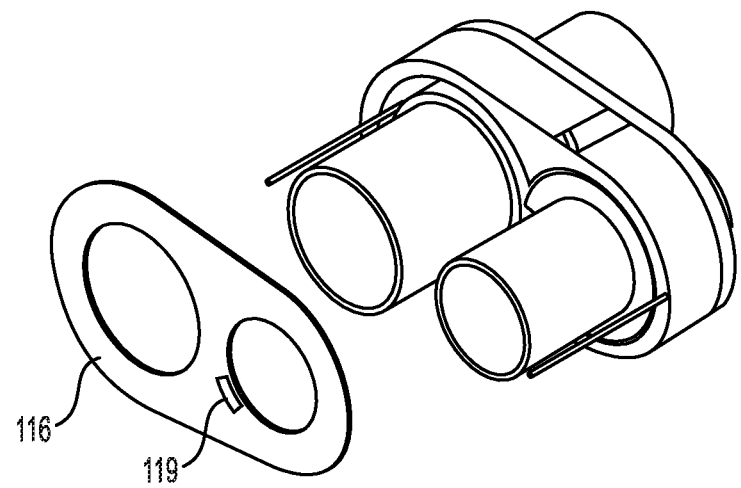
Figure 50:
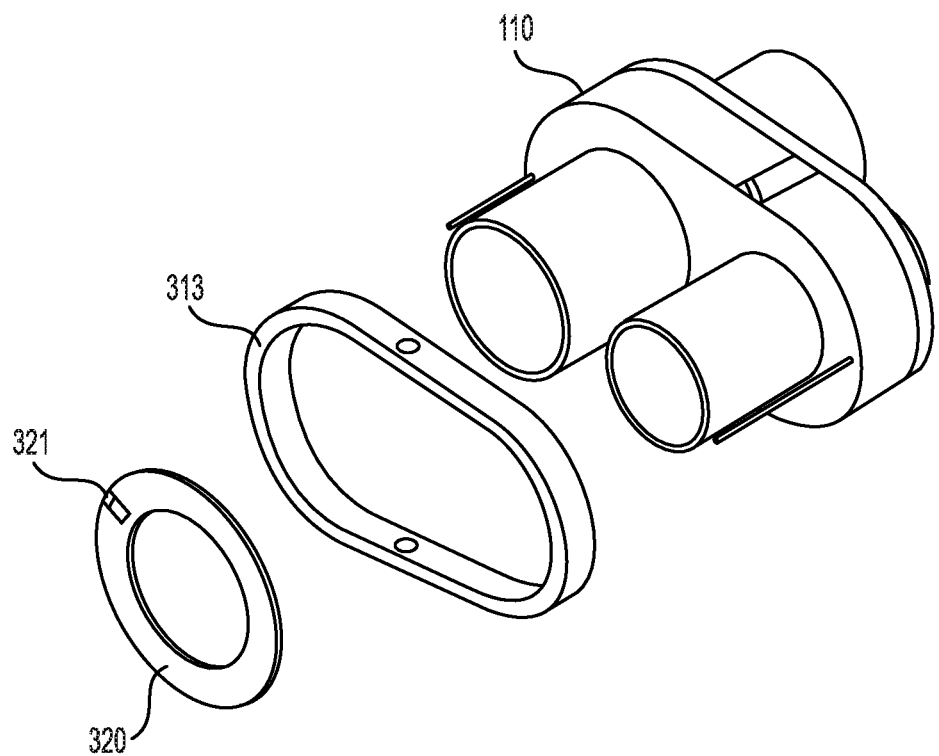
Figure 51:
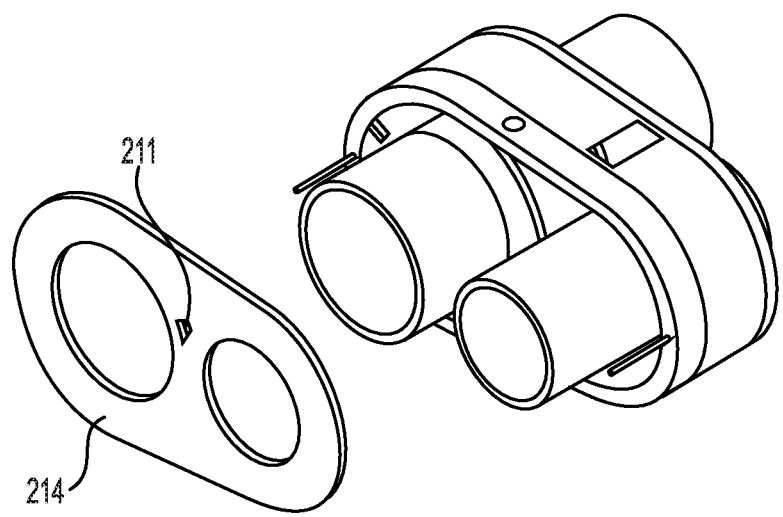
Figure 52:
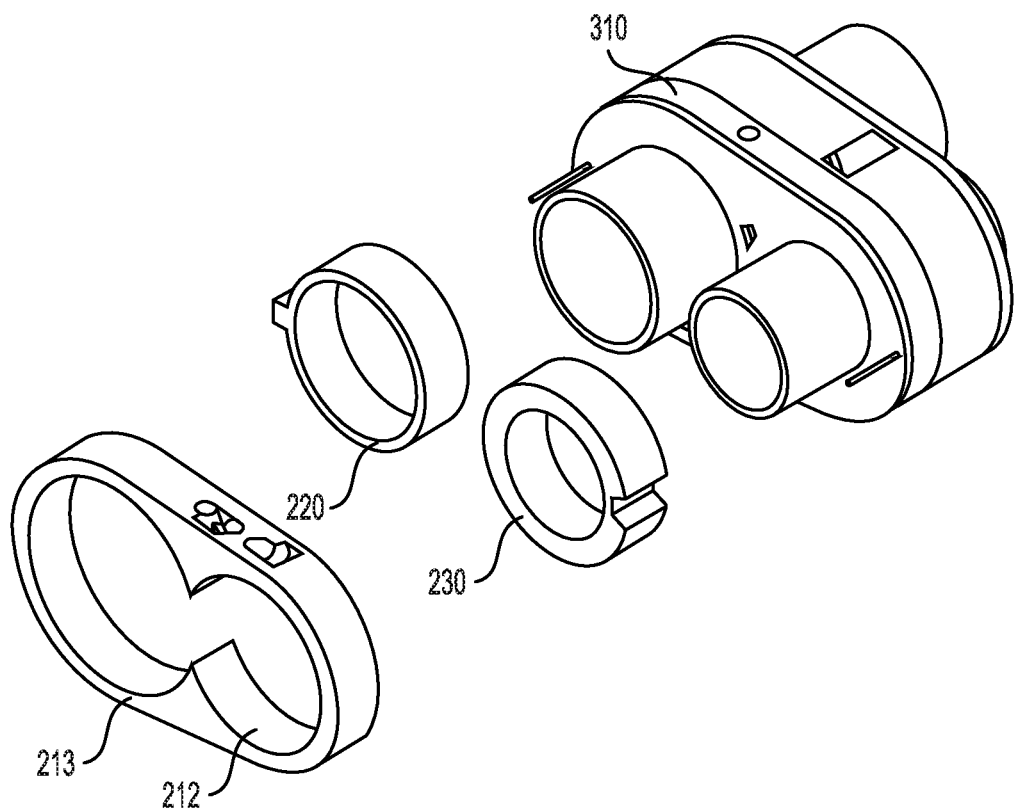
Figure 53:
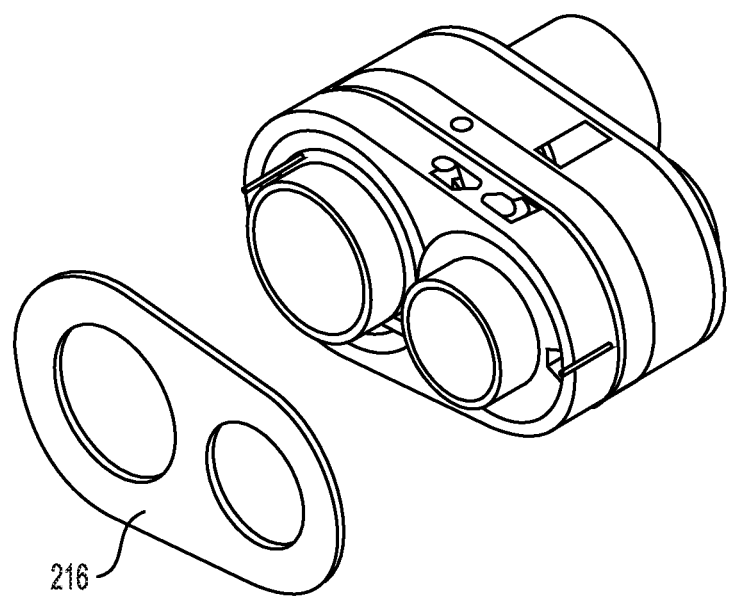
Figure 54:
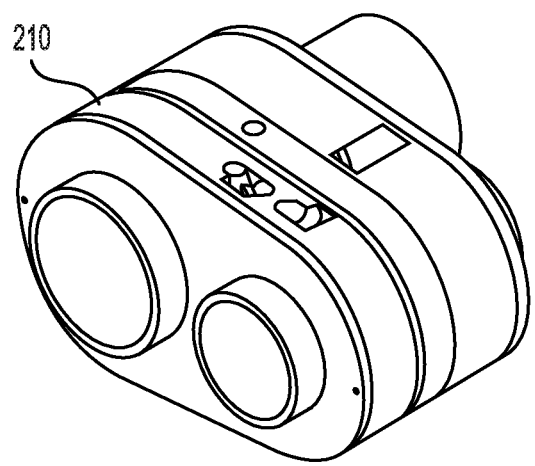
FIG. 54 is a perspective view of the engine of FIGS. 46-53.
Figure 55:
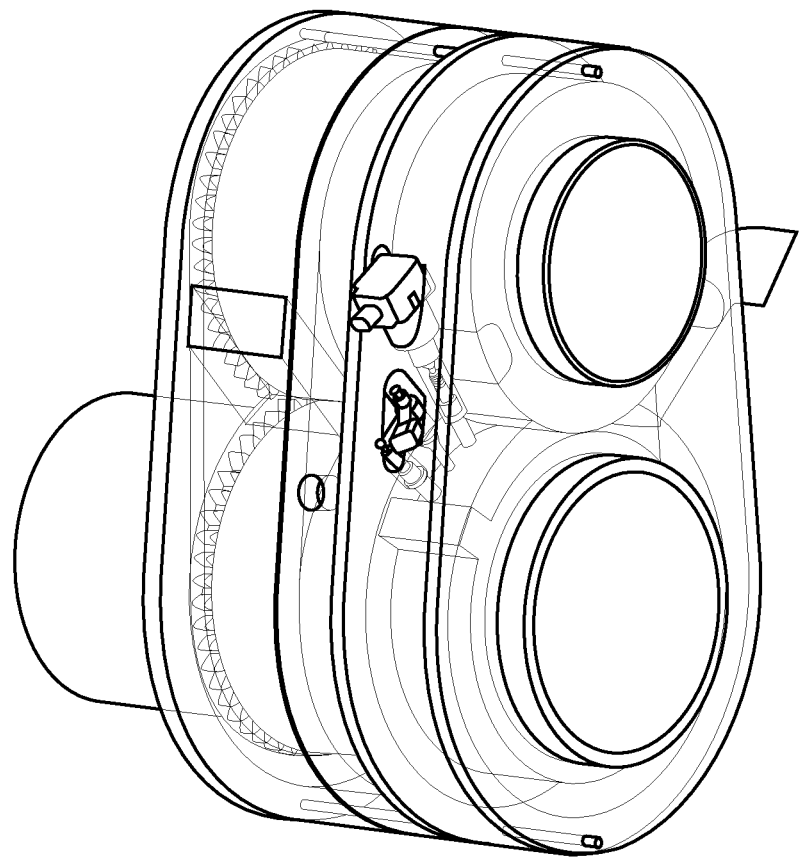
FIG. 55 is a perspective view of an engine of the present invention, a combustion housing, a tank housing, a compression housing, and a gear housing being shown in a transparent state so as to facilitate visualization of components positioned within each.
Figure 56:
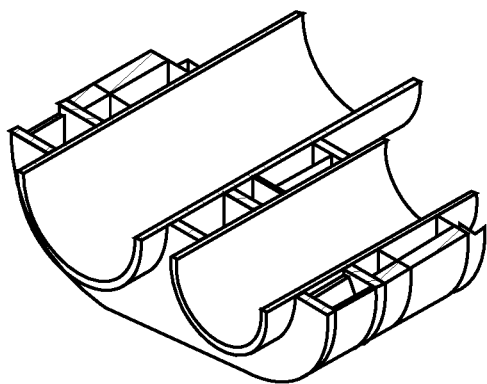
FIG. 56 is an isometric sectional view of an embodiment of the present invention.
Figure 57:
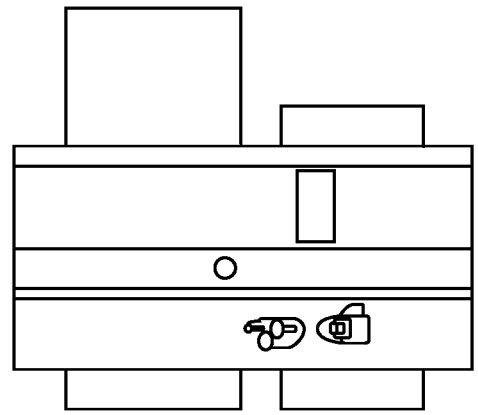
FIG. 57 is a top view of the embodiment of FIG. 56.
Figure 58:
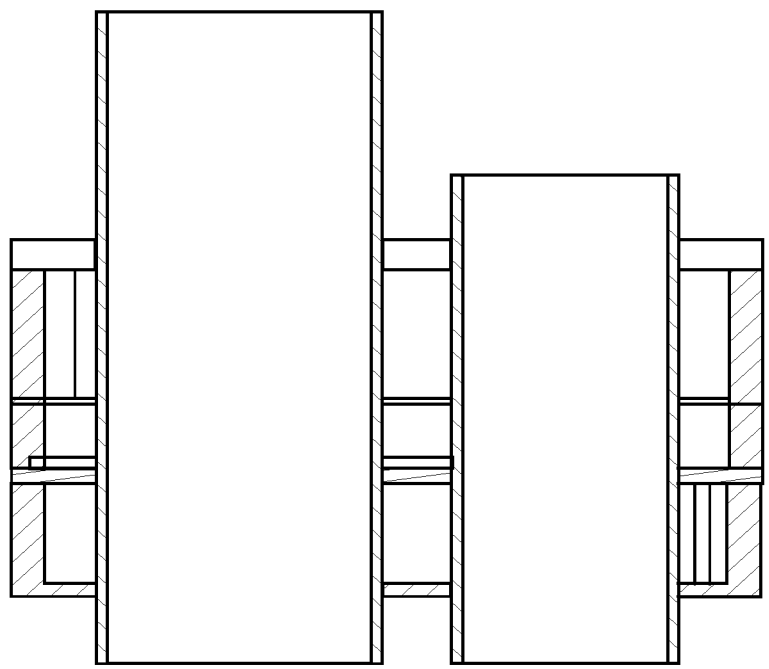
FIG. 58 is a top sectional view of the embodiment of FIG. 56.
Figure 59:
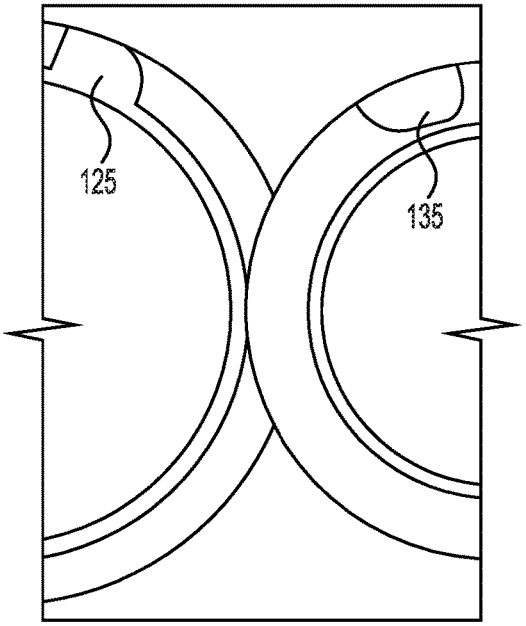
FIG. 59 is a partial view of a compression assembly of an embodiment of the present invention, the compression assembly being shown in a closed configuration during a first compression stroke.
Figure 60:
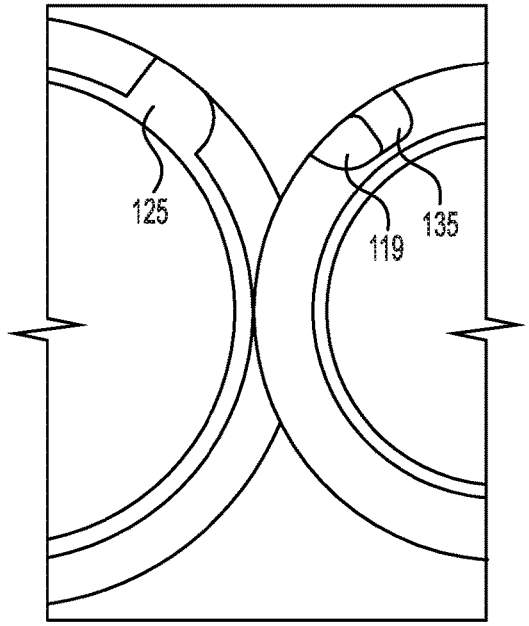
FIGS. 60 and 61 each show a partial view of the compression assembly of FIG. 14A with a portion of an outlet port shown in fluid communication with a void created by a receptacle of an isolator rotor of the compression assembly, the compression assembly remaining in a closed configuration in each figure.
Figure 61:
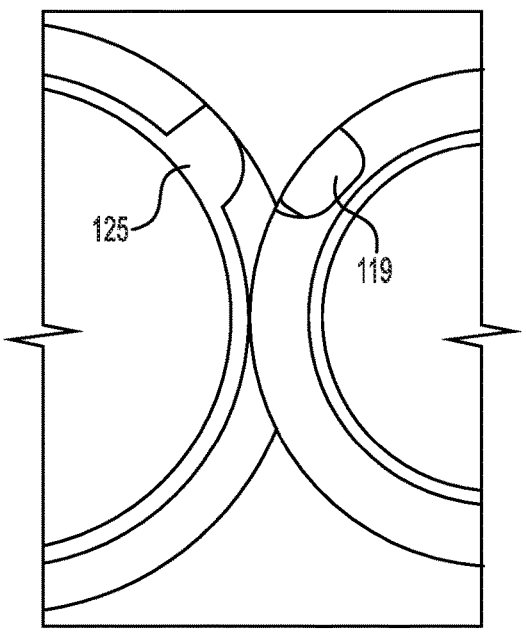
Figure 62:
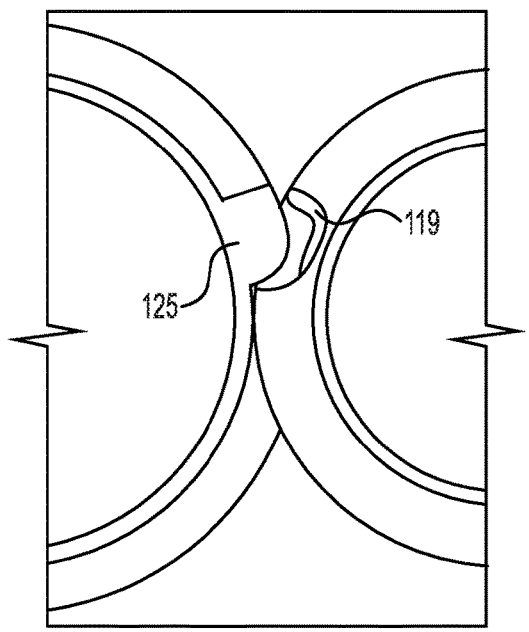
FIG. 62-64 each show a partial view of the compression assembly of FIG. 59, the compression assembly being in an open configuration in each figure.
Figure 63:
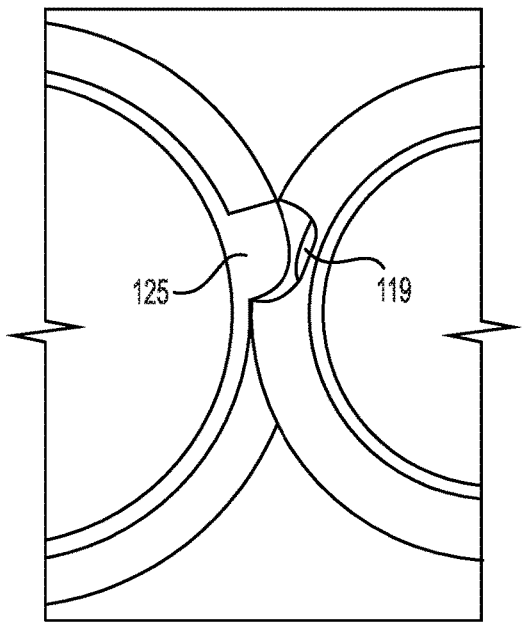
Figure 64:
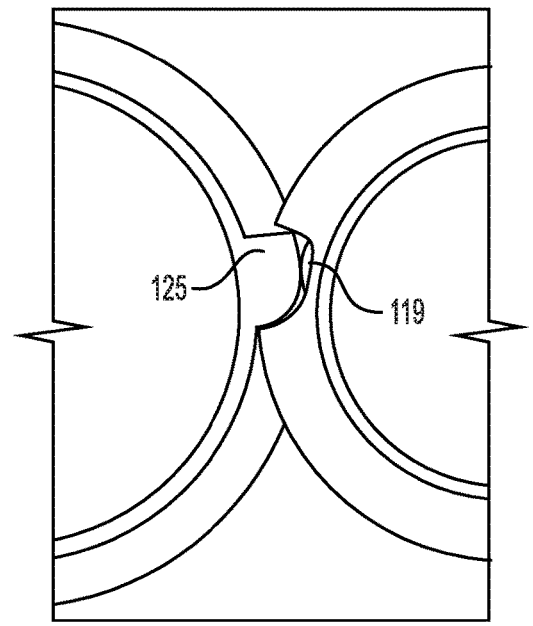
Figure 65:
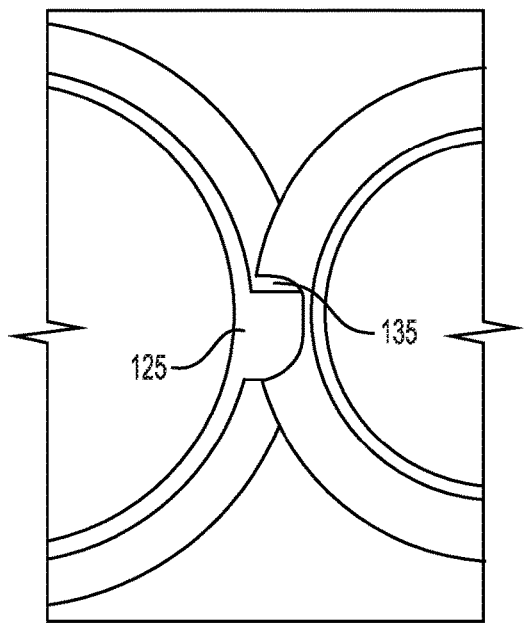
FIG. 65 is a partial view of the compression assembly of FIG. 59, the compression assembly being in a closed configuration at the end of the first compression stroke.
Figure 66:
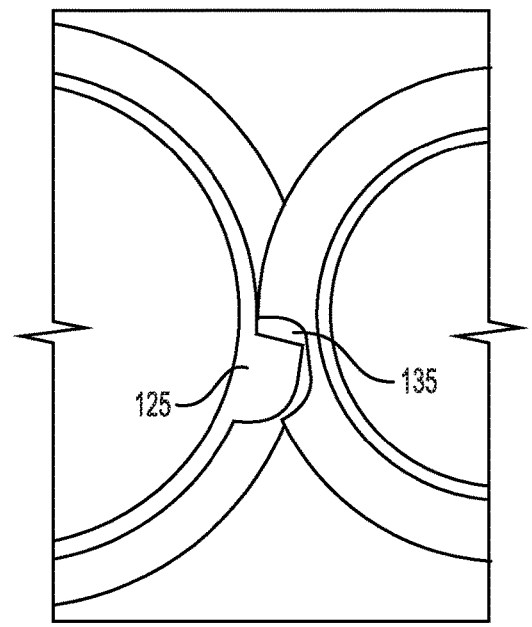
FIG. 66 is a partial view of the compression assembly of FIG. 59, the compression assembly shown at the beginning of a second compression stroke.
Figure 67:
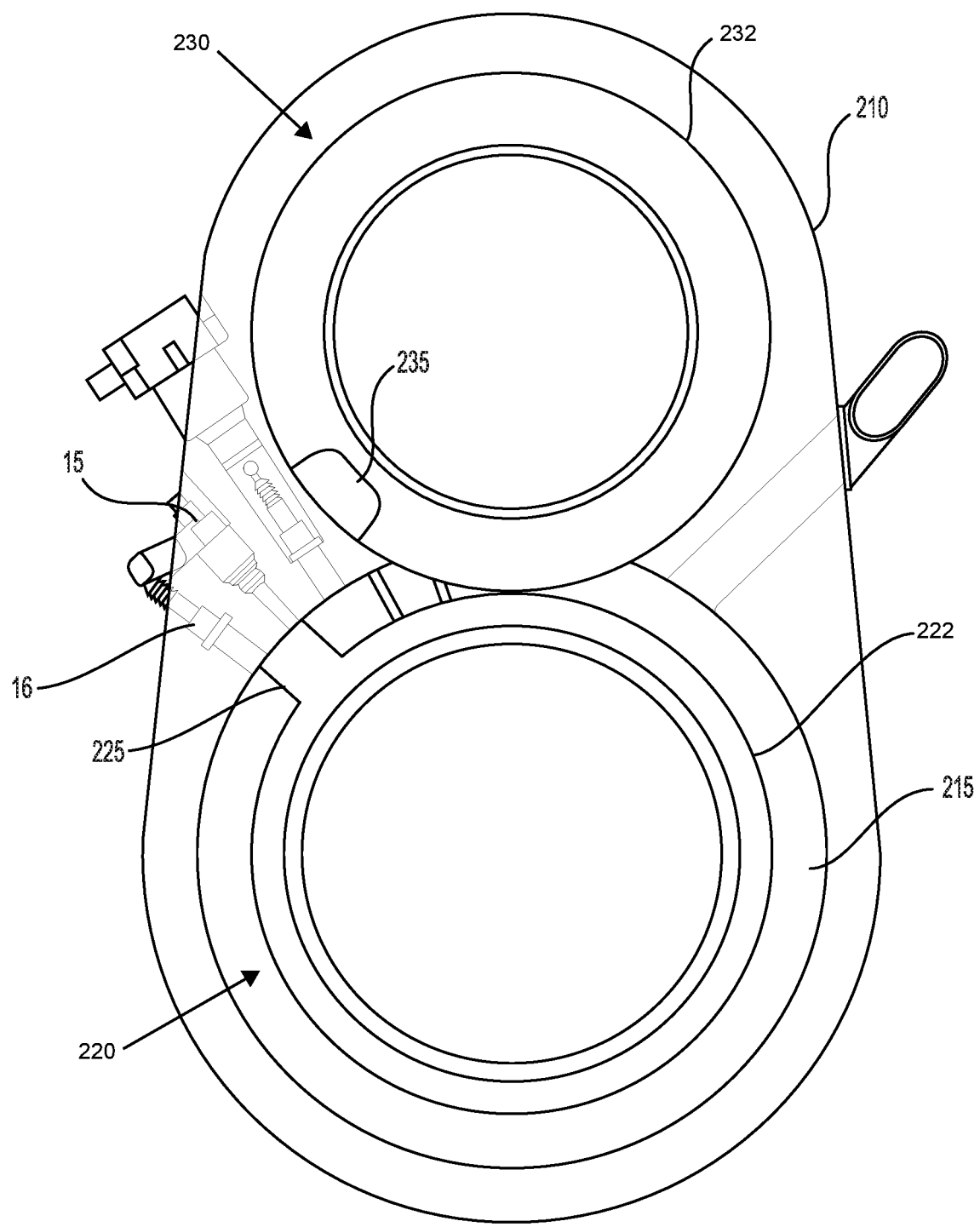
FIG. 67 is a sectional view of an embodiment of the present invention, an intake port shown in an open configuration.

In some embodiments, the system includes one or more rotary valve 320 as part of one or more valve assembly. Referring to FIG. 11, certain embodiments of the rotary valve define one or more aperture that is designed to allow fluid flow out of the compression assembly at one or more appropriate time while preventing or otherwise inhibiting such fluid flow at other times. In some embodiments, the valve assembly includes one or more adjustment mechanism or other adjustment means, such as one or more mechanism for and/or means of advancing and/or retarding timing of the same, such as through electro, mechanical, hydraulic, and/or other (now known or later developed) mechanisms and/or means, alone or in combination with one or more of the same.

Referring to FIGS. 59-66, some isolators 130 of the present invention are configured to move an outlet port between an open and closed configuration relative to a compression section of a compression chamber 115. In this way, a separate valve is not required and pressure buildup associated with engaging compression members with corresponding receptacles can be eliminated or otherwise reduced. In some embodiments, each compression member includes a leading portion and an opposed trailing portion, each being configured to engage with respective leading and trailing portions of a respective receptacle as the compression member 115 moves from one section of the compression chamber to another.

In some embodiments, the present invention includes a tank assembly 300 for holding compressed fluid. In some embodiments, the tank assembly 300 is in fluid communication with the compression chamber when a relative section of the same is at or near a maximum pressure (such as just prior to a compression section being closed). In some embodiments, the volume of the tank assembly is significantly higher than a volume of the compression chamber, thereby providing stability for the system. In some embodiments, the tank assembly includes one or more pressure relief or other means of maintaining pressure below a maximum threshold, thereby preventing over-pressurization associated with operation of the compression assembly and/or facilitating pressure optimization of the same. In some embodiments, the relief valve is in fluid communication with the atmosphere. In some embodiments, the relief valve is in fluid communication with a holding vessel, such as a high-pressure holding vessel.

The present invention is configured for use in a variety of environments, such as on-ground and at elevation. In some embodiments, the system includes a means of compensating for altitude changes, such as by way of inclusion of one or more pressure relief valve or the like. In some embodiment, the pressure relief valve, or one or more other means of adjusting pressure, can be adjusted (such as by leaving it on) to maximize or otherwise optimize performance of the engine. In some embodiments, the pressure relief valve is configured to be left open, such as to allow the engine to just coast with very little flow restriction. In some such embodiments, the system is configured to (and/or the system enables) shutting off fuel, such as to allow the system to function as a giant air pump with little to no restriction. In some embodiments, the system is configured to divert air from the compression chamber, such as when the tank assembly is at or near a maximum or other threshold pressure. In some such embodiments, the system is configured to maintain one or more compression chamber in an open configuration, thereby reducing load on the system as a whole by preventing pressure build-up in the compression chamber. In some embodiments, the system is configured to increase power when necessary or desired.

It will be appreciated that in some embodiments, one or more compression assembly is stacked on (functionally and/or literally) one or more other compression assembly, thereby facilitating generation of even higher pressures and/or generating desired pressures in less time (i.e. stacked in-series). It will be further appreciated that in some embodiments, one or more compression assembly operates adjacent to (functionally and/or literally) one or more other compression assembly (i.e. parallel). It will still further be appreciated that one or more compression assembly can be activated and/or deactivated, as required or desired, to provide versatility. In this way, the present invention enables superior power performance and superior efficiency. In some embodiments, the system includes a primary rotor operating at a first pressure and a secondary rotor operating at a second pressure that is less than the first pressure. In this way, the system includes versatility associated with use of the same.

In some embodiments, the tank assembly 300 includes a tank shroud 311 positioned between first and second tank plates. In some embodiments, the first tank plate is parallel with the second tank plate. In some embodiments, the tank assembly 300 defines one or more relief port, such as one or more port defined by a tank shroud 311 and/or one or more tank plate. In some embodiments, the tank assembly extends from a compression assembly 100 such that the first tank plate also serves as a portion of a compression housing 110, such as a second compression plate 116. In some embodiments, the tank assembly 300 extends from a combustion assembly 200 such that the second tank plate also serves as a portion of a combustion housing 210, such as a first combustion plate 214.

Referring back to FIGS. 1-2, some embodiments of the rotary engine 10 of the present invention include a combustion assembly 200 for facilitating internal combustion. The combustion assembly 200 is in fluidic communication with a source of high pressure fluid, such as a high-pressure tank plate 300, a compression assembly 100, a compression turbine (not shown), or the like. In some embodiments, the gage pressure of the source of high pressure fluid is greater than thirty pounds per square inch. In some embodiments, the gage pressure is greater than fifty pounds per square inch. In some embodiments, the gage pressure is approximately 300 pounds per square inch. In some embodiments, the gage pressure is sufficient to drive compressed fluid into a combustion chamber of the engine so as to facilitate combustion without requiring compression of fluid in the combustion chamber. In some embodiments, the gage pressure is sufficient to drive compressed fluid into an expansion section of a combustion chamber of the engine while the expansion section is expanding (while an expansion member is moving away from an intake port) and to facilitate combustion within the expansion section of the combustion chamber so as to further drive expansion of the expansion section.

In a similar fashion as discussed above for the compression assembly, the combustion assembly 200 includes a combustion housing 210 and a power rotor 220 positioned therein. The combustion housing 210 defines an interior surface and the power rotor defines a corresponding exterior surface displaced therefrom such that the combustion assembly defines a combustion chamber 215 positioned therebetween. In some embodiments, the combustion housing 210 includes a combustion shroud 213 positioned between first 214 and second 216 combustion plates. In some embodiments, the first combustion plate 214 is parallel with the second combustion plate 216. In some embodiments, the combustion housing 210 defines one or more intake port 211 and/or one or more outlet port 219, such as one or more port defined by a combustion shroud 213 and/or one or more combustion plate.

The power rotor 220 includes an expansion member 225, such as a fin, a blade, or the like, extending from the exterior surface of the power rotor towards the inner surface of the combustion housing, thereby defining a second end of an expansion section of the combustion chamber 215. The power rotor 220 further includes an exhaust member defining a first end of an exhaust section of the combustion chamber 215. It will be understood that in some embodiments one or more expansion member 225 of the power rotor 220 also serves as an exhaust member such that each expansion member 225 separates a combustion section from an adjacent exhaust section. In some embodiments, the combustion housing 210 and power rotor 220 are configured such that there is a small gap between the interior surface of the combustion housing 210 and a distal end of the expansion member 225 (and/or exhaust member, as applicable). The small gap is designed to provide clearance while minimizing combustion blowby. It will be understood that certain sections of the combustion chamber 215 alternate between being part of the combustion section and the exhaust section as the power rotor rotates within the combustion housing.

As the power rotor 220 rotates during a power stroke, the expansion member moves away from a respective intake port 211 such that the volume of the combustion section of the combustion chamber 215 increases, thereby providing a means of converting combustion forces into mechanical energy during a power stroke of the engine. In some embodiments, the intake port 211 is positioned at or near a first end of an expansion section of the combustion chamber. It will be understood that in some embodiments each power stroke of combustion chamber can be performed simultaneously with an exhaust stroke of the combustion chamber.

As the power rotor 220 rotates during an exhaust stroke, the exhaust member moves towards a respective exhaust port 219 such that exhaust gasses are expelled from the combustion chamber. In some embodiments, the exhaust port 219 is positioned at or near a second end of an exhaust section of the combustion chamber 215.

Figure 5:
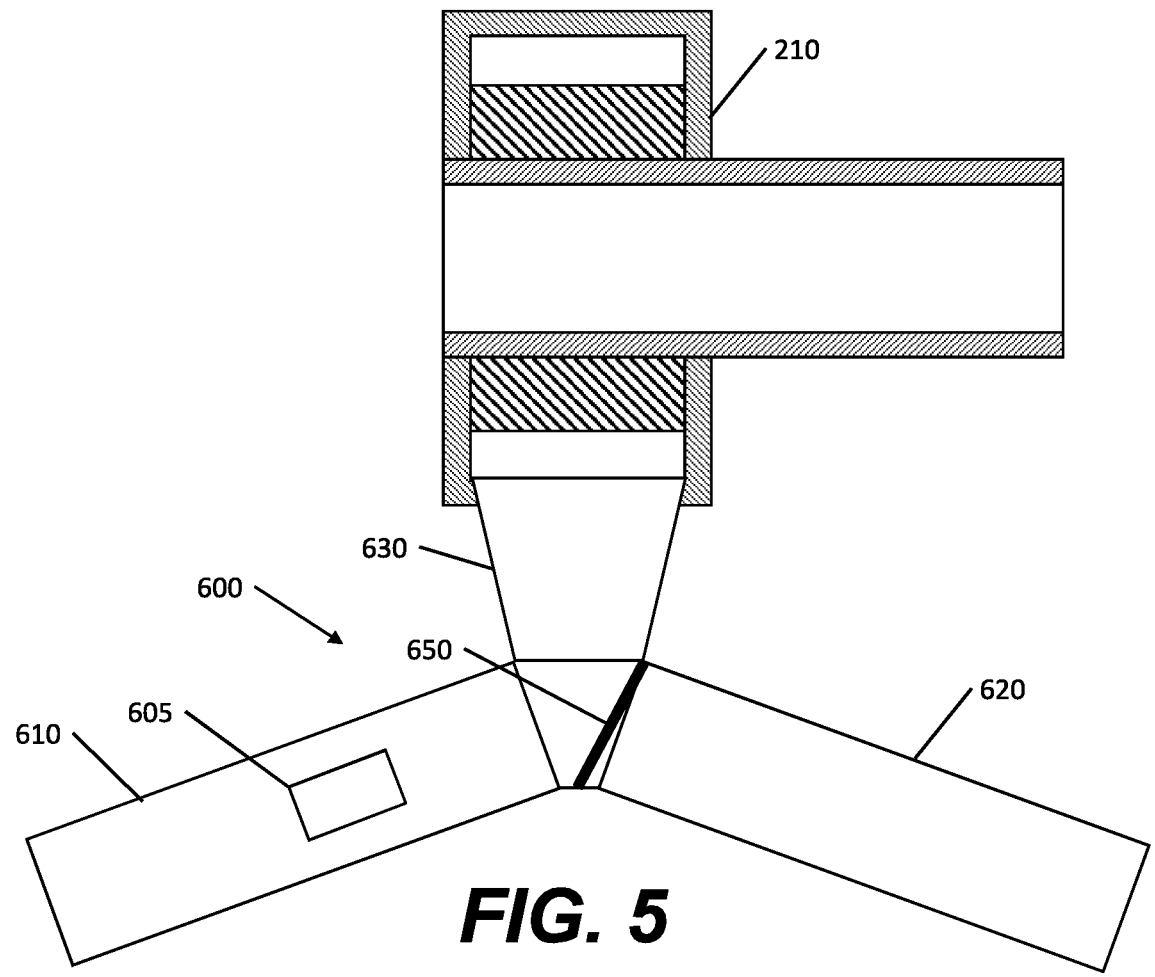
FIG. 5 is a schematic view of an embodiment of a combustion assembly showing an exhaust system having a plurality of exhaust branches and an exhaust valve for controlling which branch exhaust is vented through, the exhaust valve being in a first configuration for venting combustion exhaust past a catalytic converter.
Figure 6:
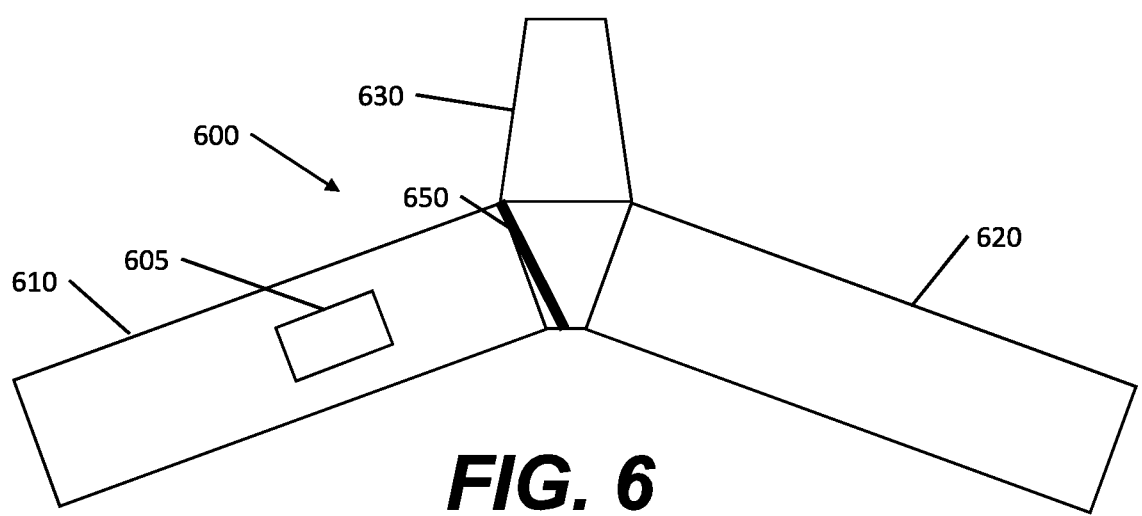
FIG. 6 is a schematic view of an embodiment of a combustion assembly showing an exhaust system having a plurality of exhaust branches and an exhaust valve for controlling which branch exhaust is vented through, the exhaust valve being in a second configuration for venting non-combustion exhaust so that it does not vent past a catalytic converter.

Referencing FIGS. 5 and 6, some embodiments of the present invention include an exhaust system 600 having a catalytic converter 605 or other means of reducing emissions. In some embodiments, the exhaust system 600 includes a first branch 610 for directing fluid past the catalytic converter 605 and a second branch 620 that does not direct fluid past the catalytic converter. In some embodiments, the exhaust system includes an exhaust trunk 630 coupled to each of the first 610 and second 620 branches and an exhaust valve 650 associated therewith. In some such embodiments, the exhaust valve 650 is configured to move between a first configuration and a second configuration, thereby causing the exhaust to be directed through the first branch 610 or the second branch 620, respectively. In this way, the exhaust system facilitates expulsion of combustion exhaust (through the first branch) and expulsion of non-combustion exhaust (such as when compressed fluid is driven through the combustion assembly to drive the combustion rotor during times of low load requirements) through the second branch 620 without causing unwanted cooling of the catalytic converter 605.

In some embodiments, the system of the present invention utilizes a reluctor wheel, hall effects sensor, electronic digital optical sensor, digital mechanical hydraulic controls, or any other electro, mechanical, hydraulic, and/or other (now known or later developed) mechanisms and/or means, alone or in combination with one or more of the same.

Referring back to FIGS. 7-10, the combustion assembly includes one or more isolator 230, for further segmenting the combustion chamber 215. Each isolator 230 defines an exterior surface and one or more receptacle 235 recessed therefrom. Each isolator rotor is positioned and timed relative to a respective power rotor such that the receptacle is capable of receiving the expansion member, thereby allowing the expansion member to move between sections of the combustion chamber. It will be appreciated that certain embodiments of the present invention include varying numbers of isolator rotors, expansion members, and the like, to accommodate sizing, power, and timing requirements and/or preferences. It will further be appreciated that certain embodiments of the present invention include expansion members having varying sizes and configurations, such as rounded, squared, angular fillets, gussets, or the like.

Each receptacle 235 of the isolator rotor is configured to receive an expansion member at the end of an exhaust stroke, thereby enabling the expansion member to move beyond the second end of the exhaust section of the combustion chamber. At all other times, the outer surface of the isolator is positioned adjacent to the outer surface of the power rotor (small gap as discussed above) so as to define a second end of the exhaust section of the combustion chamber. In some embodiments, the isolator further defines a first end of an expansion section of the combustion chamber.

In some embodiments, each section of the combustion chamber is in constant fluidic communication with each adjacent section, such as through respective gaps between the rotors and/or between the rotors and the housing. In this way, the system provides constant fluidic communication between the same while facilitating power generation and exhaust. In some embodiments, the housing includes an exhaust port positioned just prior to each isolator. As an expansion member passes a corresponding exhaust port, the corresponding exhaust section of the chamber is closed.

In some embodiments, the combustion housing 210 includes an intake port 211 positioned just past each isolator. As a combustion (or other) member passes a corresponding intake port, a volume of compressed fluid ("working fluid") is allowed to flow into the intake section of the combustion chamber in association with a power stroke of the engine. In some embodiments, one or more valve (such as a reed valve, a rotary valve, or the like) is associated with the intake port so as to facilitate fluid flow through the intake port in association with the expansion section being opened (generally prior to ignition). In some embodiments, the compression assembly is configured to prevent or otherwise inhibit fluid flow through the intake port at other times.

In some embodiments, the valve assembly includes one or more rotary valve 310 that is designed to allow working fluid to flow into the combustion assembly at one or more appropriate time while preventing or otherwise inhibiting such fluid flow at other times. In some embodiments, the valve assembly includes one or more adjustment mechanism or other adjustment means, such as one or more mechanism for and/or means of advancing and/or retarding timing of the same, such as through electro, mechanical, hydraulic, and/or other (now known or later developed) mechanisms and/or means, alone or in combination with one or more of the same.

In some embodiments, the system is configured to utilize a variety of fuel types and ignition systems and/or the present invention is otherwise capable of satisfying associated requirements and/or preferences. In some embodiments, the system includes an adjustable ignition timing system and/or an adjustable injection timing system. In some embodiments, one or more timing or other system can be adjusted digitally, mechanically, hydraulically, or the otherwise.

In some embodiments, the system includes a plurality of combustion chambers. In some such embodiments, the system is configured to selectively reduce and/or eliminate combustion in one or more combustion chamber at a strategic time, such as at cruise altitude. In some embodiments, the system is configured to add or increase combustion at other times, such as during takeoff or climb out. In some embodiments, the system utilizes port fuel injection. In other embodiments, the system utilizes direct fuel injection. In some embodiments, the system includes one or more chamber for facilitating direct-injection pre-chamber combustion. In some embodiments, the system utilizes one or more throttle body.

Figure 7:
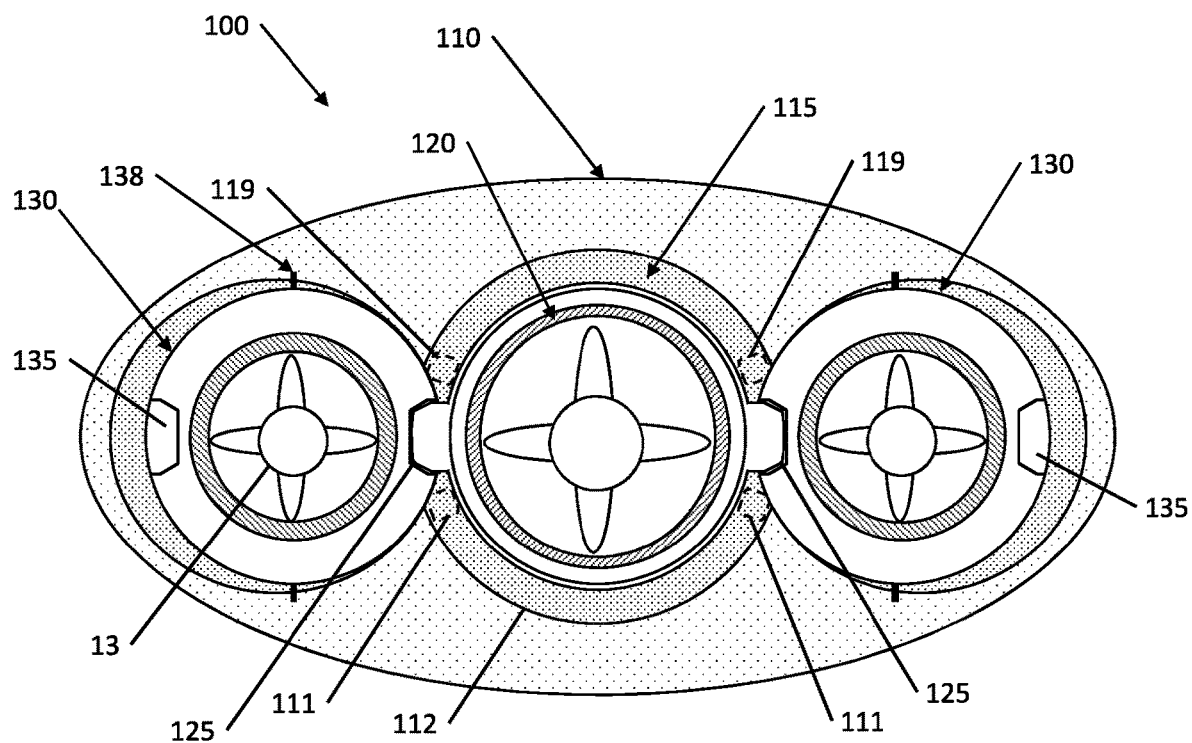
FIG. 7 is a sectional view of a compression assembly of the present invention, certain embodiments of combustion assemblies having substantially the same configuration.
Figure 8:
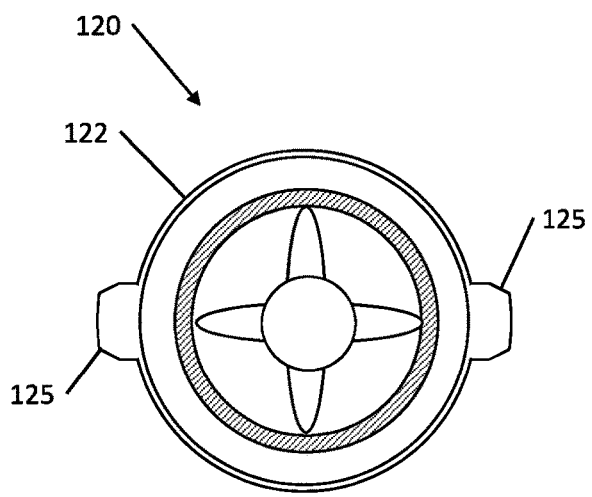
FIG. 8 is an end view of a compression rotor of the present invention, certain embodiments of power rotors having substantially the same configuration.
Figure 9:
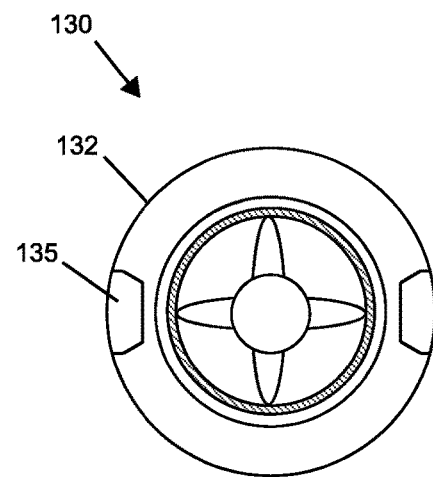
FIG. 9 is an end view of an isolator of the present invention.
Figure 10:
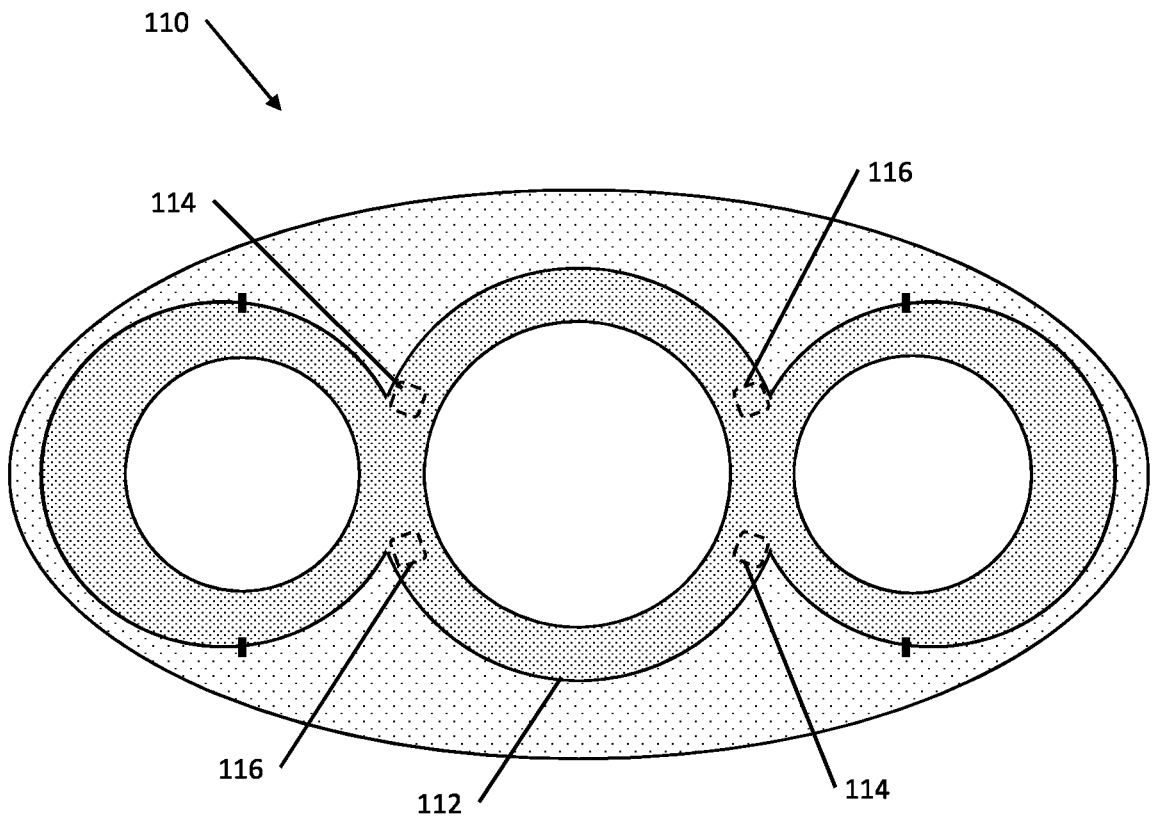
FIG. 10 is a sectional view of a compression housing of the present invention, certain embodiments of combustion housings having substantially the same configuration.

Referring to FIG. 7, some embodiments of the present invention include a combustion and/or compression assembly having an oblong cavity within which one or more isolator is positioned. In some such embodiments, the relevant assembly is configured with a biasing member to bias a respective isolator into position relative to a respective compression rotor, power rotor, or the like. In this way, the system is configured to provide some allowance for debris that develops within and/or migrates into a respective chamber.

Still referring to FIG. 7, some embodiments of the present invention include a cleaning feature 138 for preventing or otherwise inhibiting carbon or other build-up on a rotor, such as an isolator rotor or the like. In some embodiments, the cleaning feature is a blade, scraper, or the like that extends from a housing of the relevant assembly. In some such embodiments, a distal end of the cleaning feature 138 is configured to engage with an outer surface of a rotor and/or an inner surface of a housing so as to keep the same free of build-up, such as by facilitating a wiping action or the like.

In some embodiments, the system is configured to operate at high rpms, such as greater than 5,000 rpms. In some embodiments, gaps within the system, such as gaps between rotors, rotor blades, interior walls, and the like, are sized and configured so as to eliminate or otherwise minimize air flow and/or compression loss from one or more chamber and/or across one or more barrier when the system is operating at high rpms. In some embodiments, a sealing agent, such as water or the like, is injected into and/or otherwise provided within one or more interior area of a compression assembly, a combustion assembly, or the like. In some such embodiments, the system is configured such that the sealing agent creates a seal for eliminating or otherwise minimizing air flow and/or compression loss from one or more chamber and/or across one or more barrier when the system is operating at low rpms, such as below 5,000 rpms. In some embodiments, the sealing agent is configured specifically to minimize corrosion or other adverse effects to the system. In some embodiments, one or more component is formed from a material and/or the material is treated so as to minimize corrosion or other adverse effects associated with the fluid.

Referring back to FIG. 1, some embodiments of the present invention include a gear assembly 400, such as a gear assembly positioned at a front inlet area of the engine. In some embodiments, the gear assembly includes a plurality of gears associated with respective rotors, thereby providing a means of synchronizing rotation of the same. In some embodiments, the gears are configured such that each rotor rotates at the same speed as each of the other rotors. In some embodiments, the gears are configured such that one or more isolator rotor rotates at a rate that is faster or slower than a respective power or compression rotor, such as for configurations in which the power rotor includes more blades than a respective isolator rotor includes receptacles. For instance, in some embodiments, an isolator rotor having one receptacle rotates twice as fast as an associated power rotor having two blades such that the single receptacle of the isolator engages with each of the two members of the power rotor during a single revolution of the power rotor. In some embodiments, a respective gear is configured to drive rotation of a respective shaft, thereby driving rotation of a respective impeller, rotor, or the like. In some embodiments, a single shaft is coupled to a plurality of rotors, thereby driving rotation of each.

Referring to FIGS. 35, 36, 37, 38, and 39, some embodiments of the present invention include one or more fan assembly 80, such as a fan assembly 80 positioned at an aft end of the engine, at the fore end of the engine, or both. In some embodiments, the fan assembly 80 is in mechanical engagement with one or more shaft of the present invention, such as a tube extending through a power (and/or compression) rotor, a tube extending through one or more isolator rotor, or the like. In this way, the system is configured to drive rotation of a plurality of fan blades about the shaft, thereby drawing air across an outer surface of the engine (such as for cooling the engine) and/or driving air away from the engine (such as for propulsion). In some embodiments, the system further includes an engine shroud 60 extending from and/or extending between one or more fan assembly 80. In this way, the fan blades are configured to draw fluid into and/or push fluid out of an interior area defined by the engine shroud 60. In some embodiments, at least part of the engine is positioned within the interior area defined by the engine shroud 60.

Referring to FIGS. 46-54, some embodiments of the present invention include a method of assembling an engine. In some embodiments, the method includes associating one or more drive shaft 20 with one or more synchronizing shaft 30, such as with one or more drive gear 22 and/or synchronizing gear 32. In some embodiments, one or more shaft defines a cylindrical shape having a longitudinal central axis. In some embodiments, one or more shaft defines opposed front and rear openings and a hollow interior area extending therebetween, thereby facilitating airflow through the shaft. In some embodiments, the method includes engaging each shaft with a gear housing 410, such as a gear plate, a gear shroud, or the like. In some embodiments, the method includes extending one or more shaft through a respective hole defined by the gear housing. In some embodiments, the method further includes enclosing the gears within the gear housing 410, such as by installing a front plate 114 of a compression assembly 100 to the gear housing 410 such that the front plate 114 of the compression assembly 100 doubles as a rear plate of the gear housing 410. It will be understood that in other embodiments the gear housing includes a rear plate (not shown) that is independent of the front plate 114 of the compression assembly.

Some embodiments of the present invention include a method of assembling a compression assembly 100. In some embodiments, the method includes extending one or more shaft through apertures defined by a front plate 114 of a compression housing 110. In some embodiments, the front plate 114 defines two holes displaced from each other, such as holes that are configured to facilitate an airtight seal around a respective shaft. In some embodiments, the method of assembling a compression assembly includes securing a compression rotor 120 to a first shaft, such as a power shaft 20, a synchronizing shaft 30, or the like. In some such embodiments, the method further includes securing an isolator rotor 130 to a second shaft, such as a power shaft 20, a synchronizing shaft 30, or the like. The method further includes associating the first shaft with the second shaft, such as by way of a gear assembly or the like, and clocking the compression rotor relative to the isolator rotor such that one or more compression member of the compression rotor is periodically received by one or more receptacle of the isolator rotor as the compression rotor rotates in a first rotational direction (clockwise or counterclockwise) about a central axis of the first shaft and the isolator rotor rotates in a second rotational direction (counterclockwise or clockwise) about a central axis of the second shaft, thereby facilitating continuous unidirectional rotation of the compression rotor.

In some embodiments, the method of assembling the compression assembly includes extending one or more shaft through a respective void defined by a compression shroud 113 of the compression housing 110, such as a first void associated with a compression rotor and a second void associated with an isolator rotor. In some embodiments each void is cylindrical in shape such that the compression shroud defines a plurality of curved interior walls 112, such as a first curved interior wall defined by a first radius associated with a compression rotor and/or a second curved interior wall defined by a second radius associated with an isolator rotor. It will be understood that in some embodiments the second void is oblong, as discussed above, such as to facilitate movement of one or more isolator rotor, to facilitate fluid storage, or the like. In some embodiments, the first and second voids intersect each other such that the combination of the voids resembles a figure eight. In some embodiments, the voids are configured so as to allow for the compression shroud to be installed over one or more rotor coupled to one or more respective shaft, such as a compression rotor, an isolator rotor, or the like. In some embodiments, the voids are configured so as to allow for one or more rotor to be installed to a respective shaft extending through such void. In some embodiments, the method further includes enclosing the rotors within the compression housing 110, such as by installing a rear plate 116 of the compression housing 110, thereby defining one or more compression chamber having an inlet port 111 and an outlet port 119 associated with flowing fluid into the compression chamber and out of the compression chamber, respectively. In some embodiments, a width of the inlet port is equal to or substantially equal to a width (i.e., measured along a distance of a longitudinal axis of a power shaft of the engine) of the compression chamber. In other embodiments, the width of the inlet port is smaller than a width of the compression chamber. In still other embodiments, a width of the inlet port is greater than a width of the compression chamber.

Some embodiments of the present invention include a method of assembling a combustion assembly 200. In some embodiments, the method includes extending one or more shaft through apertures defined by a front plate 214 of a combustion housing 210. In some embodiments, the front plate 214 defines two holes displaced from each other, such as holes that are configured to facilitate an airtight seal around a respective shaft. In some embodiments, the method of assembling a combustion assembly includes securing a power rotor 220 to a first shaft, such as a power shaft 20. In some such embodiments, the method further includes securing an isolator rotor 230 to a second shaft, such as a synchronizing shaft 30. The method further includes associating the first shaft with the second shaft, such as by way of a gear assembly or the like, and clocking the power rotor relative to the isolator rotor such that one or more expansion member of the power rotor is periodically received by one or more receptacle of the isolator rotor as the power rotor rotates in a first rotational direction (clockwise or counterclockwise) about a central axis of the first shaft and the isolator rotor rotates in a second rotational direction (counterclockwise or clockwise) about a central axis of the second shaft, thereby facilitating continuous unidirectional rotation of the power rotor.

In some embodiments, the method of assembling the combustion assembly includes extending one or more shaft through a respective void defined by a combustion shroud 213 of the combustion housing 210, such as a first void associated with a power rotor and a second void associated with an isolator rotor. In some embodiments each void is cylindrical in shape such that the combustion shroud defines a plurality of curved interior walls 212, such as a first curved interior wall defined by a first radius associated with a power rotor and/or a second curved interior wall defined by a second radius associated with an isolator rotor. It will be understood that in some embodiments the second void is oblong, as discussed above, such as to facilitate movement of one or more isolator rotor, to facilitate fluid storage, or the like. In some embodiments, the first and second voids intersect each other such that the combination of the voids resembles a figure eight. In some embodiments, the voids are configured so as to allow for the combustion shroud to be installed over one or more rotor coupled to one or more respective shaft, such as a power rotor, an isolator rotor, or the like. In some embodiments, the voids are configured so as to allow for one or more rotor to be installed to a respective shaft extending through such void. In some embodiments, the method further includes enclosing the rotors within the combustion housing 210, such as by installing a rear plate 216 of the combustion housing 210, thereby defining one or more combustion chamber having an intake port 211 and an exhaust port 219 associated with flowing fluid into the combustion chamber and out of the combustion chamber, respectively. In some embodiments, a width of the exhaust port is equal to or substantially equal to a width (i.e., measured along a distance of a longitudinal axis of a power shaft of the engine) of the combustion chamber. In other embodiments, the width of the exhaust port is smaller than a width of the combustion chamber. In still other embodiments, a width of the exhaust port is greater than a width of the combustion chamber. In some embodiments, a cross section of an exhaust system (and/or one or more branch of an exhaust system) tappers out and/or is otherwise greater than a cross section of the combustion chamber, such as to facilitate scavenging or otherwise assist in drawing exhaust from the combustion chamber. In some embodiments, a cross section of an exhaust system (and/or one or more branch of an exhaust system) tappers in and/or is otherwise less than a cross section of the combustion chamber, such as to restrict exhaust and/or to facilitate different types of controlled combustion. In some embodiments, the exhaust system is configured such that air flowing past the exhaust system assists in drawing exhaust fluid out of the exhaust section of the combustion chamber, such as by directing an exit port of the exhaust system relative to fluid flow around the exhaust system.

It will be understood that the respective volumes of the compression chamber and the combustion chamber can be changed to satisfy a variety of requirements, such as by having the volume of the compression chamber be greater than, equal to, or less than a volume of a respective combustion chamber. It will further be understood that total volume of a plurality of combustion chambers and/or compression chambers can be changed, such as by adding or subtracting one or more such chamber and/or reconfiguring, negating (i.e. opening a relief valve), redesigning, or otherwise changing the same. It will still further be understood that the volume of each chamber can be changed by changing one or more parameter of the respective assembly, such as a width (i.e., measured along a distance of a longitudinal axis of a power shaft of the engine) of a rotor, an outer diameter of a rotor, positioning of an inlet/intake port relative to an outlet/exhaust port, and/or diameter of an inner surface of a respective housing. In some embodiments, the diameter of the shaft varies along the length of the shaft, thereby facilitating use of larger or smaller rotors, as required or desired. In some such embodiments, the shaft is a single piece that is machined down or formed with varying diameters. In other embodiments, the shaft includes a first portion extending from a second portion, the first portion having an outer diameter that is smaller than an outer diameter of the second portion. In some embodiments, larger compressor volumes (single or composite) are utilized to store excess compressed air, such as to drive additional mechanisms and/or to facilitate driving a power rotor with compressed air during times of low power requirements. In other embodiments, volume of a combustion assembly is greater than a volume of a compression assembly, thereby realizing efficiencies associated with maximizing power capture during an expansion stroke (i.e. efficiencies the Atkins and Miller cycle try to obtain in a reciprocating engine).

In some embodiments, the tank assembly of the present invention is configured to hold working fluid for a plurality of charges such that when the tank assembly is open to the combustion assembly, pressure in the tank assembly remains high enough to drive fluid into the combustion chamber (i.e. negligible pressure drop). In some embodiments, the tank assembly is configured to hold fluid at a pressure that is sufficiently high enough so that when the tank assembly is open to the combustion assembly, pressure within the tank assembly is sufficient to drive fluid into the combustion chamber at a pressure that is sufficiently high enough to facilitate combustion (i.e. acceptable pressure drop). In some embodiments, opening the combustion chamber to the tank assembly causes a pressure drop in the tank assembly associated with pressurized fluid within the tank assembly driving fluid into the combustion chamber. In some embodiments, one or more compression assembly drives fluid into the tank assembly while the tank assembly is open to the combustion chamber, thereby negating at least some pressure drop associated with opening the combustion chamber to the tank assembly. In some embodiments, one or more mechanism is utilized to selectively increase and decrease a volume of an interior area of the tank assembly, thereby facilitating maintaining relatively constant pressure within the tank assembly while an intake port of the combustion assembly moves between an open and closed configuration.

Figure 68:
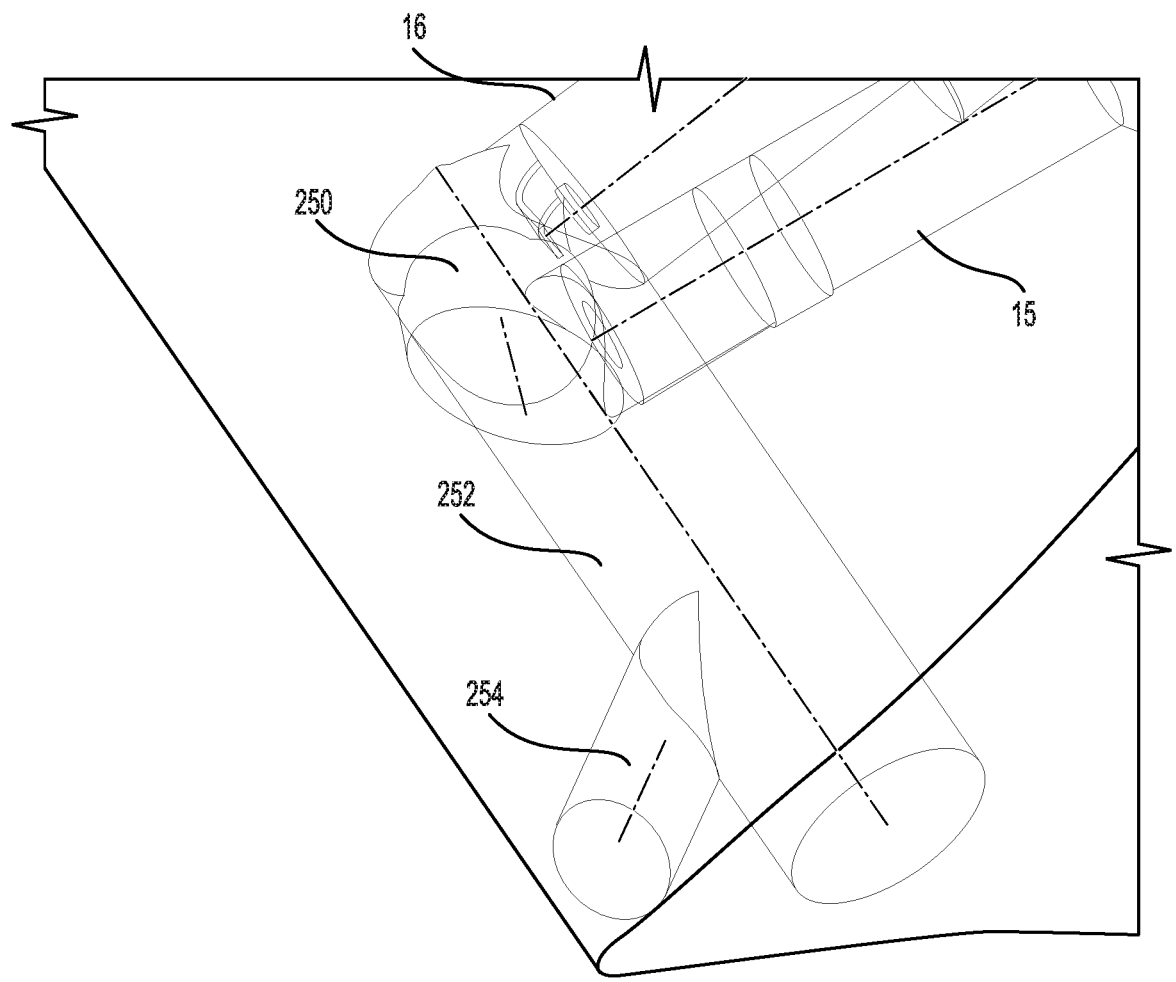
FIG. 68-72 are partial translucent views of combustion housings of various embodiments of the present invention, the housings defining an ignition chamber and ignition tunnels.
Figure 69:
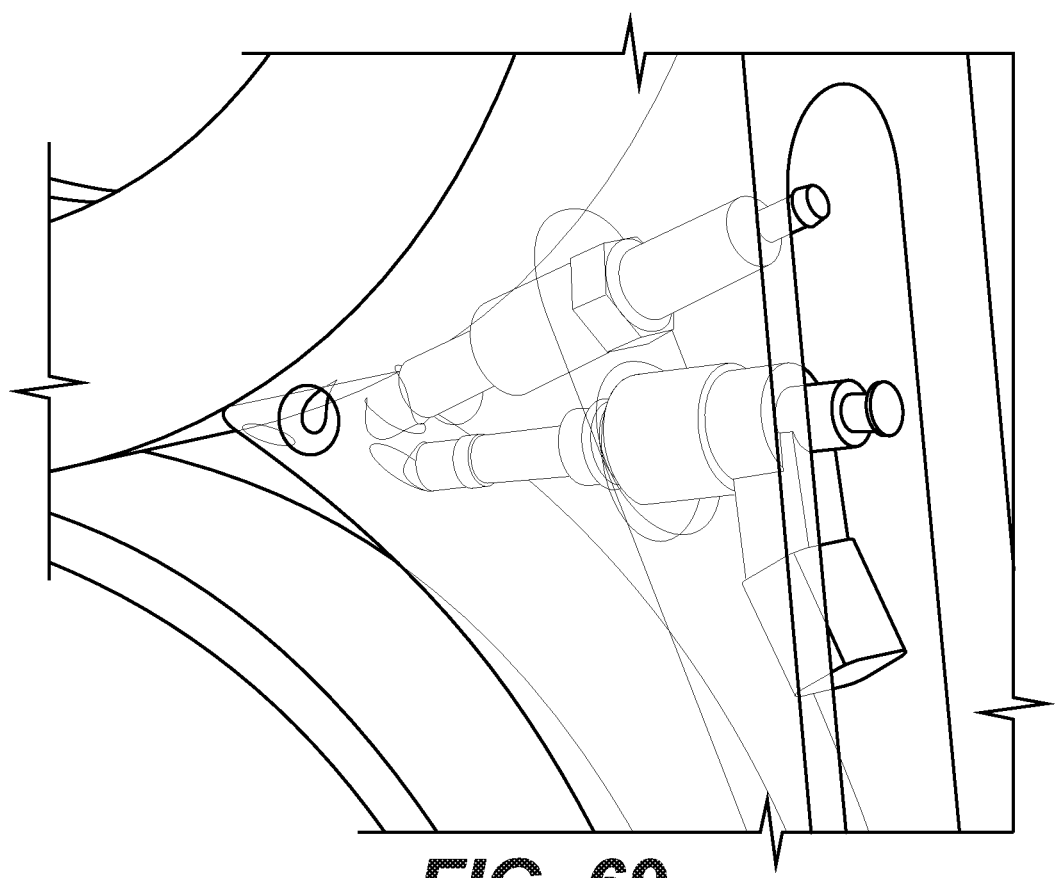
Figure 70:
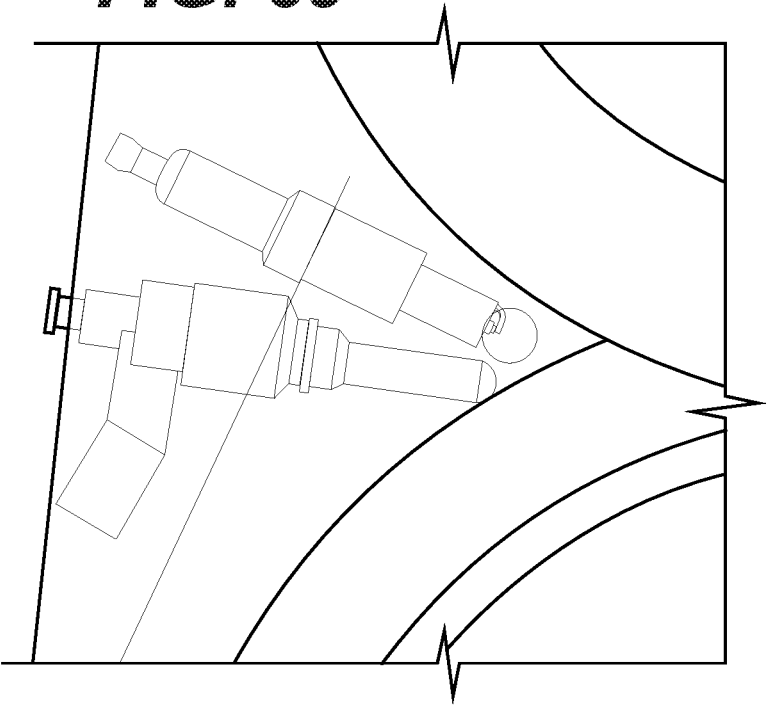
Figure 71:
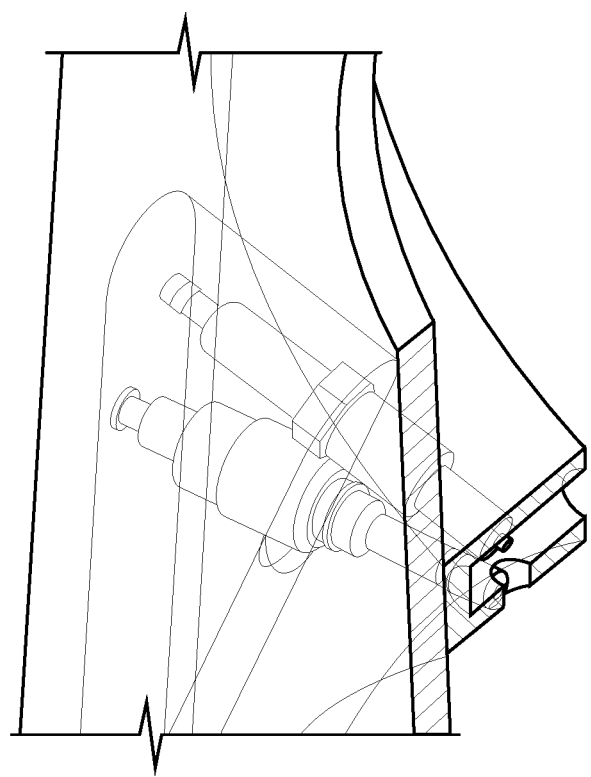
Figure 72:
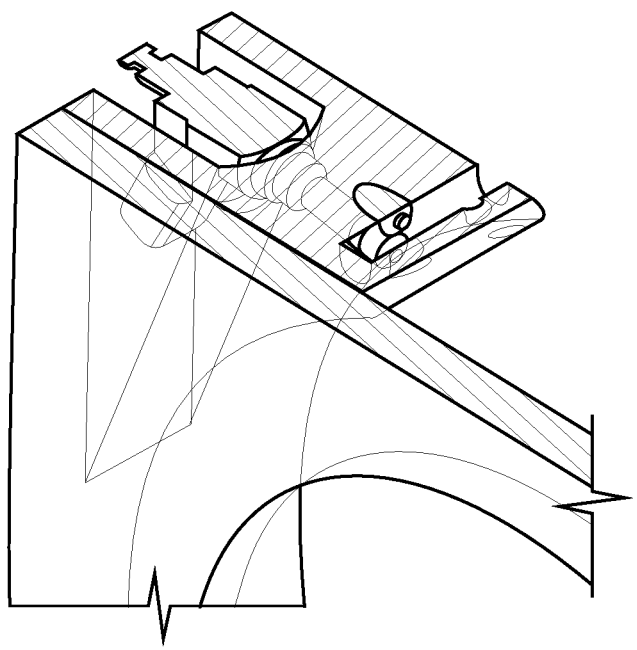
Figure 73:
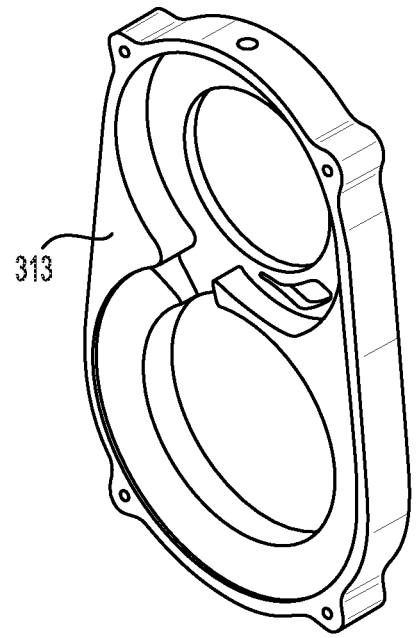
FIG. 73 is an isometric view of a tank housing of an embodiment of the present invention, the tank housing having a support ledge.
Figure 74:
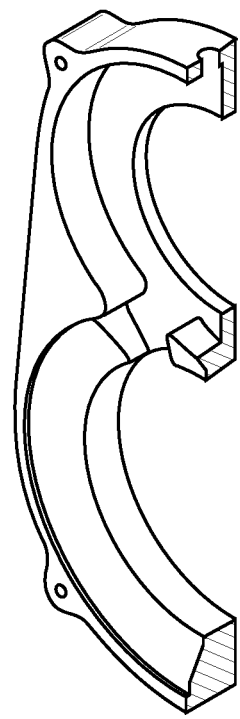
FIG. 74 is an isometric sectional view of the tank housing of FIG. 73.
Figure 75:
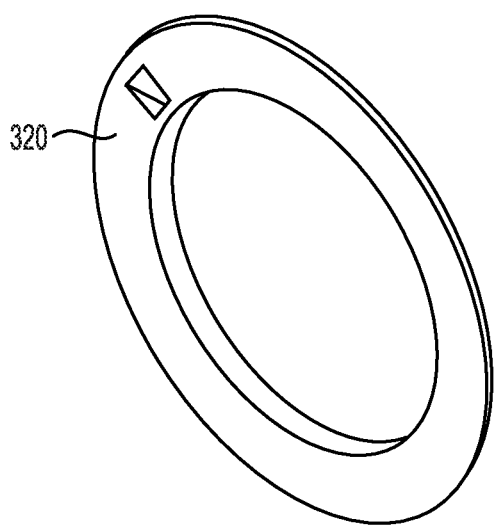
FIG. 75 is an isometric view of a rotary valve of an embodiment of the present invention, the rotary valve being configured to mate with the tank housing of FIG. 73.
Figure 76:
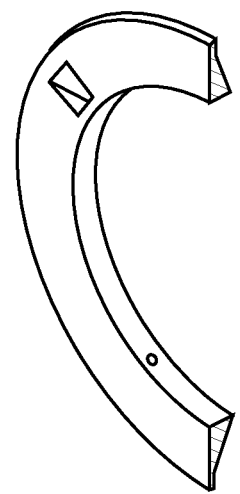
FIG. 76 is an isometric sectional view of the rotary valve of FIG. 75.
Figure 77:
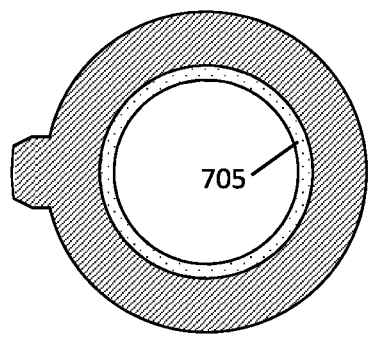
FIG. 77 shows a rotor having a recessed region at its inner diameter.
Figure 78:
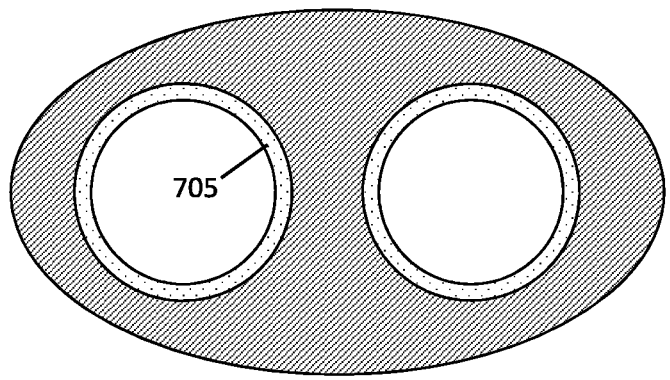
FIG. 78 shows a portion of a housing having a recessed region at its inner diameter.
Figure 79:
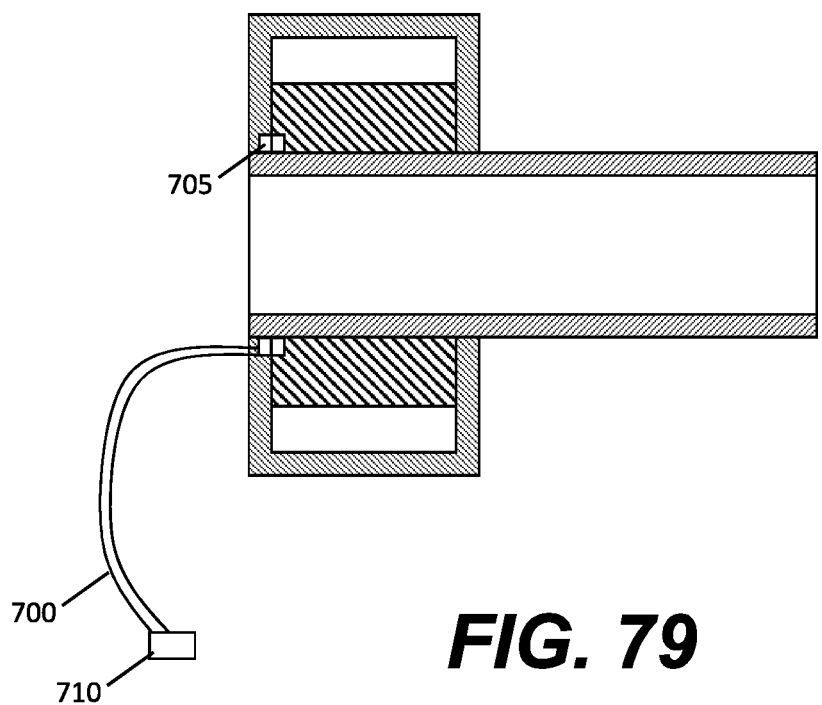
FIG. 79 shows the rotor of FIG. 77 positioned within the housing of FIG. 78 such that the recessed areas are aligned, a venting system being in fluid communication therewith.

In some embodiments, the method of assembling a combustion assembly includes defining an ignition chamber 250 in fluid communication with a combustion chamber 215 of the present invention (see FIG. 68). In some embodiments, a first ignition tunnel 252 extends between the ignition chamber 250 and the combustion chamber 215, thereby facilitating expansion from the ignition chamber into the combustion chamber following ignition in the ignition chamber, thereby facilitating ignition within the combustion chamber. In some embodiments, an ignition means 16, such as a plasma plug or the like, extends into the ignition chamber 250 so as to facilitate ignition within the ignition chamber. It will be appreciated that in some embodiments the system includes an ignition means that extends into the combustion chamber, either in lieu of or in addition to an ignition means extending into an ignition chamber. It will further be appreciated that some embodiments of the present invention do not include an ignition chamber and/or the ignition chamber is one and the same with a combustion chamber.

In some embodiments, a means of providing fuel 15, such as a fuel injector or the like, extends into the ignition chamber and/or is otherwise closely positioned relative to the ignition chamber 250 so as to create a fuel to air ratio within the ignition chamber 250 having favorable ignition capabilities. In some embodiments, the fuel to air ratio within the ignition chamber 250 is greater than a fuel to air ratio within the combustion chamber. In some embodiments, at least a portion of a charge (such as fuel, compressed working fluid, and/or the like) is directed towards the ignition chamber through a second ignition tunnel 254. In some embodiments, the combustion assembly is configured such that at least part of a charge circulates within the ignition chamber just prior to ignition, thereby facilitating mixing of the air and fuel and/or otherwise facilitating ignition (such as by facilitating acquisition of a favorable fuel to air mixture. In some embodiments, the circulation increases the fuel to air mixture within the ignition chamber.

Some embodiments of the present invention include a method of assembling a tank assembly 300. In some embodiments, the method includes extending one or more shaft through apertures defined by a front plate of a tank housing 310. It will be understood that in some embodiments the front plate of the tank assembly also serves as a rear plate 116 of a compression housing 110. In some embodiments, the front plate defines two holes displaced from each other, such as holes that are configured to facilitate an airtight seal around a respective shaft. In some embodiments, the method of assembling a tank assembly 300 includes securing a rotary valve 320 to a first shaft, such as a power shaft 20. The method further includes associating the first shaft with a power rotor of a combustion assembly, such as by way of coupling the power rotor to the first shaft, and clocking the rotary valve relative to the power rotor such that one or more aperture 321 of the rotary valve 320 is periodically aligned with one or more intake port of the combustion assembly as the first shaft rotates in a first rotational direction (clockwise or counterclockwise) about a central axis of the first shaft, thereby moving an intake port 211 of the combustion assembly 200 between an open configuration and a closed configuration so as to control flow of fluid from the tank assembly into a combustion chamber 215 of the combustion assembly. In some embodiments, one or more fuel injector is aligned (positioned and oriented) relative to the intake port of the combustion assembly and is configured so as to inject fuel into the combustion assembly when the intake port is in an open configuration. In some embodiments, the fuel injector is positioned at least partially within an interior volume of the tank assembly and is configured so as to prevent or otherwise inhibit fuel from remaining in the tank assembly, such as by directing fuel towards the intake port while fluid from the tank assembly is being driven through the intake port, thereby driving fuel with it.

In some embodiments, the method of assembling the tank assembly includes extending one or more shaft (such as a power tube, a synchronizing tube, and/or the like) through a void defined by a tank shroud 313 of the tank housing 310. In some embodiments, the void is configured so as to allow for the tank shroud to be installed over the rotary valve. In some embodiments, the void is configured so as to allow for the rotary valve to be installed to a shaft extending through such void. In some embodiments, the method further includes enclosing the tank housing 310, such as by installing a rear plate of the tank housing, thereby defining one or more tank chamber for storing pressurized fluid, the tank chamber having at least one port through which fluid is received, such as an outlet port of an associated compression assembly, and at least one port through which fluid is expelled from the tank assembly, such as an intake port of an associated combustion assembly.

Referring to FIGS. 73-76, some embodiments of the present invention include one or more means of preventing or otherwise reducing blowby out of an intake port. In some embodiments, a rotary valve 320 includes a tapered region for providing additional support and/or rigidity. In some embodiments, the tank housing includes a corresponding region, such as a corresponding tapered region, for providing additional support to the rotary valve. In some embodiments, the tapered region of the tank housing defines a pathway so as to allow fluid to flow towards an aperture of the rotary valve when the aperture is aligned with the intake valve of the combustion assembly, thereby facilitating fluid flow into a combustion chamber of the combustion assembly. In some embodiments, the engine is configured such that fluid flowing into the tank assembly must flow around one or more shaft of the engine as it flows towards the intake port of the combustion assembly. In this way, heat transfer between the shaft and the fluid can be increased.

It will be appreciated that in some embodiments, one or more combustion assembly is stacked on (functionally and/or literally) one or more other combustion assembly (i.e. stacked in-series). It will be further appreciated that in some embodiments, one or more combustion assembly operates adjacent to (functionally and/or literally) one or more other combustion assembly (i.e. parallel). It will still further be appreciated that one or more combustion assembly can be activated and/or deactivated (partially or completely), as required or desired, to provide versatility. In this way, the present invention enables superior power performance and superior efficiency.

It will be appreciated that some embodiments of the present invention include one or more compression assembly positioned in front of one or more tank assembly and/or one or more combustion assembly. It will further be appreciated that in some embodiments one or more combustion assembly is positioned in front of one or more tank assembly and/or compression assembly, such as if preheating of air is required and/or desired. In some such embodiments, one or more exhaust manifold extends from a forward portion of the engine towards a rear portion of the engine. It will still further be appreciated that some embodiments of the present invention include gears positioned in front of, behind, and/or within one or more combustion assembly, tank assembly, and/or compression assembly.

It will be appreciated that an engine of the present invention can be configured to operate in a first direction (i.e. power shaft rotating in a clockwise direction) or a second direction (counter-clockwise). It will further be appreciated that some embodiment of the present invention include pairing a first engine operating in a first direction with a second engine operating in a second direction, such as by positioning the first and second engines on opposed left and right wings of an aircraft, thereby eliminating or otherwise reducing torqueing effects associated with the same.

Some embodiments of the present invention include an internal combustion engine 10 having a combustion assembly 200. The combustion assembly 200 includes a combustion housing 210 having an interior surface 212 defining an interior area. A power rotor 220 is positioned within the interior area of the combustion housing 210, the power rotor 220 having an exterior surface 222 displaced from the interior surface 212 of the combustion housing 210, thereby defining a combustion chamber 215. An expansion member 225 extends from the exterior surface 222 of the power rotor 220 towards the interior surface 212 of said combustion housing 210, thereby segmenting the combustion chamber into an expansion section and an exhaust section during a power stroke of the engine. The exhaust section is configured to facilitate expelling expanded working fluid, such as working fluid of first charge, a second charge, and so on, and combustion byproducts associated with the same. The expansion section is configured to facilitate power generation associated with expansion of working fluid, such as working fluid of a first charge, a second charge, and so on. In some embodiments, the combustion assembly includes a plurality of power rotors. In some embodiments, one or more power rotor includes a plurality of expansion members.

In some embodiments, an expansion member 225 is coupled to a power rotor 220 such that the expansion member moves through the combustion chamber 215 as the power rotor 220 rotates about a first axis. In some embodiments, a distal end of the expansion member 225 remains a first distance from the first axis as the power rotor 220 rotates about the first axis. In some embodiments, the first axis remains fixed relative to a combustion housing 210 of the engine. In some embodiments, the first axis remains fixed relative to an ignition means 16 of the combustion assembly, such as a spark plug, a glow plug, a plasma plug, or the like. In some embodiments, the first axis remains fixed relative to a combustion chamber 215 of the combustion assembly. In some embodiments, the first axis remains fixed relative to an intake port 211 and/or an exhaust port 219 of the combustion assembly, the intake port 211 being positioned at a first end of a combustion chamber 215 and the exhaust port 219 being positioned at a second end of said combustion chamber 215.

Some embodiments of the present invention include a combustion isolator 230 positioned at least partially within an interior area of a combustion housing 210, the combustion isolator 230 having an exterior surface 232 positioned adjacent to an exterior surface 222 of a power rotor 220 so as to define at least part of a first and/or second end of a combustion chamber 215. In some embodiments, the combustion isolator 230 defines a receptacle 235 that is configured to receive an expansion member 225 of the power rotor 220 as the expansion member 225 moves away from an exhaust port 219 towards an intake port 211, such as to facilitate expulsion from the combustion chamber of working fluid of a charge, such as a previously ignited and expanded first charge, second charge, and so on, to facilitate continuous unidirectional rotation of the power rotor 220 (such as by facilitating repeated engagement and disengagement of an expansion member with/from one or more receptacle), to facilitate resetting the combustion assembly for a subsequent combustion process, or the like. In some embodiments, the combustion assembly includes a plurality of isolators. In some embodiments, one or more isolator includes a plurality of receptacles.

Some embodiments of the present invention include a compression assembly 100. In some embodiments, the compression assembly 100 includes a compression housing 110 having an interior surface 112 defining an interior area. A compression rotor 120 is positioned within the interior area of the compression housing 110, the compression rotor 120 having an exterior surface 122 displaced from the interior surface 112 of the compression housing 110, thereby defining a compression chamber 115. A compression member 125 extends from the exterior surface 122 of the compression rotor 120 towards the interior surface 112 of said compression housing 110, thereby segmenting the compression chamber into an intake section and a compression section during a compression stroke of the compression assembly. The intake section is configured to facilitate drawing a compressible fluid into the compression chamber, such as working fluid for use by a combustion assembly. The compression section is configured to facilitate compression of the fluid, such that compression of working fluid within a combustion chamber is not required. In some embodiments, the compression assembly includes a plurality of compression rotors. In some embodiments, one or more compression rotor includes a plurality of compression members.

In some embodiments, a compression member 125 is coupled to a compression rotor 120 such that the compression member moves through the compression chamber 115 as the compression rotor 120 rotates about a first axis. In some embodiments, a distal end of the compression member 125 remains a first distance from the first axis as the compression rotor 120 rotates about the first axis. In some embodiments, the first axis remains fixed relative to a compression housing 110 of the engine. In some embodiments, the first axis remains fixed relative to a compression chamber 115 of the compression assembly. In some embodiments, the first axis remains fixed relative to an inlet port 111 and/or an outlet port 119 of the compression assembly, the inlet port 111 being positioned at a first end of a compression chamber 115 and the outlet port 119 being positioned at a second end of the compression chamber 115.

Some embodiments of the present invention include a compression isolator 130 positioned at least partially within an interior area of a compression housing 110, the compression isolator 130 having an exterior surface 132 positioned adjacent to an exterior surface 122 of a compression rotor 120 so as to define at least part of a first and/or second end of a compression chamber 115. In some embodiments, the compression isolator 130 defines a receptacle 135 that is configured to receive a compression member 125 of the compression rotor 120 as the compression member 125 moves away from an outlet port 119 towards an inlet port 111, such as to facilitate expulsion from the compression chamber of compressed fluid, to facilitate continuous unidirectional rotation of the compression rotor 120 (such as by facilitating repeated engagement and disengagement of a compression member with/from one or more receptacle), to facilitate resetting the compression assembly for a subsequent compression process, or the like. In some embodiments, the compression assembly includes a plurality of isolators. In some embodiments, one or more isolator includes a plurality of receptacles.

Referring to FIGS. 77-82, some embodiments of the present invention include a venting system for preventing or otherwise inhibiting air from being vented out of the engine and/or for controlling such venting. In some embodiments, one or more rotor and/or housing defines a recessed area 705 such that when the rotor is positioned within the housing, the one or more recessed area forms a void surrounding (either directly or displaced from) a respective tube. In this way, any blowby gasses (compressed air blowby, combustion blowby, or the like) that may migrate between the housing wall and the rotor must enter the void prior to reaching the shaft. In some embodiments, a venting system 700, such as a positive crankcase ventilation ("PCV") system or the like, is in fluid communication with the void, thereby venting fluid from the void prior to the fluid reaching the shaft. In some embodiments, the venting system includes and/or is connected with a valve 710, such as a PCV valve or the like. In some embodiments, the system utilizes a seal 720, such as a ring seal or the like, to prevent or otherwise inhibit any fluid that may migrate past the void from migrating out of the respective chamber between the shaft and the respective housing. In this way, unwanted venting can be reduced or eliminated. It will be appreciated that some embodiments include recessed areas formed in the housing and not the rotor, some embodiments include recessed areas formed in the rotor and not the housing, and some embodiments include partial or complete recesses formed in each of the housing and the rotor. In some embodiments, the venting system directs at least some fluid back to a breather system, such as upstream of a filter of the breather system. In some embodiments, the venting system directs fluid to a location that is downstream of the breather system, such as directly into a compression housing, a tank housing, or the like.

Figure 83:
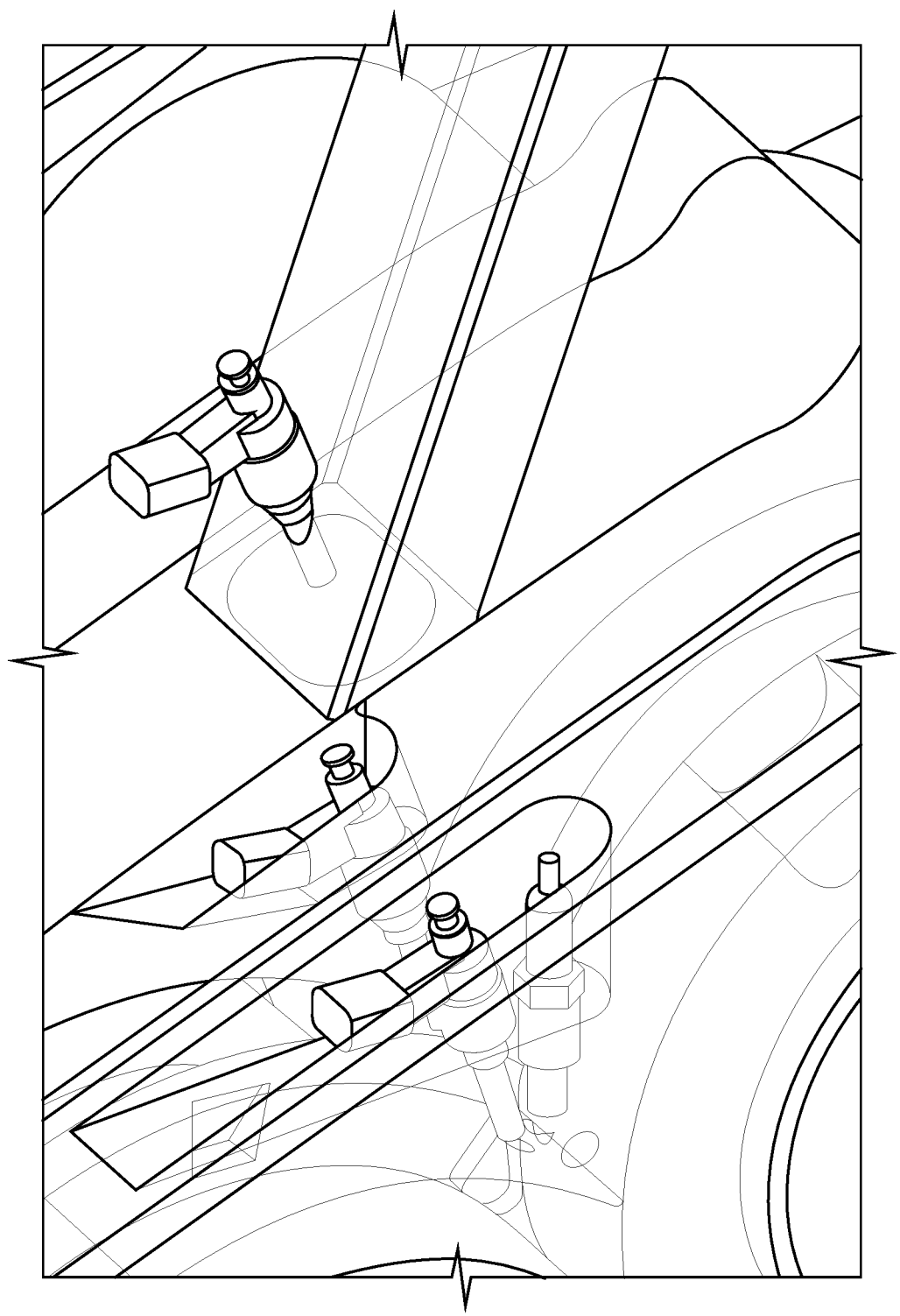
FIG. 83 is a partial translucent view showing an embodiment of the present invention having three fuel injectors, each fuel injector being associated with one of a compression assembly, a tank assembly, and a combustion assembly, thereby facilitating injection of fuel in each.

Referring to FIG. 83, some embodiments include a plurality of fuel injection systems. In some embodiments, the present invention includes a means of injecting fuel into a breather system and/or for otherwise injecting fuel into incoming air prior to compression of the air in a compression assembly. In some embodiments, the present invention includes a means of injecting fuel into a tank assembly and/or for otherwise directing fuel into compressed air prior to the air entering a combustion assembly. In some embodiments, the present invention includes a means of injecting fuel into a combustion assembly, such as into an ignition chamber and/or directly into a combustion chamber.

In some embodiments, a compression rotor of the present invention rotates about a first axis and an isolator of the present invention rotates about a second axis, the first axis being parallel with but displaced from the first axis. In some embodiments, the compression rotor is coupled to a drive shaft extending from a combustion assembly such that the first axis is coincidental with a longitudinal central axis of the drive shaft. In some such embodiments, the isolator rotor is coupled to a synchronizing shaft extending from the combustion assembly such that the second axis is coincidental with a longitudinal central axis of the synchronizing shaft. In other embodiments, the compression rotor is coupled to a synchronizing shaft and/or the isolator rotor is coupled to a drive shaft. In some embodiments, each rotor is coupled to a respective shaft such that the rotational speed of each rotor is equal to the rotational speed of the respective shaft.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. An internal combustion engine comprising a combustion assembly and a compression assembly, said combustion assembly comprising:
   a combustion housing having an interior surface defining an interior area;
   a power rotor positioned within the interior area of said combustion housing, said power rotor having an exterior surface displaced from said interior surface of said combustion housing, thereby defining a combustion chamber;
   a drive shaft extending from said power rotor; and
   a first expansion member extending from said exterior surface of said power rotor towards said interior surface of said combustion housing,
   wherein said first expansion member segments the combustion chamber into an expansion section and an exhaust section during a power stroke of the engine,
   wherein said exhaust section is configured to facilitate expelling expanded working fluid of a first charge,
   wherein said expansion section is configured to facilitate power generation associated with expansion of working fluid of a second charge,
   wherein said first expansion member is coupled to said power rotor such that said expansion member moves through the combustion chamber as said power rotor rotates about a first axis, the first axis being coincidental with a longitudinal central axis of said drive shaft,
   wherein said drive shaft is coupled to said power rotor such that the rotational speed of said drive shaft is equal to the rotational speed of said power rotor,
   wherein said combustion housing defines an intake port and an exhaust port, said intake port being positioned at a first end of said combustion chamber and said exhaust port being positioned at a second end of said combustion chamber,
   wherein said compression assembly comprises a compression rotor, and
   wherein said drive shaft is coupled to said compression rotor such that the rotational speed of said compression rotor is equal to the rotational speed of said drive shaft,
   the compression assembly further comprising:
   a compression housing having an interior surface defining an interior area wherein said compression rotor is positioned within the interior area of said compression housing, said compression rotor having an exterior surface displaced from said interior surface of said compression housing, thereby defining a compression chamber; and
   a first compression member extending from said exterior surface of said compression rotor towards said interior surface of said compression housing,
   wherein said first compression member segments the compression chamber into an intake section and a compression section during a compression stroke of the engine,
   wherein said intake section is configured to facilitate drawing a compressible fluid into the compression chamber of said compression assembly,
   wherein said compression section is configured to facilitate compression of the compressible fluid, and
   wherein said first compression member is coupled to said compression rotor such that said compression member moves through the compression chamber as said compression rotor rotates about the first axis.

2. The engine of claim 1, wherein:
   said compression assembly further comprises a compression isolator positioned at least partially within said interior area of said compression housing, said compression isolator having an exterior surface positioned adjacent to said exterior surface of said compression rotor so as to define at least part of a first end of said compression chamber,
   wherein said compression isolator defines a first receptacle that is configured to receive said first compression member as said first compression member moves past the compression isolator, and wherein said compression isolator rotates about a second axis, the second axis being parallel with but displaced from the first axis.

3. The engine of claim 2, further comprising a synchronizing shaft extending from said compression isolator, the second axis being coincidental with a longitudinal central axis of said synchronizing shaft, wherein said synchronizing shaft is coupled to said compression isolator such that the rotational speed of said synchronizing shaft is equal to the rotational speed of said compression isolator, and wherein the rotation of said synchronizing shaft is timed relative to the rotation of said drive shaft so as to facilitate continuous unidirectional rotation of said compression rotor.

4. The engine of claim 3, wherein gaps between the compression rotor and the compression housing are sized so as to facilitate compressing fluid at speeds greater than 5,000 revolutions per minute, the engine further including an agent injection system for injecting a sealing agent into the compression chamber, thereby facilitating compressing fluid at speeds lower than 5,000 revolutions per minute.

5. The engine of claim 3, further comprising a venting system in fluid communication with a first location of the compression housing, the first location being positioned between said compression chamber and an exterior surface of said drive shaft so as to inhibit fluid from migrating out of said compression housing along said exterior surface of said drive shaft.

6. The engine of claim 5, further comprising a venting system in fluid communication with a first location of the combustion housing, the first location being positioned between said combustion chamber and an exterior surface of said drive shaft so as to inhibit fluid from migrating out of said combustion housing along said exterior surface of said drive shaft.

7. An internal combustion engine comprising a combustion assembly and a compression assembly, said combustion assembly comprising:

a combustion housing having an interior surface defining an interior area;

a power rotor positioned within the interior area of said combustion housing, said power rotor having an exterior surface displaced from said interior surface of said combustion housing, thereby defining a combustion chamber;

a drive shaft extending from said power rotor; and a first expansion member extending from said exterior surface of said power rotor towards said interior surface of said combustion housing, wherein said first expansion member segments the combustion chamber into an expansion section and an exhaust section during a power stroke of the engine, wherein said exhaust section is configured to facilitate expelling expanded working fluid of a first charge, wherein said expansion section is configured to facilitate power generation associated with expansion of working fluid of a second charge, wherein said first expansion member is coupled to said power rotor such that said expansion member moves through the combustion chamber as said power rotor rotates about a first axis, the first axis being coincidental with a longitudinal central axis of said drive shaft, wherein said drive shaft is coupled to said power rotor such that the rotational speed of said drive shaft is equal to the rotational speed of said power rotor, wherein said combustion housing defines an intake port and an exhaust port, said intake port being positioned at a first end of said combustion chamber and said exhaust port being positioned at a second end of said combustion chamber, wherein said compression assembly comprises a compression rotor, and wherein said drive shaft is coupled to said compression rotor such that the rotational speed of said compression rotor is equal to the rotational speed of said drive shaft, then engine further comprising a venting system in fluid communication with a first location of the combustion housing, the first location being positioned between said combustion chamber and an exterior surface of said drive shaft so as to inhibit fluid from migrating out of said combustion housing along said exterior surface of said drive shaft.

8. The engine of claim 7, further comprising a rotary valve coupled to said drive shaft, wherein said rotary valve defines an aperture that moves in and out of alignment with the intake port as the rotary valve rotates about the first axis, and wherein the intake port is in an open configuration when the aperture is in alignment with the intake port.

9. A method of assembling an internal combustion engine, the method comprising:

coupling a power rotor to a drive shaft;

engaging the drive shaft with a combustion housing such that the drive shaft and the power rotor are capable of rotating about a first axis, the first axis being coincidental with a longitudinal central axis of the drive shaft; and enclosing the power rotor within the combustion housing, thereby creating an enclosed combustion chamber; and coupling a compression isolator to a synchronizing shaft such that rotation of the compression isolator is timed relative to rotation of a compression rotor, wherein the combustion housing defines an intake port and an exhaust port, each of the intake and exhaust ports being in fluid communication with the combustion chamber, wherein the power rotor comprises an expansion member for separating a first section of the combustion chamber from a second section of the combustion chamber, the first and second sections being configured to facilitate expansion and exhaust, respectively, the exhaust port being in fluid communication with the second section of the combustion chamber, and wherein the expansion member is configured to rotate past the exhaust port so that the exhaust port is in fluid communication with a first portion of the combustion chamber, thereby causing the first section of the combustion chamber to be configured to facilitate exhaust, the method further comprising:

coupling a combustion isolator to the synchronizing shaft;

engaging the synchronizing shaft with the combustion housing such that the synchronizing shaft and the combustion isolator are capable of rotating about a second axis, the second axis being coincidental with a longitudinal central axis of the synchronizing shaft;

enclosing the combustion isolator within the combustion housing; and timing rotation of the synchronizing shaft relative to the drive shaft such that a first receptacle of the combustion isolator receives the expansion member as the expansion member moves away from the exhaust port towards the intake port, wherein the second axis is parallel with but displaced from the first axis, the method further comprising:

coupling a drive gear to the drive shaft;

coupling a synchronizing gear to the synchronizing shaft;

meshing the drive gear with the synchronizing gear, thereby timing rotation of the synchronizing shaft relative to the drive shaft, coupling the compression rotor to the drive shaft such that rotation of the compression rotor is capable of being driven at least partially by rotation of the power rotor; and enclosing the compression rotor within a compression housing, thereby creating an enclosed compression chamber, wherein the compression housing defines an inlet port and an outlet port, each of the inlet and outlet ports being in fluid communication with the compression chamber, wherein the compression rotor comprises a compression member for separating a first section of the compression chamber from a second section of the compression chamber, the first and second sections being configured to facilitate intake and compression, respectively, the inlet ort being in fluid communication with the first section of the compression chamber, and wherein the compression member is configured to rotate past the inlet port so that the inlet port is in fluid communication with the second portion of the compression chamber, thereby causing the first section of the compression chamber to be configured to facilitate compression, the method further comprising enclosing the compression isolator within the combustion housing, wherein a first receptacle of the compression isolator receives the compression member as the compression member moves away from the outlet port towards the inlet port.

10. The method of claim 9, further comprising shaping the compression outlet port, the compression member, and the first receptacle of the compression isolator such that fluid is not trapped between the compression member and the compression isolator as the compression member rotates from the outlet port to the inlet port.

11. A method of assembling an internal combustion engine, the method comprising:

coupling a power rotor to a drive shaft;

engaging the drive shaft with a combustion housing such that the drive shaft and the power rotor are capable of rotating about a first axis, the first axis being coincidental with a longitudinal central axis of the drive shaft; and enclosing the power rotor within the combustion housing, thereby creating an enclosed combustion chamber; and coupling a compression isolator to a synchronizing shaft such that rotation of the compression isolator is timed relative to rotation of a compression rotor, wherein the combustion housing defines an intake port and an exhaust port, each of the intake and exhaust ports being in fluid communication with the combustion chamber, wherein the power rotor comprises an expansion member for separating a first section of the combustion chamber from a second section of the combustion chamber, the first and second sections being configured to facilitate expansion and exhaust, respectively, the exhaust port being in fluid communication with the second section of the combustion chamber, and wherein the expansion member is configured to rotate past the exhaust port so that the exhaust port is in fluid communication with a first portion of the combustion chamber, thereby causing the first suction of the combustion chamber to be configured to facilitate exhaust, the method further comprising coupling a rotary valve to the drive shaft such that an aperture of the rotary valve rotates about the first axis, thereby moving the aperture in and out of alignment with the intake port, wherein the intake port is in an open configuration when the aperture is in alignment with the intake port.

12. The method of claim 11, further comprising installing a venting system in fluid communication with a first location of said combustion housing, said first location being positioned between said combustion chamber and an exterior surface of said drive shaft so as to inhibit fluid from migrating out of said combustion housing along said exterior surface of said drive shaft.

13. The method of claim 11, further comprising engaging a tank assembly with the combustion assembly such that the tank assembly is in fluid communication with the combustion chamber when the intake port is in the open configuration, the tank assembly being configured to hold a volume of pressurized fluid, a portion of the pressurized fluid being driven into the combustion chamber at the beginning of each power stroke of the engine, thereby providing working fluid for the power stroke.

14. The method of claim 13, further comprising positioning and orienting a fuel injector for injecting fuel into the combustion chamber through the intake port when the intake port is in the open configuration, at least part of the fuel injector being located within the tank assembly.

15. A method of assembling an internal combustion engine, the method comprising:

coupling a power rotor to a drive shaft;

engaging the drive shaft with a combustion housing such that the drive shaft and the power rotor are capable of rotating about a first axis, the first axis being coincidental with a longitudinal central axis of the drive shaft; and enclosing the power rotor within the combustion housing, thereby creating an enclosed combustion chamber; and coupling a compression isolator to a synchronizing shaft such that rotation of the compression isolator is timed relative to rotation of a compression rotor, wherein the combustion housing defines an intake port and an exhaust port, each of the intake and exhaust ports being in fluid communication with the combustion chamber, wherein the power rotor comprises an expansion member for separating a first section of the combustion chamber from a second section of the combustion chamber, the first and second sections being configured to facilitate expansion and exhaust respectively, the exhaust port being in fluid communication with the second section of the combustion chamber, and wherein the expansion member is configured to rotate past the exhaust port so that the exhaust port is in fluid communication with a first portion of the combustion chamber, thereby causing the first section of the combustion chamber to be configured to facilitate exhaust, the method further comprising installing a venting system in fluid communication with a first location of said combustion housing, said first location being positioned between said combustion chamber and an exterior surface of said drive shaft so as to inhibit fluid from migrating out of said combustion housing along said exterior surface of said drive shaft.

16. An internal combustion engine comprising a combustion assembly and a compression assembly, said combustion assembly comprising:
a combustion housing having an interior surface defining an interior area;
a power rotor positioned within the interior area of said combustion housing, said power rotor having an exterior surface displaced from said interior surface of said combustion housing, thereby defining a combustion chamber;
a drive shaft extending from said power rotor; and
a first expansion member extending from said exterior surface of said power rotor towards said interior surface of said combustion housing,
wherein said first expansion member segments the combustion chamber into an expansion section and an exhaust section during a power stroke of the engine,
wherein said exhaust section is configured to facilitate expelling expanded working fluid of a first charge,
wherein said expansion section is configured to facilitate power generation associated with expansion of working fluid of a second charge,
wherein said first expansion member is coupled to said power rotor such that said expansion member moves through the combustion chamber as said power rotor rotates about a first axis, the first axis being coincidental with a longitudinal central axis of said drive shaft,
wherein said drive shaft is coupled to said power rotor such that the rotational speed of said drive shaft is equal to the rotational speed of said power rotor,
wherein said combustion housing defines an intake port and an exhaust port, said intake port being positioned at a first end of said combustion chamber and said exhaust port being positioned at a second end of said combustion chamber,
wherein said compression assembly comprises a compression rotor, and
wherein said drive shaft is coupled to said compression rotor such that the rotational speed of said compression rotor is equal to the rotational speed of said drive shaft,
the engine further comprising a rotary valve coupled to said drive shaft, wherein said rotary valve defines an aperture that moves in and out of alignment with the intake port as the rotary valve rotates about the first axis, and wherein the intake port is in an open configuration when the aperture is in alignment with the intake port.

17. An internal combustion engine comprising:
a combustion assembly, said combustion assembly comprising:
a combustion housing having an interior surface defining an interior area;
a power rotor positioned within the interior area of said combustion housing, said power rotor having an exterior surface displaced from said interior surface of said combustion housing, thereby defining a combustion chamber;
a drive shaft extending from said power rotor; and
a first expansion member extending from said exterior surface of said power rotor towards said interior surface of said combustion housing,
wherein said first expansion member segments the combustion chamber into an expansion section and an exhaust section during a power stroke of the engine,
wherein said exhaust section is configured to facilitate expelling expanded working fluid of a first charge,
wherein said expansion section is configured to facilitate power generation associated with expansion of working fluid of a second charge,
wherein said first expansion member is coupled to said power rotor such that said expansion member moves through the combustion chamber as said power rotor rotates about a first axis, the first axis being coincidental with a longitudinal central axis of said drive shaft,
wherein said drive shaft is coupled to said power rotor such that the rotational speed of said drive shaft is equal to the rotational speed of said power rotor, and
wherein said combustion housing defines an intake port and an exhaust port, said intake port being positioned at a first end of said combustion chamber and said exhaust port being positioned at a second end of said combustion chamber; and
a venting system in fluid communication with a first location of the combustion housing, the first location being positioned between said combustion chamber and an exterior surface of said drive shaft so as to inhibit fluid from migrating out of said combustion housing along said exterior surface of said drive shaft.

18. The engine of claim 17, further comprising a rotary valve coupled to said drive shaft, wherein said rotary valve defines an aperture that moves in and out of alignment with the intake port as the rotary valve rotates about the first axis, and wherein the intake port is in an open configuration when the aperture is in alignment with the intake port.

19. The engine of claim 17, wherein:
said combustion assembly further comprises a combustion isolator positioned at least partially within said interior area of said combustion housing, said combustion isolator having an exterior surface positioned adjacent to said exterior surface of said power rotor so as to define at least part of said first end of said combustion chamber,
wherein said combustion isolator defines a first receptacle that is configured to receive said first expansion member as said first expansion member moves away from said exhaust port towards said intake port, thereby facilitating expulsion from the combustion chamber of the working fluid of the second charge, and
wherein said combustion isolator rotates about a second axis, the second axis being parallel with but displaced from the first axis.

20. The engine of claim 19, further comprising a synchronizing shaft extending from said combustion isolator, the second axis being coincidental with a longitudinal central axis of said synchronizing shaft,
wherein said synchronizing shaft is coupled to said combustion isolator such that the rotational speed of said synchronizing shaft is equal to the rotational speed of said combustion isolator, and
wherein the rotation of said synchronizing shaft is timed relative to the rotation of said drive shaft so as to facilitate continuous unidirectional rotation of said power rotor.

21. The engine of claim 20, further comprising a rotary valve coupled to said drive shaft, wherein said rotary valve defines an aperture that moves in and out of alignment with the intake port as the rotary valve rotates about the first axis, and wherein the intake port is in an open configuration when the aperture is in alignment with the intake port.

22. An internal combustion engine comprising a combustion assembly, said combustion assembly comprising:
  a combustion housing having an interior surface defining an interior area;
  a power rotor positioned within the interior area of said combustion housing, said power rotor having an exterior surface displaced from said interior surface of said combustion housing, thereby defining a combustion chamber;
  a drive shaft extending from said power rotor;
  a first expansion member extending from said exterior surface of said power rotor towards said interior surface of said combustion housing; and
  a rotary valve coupled to said drive shaft,
  wherein said first expansion member segments the combustion chamber into an expansion section and an exhaust section during a power stroke of the engine, wherein said exhaust section is configured to facilitate expelling expanded working fluid of a first charge,
  wherein said expansion section is configured to facilitate power generation associated with expansion of working fluid of a second charge,
  wherein said first expansion member is coupled to said power rotor such that said expansion member moves through the combustion chamber as said power rotor rotates about a first axis, the first axis being coincidental with a longitudinal central axis of said drive shaft,
  wherein said drive shaft is coupled to said power rotor such that the rotational speed of said drive shaft is equal to the rotational speed of said power rotor,
  wherein said combustion housing defines an intake port and an exhaust port, said intake port being positioned at a first end of said combustion chamber and said exhaust port being positioned at a second end of said combustion chamber,
  wherein said rotary valve defines an aperture that moves in and out of alignment with the intake port as the rotary valve rotates about the first axis, and
  wherein the intake port is in an open configuration when the aperture is in alignment with the intake port.

23. The engine of claim 22, wherein:
  said combustion assembly further comprises a combustion isolator positioned at least partially within said interior area of said combustion housing, said combustion isolator having an exterior surface positioned adjacent to said exterior surface of said power rotor so as to define at least part of said first end of said combustion chamber,
  wherein said combustion isolator defines a first receptacle that is configured to receive said first expansion member as said first expansion member moves away from said exhaust port towards said intake port, thereby facilitating expulsion from the combustion chamber of the working fluid of the second charge, and
  wherein said combustion isolator rotates about a second axis, the second axis being parallel with but displaced from the first axis.

24. The engine of claim 23, further comprising a synchronizing shaft extending from said combustion isolator, the second axis being coincidental with a longitudinal central axis of said synchronizing shaft,
  wherein said synchronizing shaft is coupled to said combustion isolator such that the rotational speed of said synchronizing shaft is equal to the rotational speed of said combustion isolator, and
  wherein the rotation of said synchronizing shaft is timed relative to the rotation of said drive shaft so as to facilitate continuous unidirectional rotation of said power rotor.

25. A method of assembling an internal combustion engine, the method comprising:
  coupling a power rotor to a drive shaft;
  engaging the drive shaft with a combustion housing such that the drive shaft and the power rotor are capable of rotating about a first axis, the first axis being coincidental with a longitudinal central axis of the drive shaft;
  enclosing the power rotor within the combustion housing, thereby creating an enclosed combustion chamber, wherein the combustion housing defines an intake port and an exhaust port, each of the intake and exhaust ports being in fluid communication with the combustion chamber; and
  coupling a rotary valve to the drive shaft such that an aperture of the rotary valve rotates about the first axis, thereby moving the aperture in and out of alignment with the intake port, wherein the intake port is in an open configuration when the aperture is in alignment with the intake port,
  wherein the power rotor comprises an expansion member for separating a first section of the combustion chamber from a second section of the combustion chamber, the first and second sections being configured to facilitate expansion and exhaust, respectively, the exhaust port being in fluid communication with the second section of the combustion chamber, and
  wherein the expansion member is configured to rotate past the exhaust port so that the exhaust port is in fluid communication with the first portion of the combustion chamber, thereby causing the first section of the combustion chamber to be configured to facilitate exhaust.

26. The method of claim 25, further comprising installing a venting system in fluid communication with a first location of said combustion housing, said first location being positioned between said combustion chamber and an exterior surface of said drive shaft so as to inhibit fluid from migrating out of said combustion housing along said exterior surface of said drive shaft.

27. The method of claim 25, further comprising engaging a tank assembly with the combustion assembly such that the tank assembly is in fluid communication with the combustion chamber when the intake port is in the open configuration, the tank assembly being configured to hold a volume of pressurized fluid, a portion of the pressurized fluid being driven into the combustion chamber at the beginning of each power stroke of the engine, thereby providing working fluid for the power stroke.

28. The method of claim 27, further comprising positioning and orienting a fuel injector for injecting fuel into the combustion chamber through the intake port when the intake port is in the open configuration, at least part of the fuel injector being located within the tank assembly.

29. The method of claim 28, further comprising installing a venting system in fluid communication with a first location of said combustion housing, said first location being positioned between said combustion chamber and an exterior surface of said drive shaft so as to inhibit fluid from migrating out of said combustion housing along said exterior surface of said drive shaft.

30. A method of assembling an internal combustion engine, the method comprising:
  coupling a power rotor to a drive shaft;

engaging the drive shaft with a combustion housing such that the drive shaft and the power rotor are capable of rotating about a first axis, the first axis being coincidental with a longitudinal central axis of the drive shaft;

enclosing the power rotor within the combustion housing, thereby creating an enclosed combustion chamber, wherein the combustion housing defines an intake port and an exhaust port, each of the intake and exhaust ports being in fluid communication with the combustion chamber; and installing a venting system in fluid communication with a first location of said combustion housing, said first location being positioned between said combustion chamber and an exterior surface of said drive shaft so as to inhibit fluid from migrating out of said combustion housing along said exterior surface of said drive shaft, wherein the power rotor comprises an expansion member for separating a first section of the combustion chamber from a second section of the combustion chamber, the first and second sections being configured to facilitate expansion and exhaust, respectively, the exhaust port being in fluid communication with the second section of the combustion chamber, and wherein the expansion member is configured to rotate past the exhaust port so that the exhaust port is in fluid communication with the first portion of the combustion chamber, thereby causing the first section of the combustion chamber to be configured to facilitate exhaust.

\* \* \* \* \*